(12) United States Patent
Flohr

(10) Patent No.: US 8,938,311 B2
(45) Date of Patent: Jan. 20, 2015

(54) METHODS OF REMOTELY MANAGING WATER HEATING UNITS IN A WATER HEATER

(71) Applicant: Daniel P. Flohr, Roswell, GA (US)

(72) Inventor: Daniel P. Flohr, Roswell, GA (US)

( * ) Notice: Subject to any disclaimer, the term of this patent is extended or adjusted under 35 U.S.C. 154(b) by 0 days.

(21) Appl. No.: 14/053,320

(22) Filed: Oct. 14, 2013

(65) Prior Publication Data

US 2014/0037275 A1    Feb. 6, 2014

Related U.S. Application Data

(60) Continuation-in-part of application No. 12/687,683, filed on Jan. 14, 2010, now abandoned, and a (Continued)

(51) Int. Cl.
| | | |
|---|---|---|
| G05B 19/18 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(Continued)

(52) U.S. Cl.
CPC .............. *F24H 9/2021* (2013.01); *F24H 1/201* (2013.01); *H02J 3/14* (2013.01); *H02J 3/28* (2013.01); *H02J 13/0006* (2013.01); *Y02B 70/3225* (2013.01); *Y02B 70/3275* (2013.01); *Y02B 90/222* (2013.01); *Y02B 30/762* (2013.01); *Y04S 20/12* (2013.01); *Y04S 20/222* (2013.01); *Y04S 20/244* (2013.01); *F24D 2200/08* (2013.01); *H02J 2003/143* (2013.01); *Y02B 70/3266* (2013.01); *Y04S 20/242* (2013.01)
USPC ............... 700/65; 700/56; 700/291; 700/295; 307/18

(58) Field of Classification Search
USPC ........... 700/65, 286, 291, 295, 296, 297, 299
See application file for complete search history.

(56) References Cited

U.S. PATENT DOCUMENTS

| 4,023,043 A | 5/1977 | Stevenson |
|---|---|---|
| 4,166,944 A | 9/1979 | Scott |

(Continued)

FOREIGN PATENT DOCUMENTS

| CA | 2 567 438 A1 | 5/2008 |
|---|---|---|
| EP | 1 487 079 A2 | 12/2004 |

(Continued)

OTHER PUBLICATIONS

"Energy Legal Blog: ERCOT Blames Inaccurate Wind Predictions for February Emergency Event", Bracewell & Giuliani, LLP (2007), 3 pages, Last Download: May 7, 2008.

(Continued)

*Primary Examiner* — Mohammad Ali
*Assistant Examiner* — Ziaul Karim
(74) *Attorney, Agent, or Firm* — Myers Bigel Sibley & Sajovec, P.A.

(57) ABSTRACT

A method of managing electrical power storage can include remotely controlling operation of one of a plurality of water heating units included in a single water heater, separately from controlling a remainder of the plurality of the water heating units, at a customer location in response to a remotely transmitted indication.

5 Claims, 46 Drawing Sheets

Related U.S. Application Data continuation-in-part of application No. 13/399,698, filed on Feb. 17, 2012, now Pat. No. 8,571,692, said application No. 13/399,698 is a division of application No. 12/143,074, filed on Jun. 20, 2008, now Pat. No. 8,121,742.

(60) Provisional application No. 61/714,981, filed on Oct. 17, 2012, provisional application No. 61/856,260, filed on Jul. 19, 2013, provisional application No. 61/886,591, filed on Oct. 3, 2013, provisional application No. 60/981,700, filed on Oct. 22, 2007.

(51) Int. Cl.
| | | |
|---|---|---|
| *H02J 1/10* | (2006.01) | |
| *H02J 3/38* | (2006.01) | |
| *H02J 7/34* | (2006.01) | |
| *F24H 9/20* | (2006.01) | |
| *F24H 1/20* | (2006.01) | |
| *H02J 3/14* | (2006.01) | |
| *H02J 3/28* | (2006.01) | |
| *H02J 13/00* | (2006.01) | |

(56) References Cited

U.S. PATENT DOCUMENTS

| | | | |
|---|---|---|---|
| 4,168,491 A | 9/1979 | Phillips et al. | |
| 4,333,002 A * | 6/1982 | Kozak | 392/451 |
| 4,360,881 A | 11/1982 | Martinson | |
| 4,449,178 A | 5/1984 | Blau, Jr. et al. | |
| 4,461,949 A | 7/1984 | Weiser | |
| 4,731,547 A | 3/1988 | Alenduff et al. | |
| 4,948,948 A * | 8/1990 | Lesage | 392/454 |
| 5,528,507 A | 6/1996 | McNamara et al. | |
| 5,572,438 A | 11/1996 | Ehlers et al. | |
| 5,808,277 A * | 9/1998 | Dosani et al. | 219/481 |
| 6,671,586 B2 | 12/2003 | Davis et al. | |
| 6,832,135 B2 | 12/2004 | Ying | |
| 6,861,621 B2 | 3/2005 | Ghent | |
| 6,972,162 B2 | 12/2005 | Gao et al. | |
| 7,206,670 B2 | 4/2007 | Pimputkar et al. | |
| 7,432,477 B2 | 10/2008 | Teti | |
| 7,620,302 B2 * | 11/2009 | Lesage et al. | 392/454 |
| 7,738,999 B2 | 6/2010 | Petite | |
| 7,860,380 B2 | 12/2010 | Eisenbraun | |
| 7,925,597 B2 | 4/2011 | Takano et al. | |
| 8,234,876 B2 | 8/2012 | Parsonnet et al. | |
| 8,474,279 B2 | 7/2013 | Besore et al. | |
| 8,805,597 B2 | 8/2014 | Steffes et al. | |
| 2002/0103655 A1 | 8/2002 | Boies et al. | |
| 2003/0066090 A1 | 4/2003 | Traw et al. | |
| 2003/0187550 A1 | 10/2003 | Wilson et al. | |
| 2004/0117330 A1 | 6/2004 | Ehlers et al. | |
| 2004/0153170 A1 | 8/2004 | Santacatterina et al. | |
| 2004/0158360 A1 | 8/2004 | Garland, II et al. | |
| 2004/0257730 A1 | 12/2004 | Suzuki et al. | |
| 2005/0071092 A1 | 3/2005 | Farkas et al. | |
| 2005/0116836 A1 | 6/2005 | Perry et al. | |
| 2005/0125083 A1 | 6/2005 | Kiko | |
| 2006/0276938 A1 | 12/2006 | Miller | |
| 2007/0198133 A1 * | 8/2007 | Hirst | 700/295 |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0052145 A1 | 2/2008 | Kaplan et al. | |
| 2008/0167756 A1 | 7/2008 | Golden et al. | |
| 2008/0272934 A1 | 11/2008 | Wang et al. | |
| 2009/0093916 A1 | 4/2009 | Parsonnet et al. | |
| 2010/0004790 A1 | 1/2010 | Harbin, III et al. | |
| 2012/0074799 A1 | 3/2012 | Bradfield | |
| 2012/0158198 A1 | 6/2012 | Black et al. | |
| 2012/0271476 A1 | 10/2012 | Parsonnet et al. | |
| 2013/0346768 A1 | 12/2013 | Forbes, Jr. | |

FOREIGN PATENT DOCUMENTS

| | | |
|---|---|---|
| EP | 1 993 183 A1 | 11/2008 |
| WO | WO 8808658 | 11/1988 |
| WO | WO 2005/041326 A2 | 5/2005 |
| WO | WO 2007/094054 A1 | 8/2007 |

OTHER PUBLICATIONS

"Energy Legal Blog: ERCOT Identifies Scenarios for Texas Wind Transmission", Bracewell & Giuliani, LLP (2007), 4 pages, Last Download: May 7, 2008.

"ERCOT Operations Report on the EECP Event of Feb. 26, 2008", Project No. 27706: Reports of the Electric Reliability Council of Texas (ERCOT) and Public Utility Commission of Texas, 15 pages (2008).

"Feb. 26, 2008 EECP Step 2 Report: Mar. 18, 2008", ERCOT, 8 pages (2008).

"Why the Texas Reliability Event on Feb. 26, 2008 Raises No Concerns About Much Higher Wind Penetration", Electric Reliability Council of Texas (ERCOT) and the American Wind Energy Association (AWEA), Full Report found at the following web address: http://interchange.puc.state.tx.us/WebApp/Interchange/Documents/27706_114_577769.pdf.

Giant Factories Inc., Cascade Electric Water Heaters, Retrieved from the internet on Oct. 17, 2012: http://www.giantinc.com/english/products/residential/super_cascade_eco.htm.

International Search Report and Written Opinion (23 pages) corresponding to International Application No. PCT/US2008/011974; Mailing Date: Jun. 15, 2009.

Invitation to Pay Additional Fees and, Where Applicable, Protest Fee (7 pages) corresponding to International Patent Application No. PCT/US2008/011974; Mailing Date: Mar. 6, 2009.

* cited by examiner

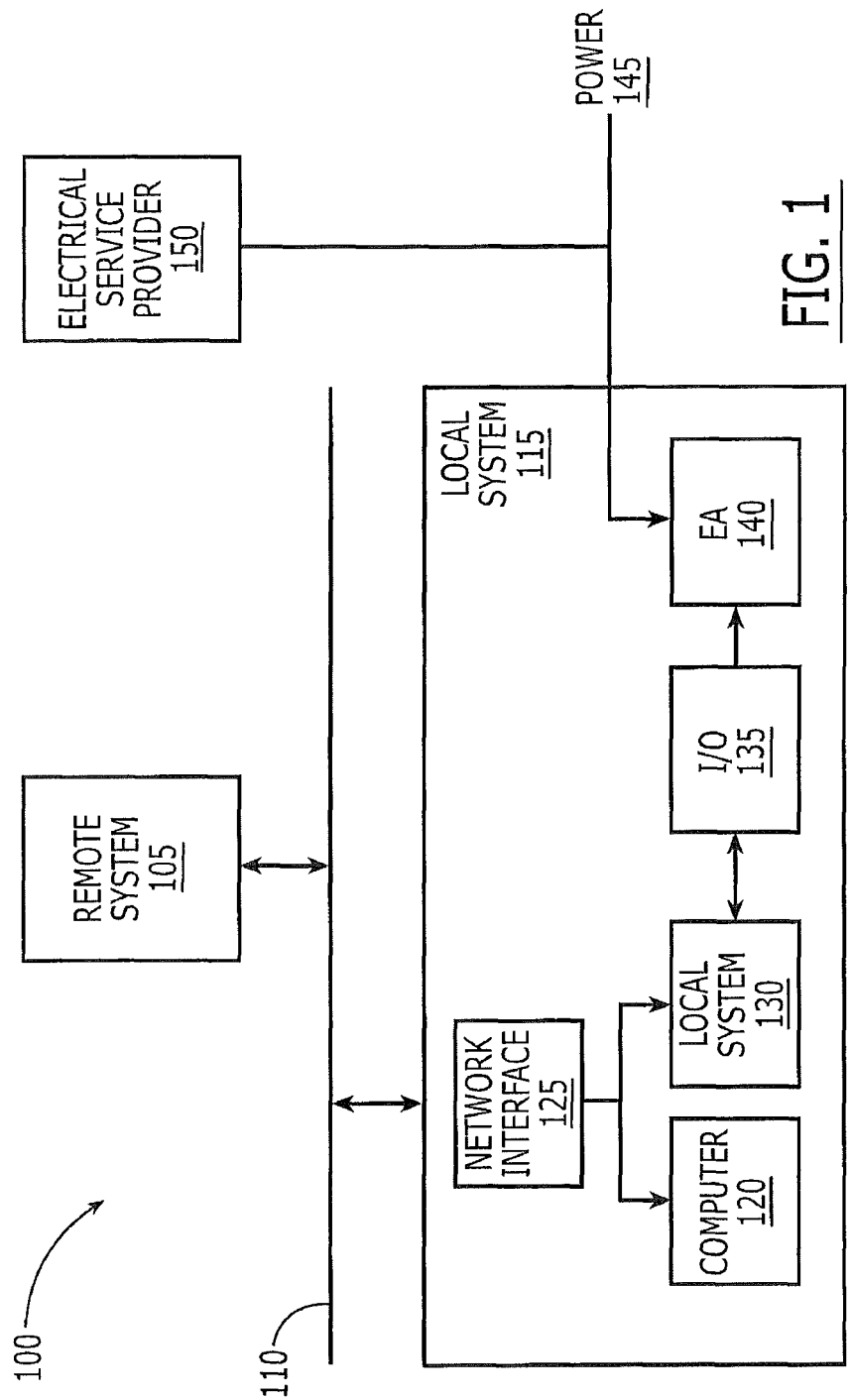

|  | CURRENT STATUS | PREVIOUS STATUS |
|---|---|---|
| H/P 1 | | |
| H/P 2 | | |
| A/C 1 | | |
| A/C 2 | | |
| ⋮ | | |

Supply

| Time | Base Plant | Wind | Ref | Randomizer |
|---|---|---|---|---|
| 1 | 4 | 1.8 | 2 | -0.17 |
| 2 | 4 | 3.1 | 3 | 0.11 |
| 3 | 4 | 3.7 | 4 | -0.35 |
| 4 | 4 | 5.4 | 5 | 0.39 |
| 5 | 4 | 4.1 | 4 | 0.09 |
| 6 | 4 | 4.2 | 4 | 0.16 |
| 7 | 4 | 3.0 | 3 | -0.02 |
| 8 | 4 | 4.2 | 4 | 0.18 |
| 9 | 4 | 3.2 | 3 | 0.21 |
| 10 | 4 | 3.6 | 4 | -0.40 |

FIG. 25

Demand

| Time | Demand | Water Heater Demand | # of Water Heaters On-Line |
|---|---|---|---|
| 1 | 5 | 0.8 | 1848 |
| 2 | 5.5 | 1.6 | 3576 |
| 3 | 7.5 | 0.2 | 335 |
| 4 | 7 | 2.4 | 5308 |
| 5 | 7.5 | 0.6 | 1311 |
| 6 | 7 | 1.2 | 2573 |
| 7 | 6.5 | 0.5 | 1065 |
| 8 | 7 | 1.2 | 2618 |
| 9 | 6.5 | 0.7 | 1585 |
| 10 | 7 | 0.6 | 1334 |

FIG. 26

| Demand Time | Randomized Demand | Customer Demand | WATER HEATERS | | | TOTAL | | LOWERING DEMAND | | RAISING DEMAND |
|---|---|---|---|---|---|---|---|---|---|---|
| | | | Base Water Heaters | Extra Water Heaters | Calculated Water Heater Demand For S/D Balance | # of Water Heaters On-Line | | Below Base Demand | Base Demand | Above Base Demand |
| 1 | 8.7 | 9 | 0.42 | - | 0.4 | 93,372 | | 93,372 | - | - |
| 2 | 10.5 | 10.5 | 0.45 | 0.18 | 0.6 | 140,645 | | - | 100,000 | 40,645 |
| 3 | 11.8 | 12 | 0.45 | 0.36 | 0.8 | 179,369 | | - | 100,000 | 79,369 |
| 4 | 13.9 | 14 | 0.32 | - | 0.3 | 72,147 | | 72,147 | - | - |
| 5 | 12.8 | 13 | 0.29 | - | 0.3 | 64,465 | | 64,465 | - | - |
| 6 | 14.3 | 14 | 0.45 | 0.11 | 0.6 | 125,212 | | - | 100,000 | 25,212 |
| 7 | 15.3 | 15 | 0.00 | - | 0.0 | 539 | | 539 | - | - |
| 8 | 11.8 | 12 | 0.45 | 0.45 | 0.9 | 198,969 | | - | 100,000 | 98,969 |
| 9 | 10.0 | 10 | 0.30 | - | 0.3 | 67,052 | | 67,052 | - | - |
| 10 | 9.3 | 9 | 0.05 | - | 0.0 | 10,588 | | 10,588 | - | - |

FIG. 27

45 GALLON WATER HEATER    45 GALLON WATER HEATER
                          IN 75 GALLON TANK

METHODS OF REMOTELY MANAGING WATER HEATING UNITS IN A WATER HEATER

CROSS-REFERENCE TO RELATED APPLICATIONS

This application claims priority to U.S. Provisional Patent Application No. 61/714,981, filed Oct. 17, 2012, and to U.S. Provisional Patent Application No. 61/856,260, filed Jul. 19, 2013, and to U.S. patent application Ser. No. 12/687,683, filed Jan. 14, 2010, and to U.S. patent application Ser. No. 13/399,698 filed Feb. 17, 2012, and to U.S. Pat. No. 8,121,742 filed Jun. 20, 2008, and to U.S. Provisional Patent Application No. 61/886,591, filed Oct. 3, 2013. The disclosures of each of the above referenced applications are hereby incorporated herein in their entirety by reference.

FIELD OF THE INVENTION

The invention relates to the field of electrical systems in general, and more particularly, to power systems management.

BACKGROUND

One problem faced by electrical service providers is the peak demand for electricity during certain time periods, such as during extremely hot or cold weather. Traditionally, electrical service providers meet this peak demand by purchasing expensive electricity from the power grid or, in extreme cases reduce service to entire neighborhoods or sectors of a grid, thereby totally eliminating or coarsely reducing the load.

Another approach is to reduce peak demand by eliminating or reducing the demand from some electrical appliances, such as heating units, air conditioners, and/or water heaters, while leaving other devices, such as lights and small appliances, operating normally. Some Electric providers offer programs where they can shut-off water heaters and air conditioners during peak periods. Such an approach, however, can be an inconvenience to some customers, especially if the offered financial incentives are small.

New approaches, such as real-time pricing for industrial customers, is another demand reducing technique where a financial penalty/reward system is offered to customers who can shift load to times where the electrical service provider can more easily supply it.

If these types of approaches are not effective, the electrical service provider may need to add additional power generation capacity by building new power plants even though the peak demand for power may exceed current capacity by only a small margin.

SUMMARY

Embodiments according to the invention can be used to store generated electrical power that might otherwise be stored in less efficient ways or even go un-stored during times when an imbalance exists between supply and demand on a power grid. For example, it maybe advantageous to maintain the output of an electrical power plant so that it operates at higher efficiency despite the fact that demand for electricity is below the level that is provided at this higher efficiency. The generated electrical power provided by this higher efficiency can be stored at a customer location and used later, when demand may be greater. Storing the generated electrical power for later use during higher demand periods may reduce the load during the period of greater demand so that an existing power plant may more readily meet the demand.

A method of managing electrical power storage can include remotely controlling operation of one of a plurality of water heating units included in a single water heater, separately from controlling a remainder of the plurality of the water heating units, at a customer location in response to a remotely transmitted indication.

Other aspects are also disclosed and claimed herein.

BRIEF DESCRIPTION OF THE DRAWINGS

FIG. 1 is a block diagram that illustrates embodiments of systems for demand management in some embodiments according to the invention.

FIG. 25 is a table that illustrates electrical power generated by the wind farm at different times in some embodiments according to the invention.

FIG. 26 is a table that illustrates a number of water heaters at the customer locations selectively enabled to approximate the total electrical supply available in some embodiments according to the invention.

FIG. 27 is a table that illustrates a number of water heaters remotely enabled as a nominal operating condition so that demand may be adjusted to more readily match supply in some embodiments according to the invention.

DESCRIPTION OF EMBODIMENTS ACCORDING TO THE INVENTION

Figure 2A:
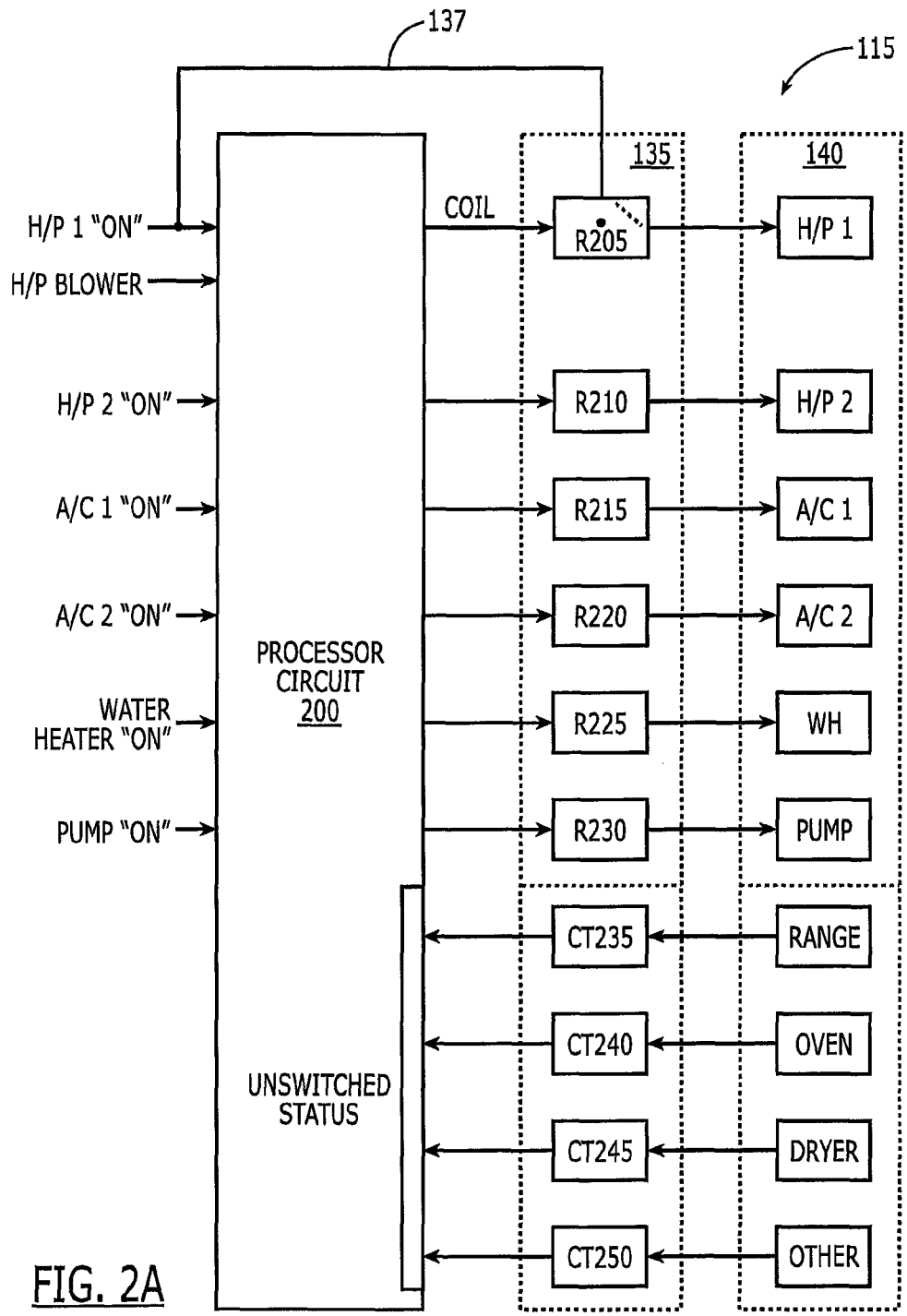
FIG. 2A is a block diagram that illustrates a local system processor circuit providing enable signals to an input/output circuit used to enable/disable electrical appliances in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The invention is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the present invention is not TCP/IP-specific or Internet-specific. The present invention may be embodied using various protocols over various types of computer networks.

It is understood that each block of the illustrations, and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Embodiments according to the invention can operate in a logically separated (or physically separated) client side/server side-computing environment, sometimes referred to hereinafter as a client/server environment. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated.

Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers, A SOAP client can be used to request web services programmatically by a program in lieu of a web browser.

The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

As appreciated by the present inventor, the systems described herein can be utilized according to a time-of-use billing system to allow a reduction in demand for electrical service at a customer location. In particular, time-of-use billing systems have been adopted by electrical service providers to encourage customers to shift usage of electrical appliances to "off peak" times. Off peak usage of electrical appliances can be advantageous to electrical service providers as it may reduce the need for the electrical service provider to increase peak power production by, for example, adding capacity to their power generation grid.

As appreciated by those skilled in the art, electrical service providers may not typically store electricity generated at one time for use at a later time. Accordingly, one of the issues faced by electrical service providers is to provide electrical service that can meet the peak demand requirements of the grid that the electrical service provider supplies.

Therefore, in some embodiments according to the invention, the systems, circuits, computer program products, and methods described herein can be used to time shift or otherwise control different electrical appliances to reduce overlapping activation and operating times of those different electrical appliances during a time interval, which is monitored by the electrical service provider for billing under the time-of-use billing arrangement. More specifically, in a time-of-use billing arrangement, the electrical service provider will measure the maximum amount of power used during pre-determined time intervals, such as 15 minute intervals, over a specified period for which the customer is billed (e.g., a month).

Therefore, as appreciated by the present inventor, significant reductions in demand during these time intervals may be achieved by reducing the overlapping activation time of different electrical appliances that are located at a single customer location. For example, in some embodiments according to the invention, two electrical appliances (such as two different heat pumps at a single customer location) can be controlled so that the activation of each of the respective heat pumps is shifted with respect to one another. Accordingly, time shifting the activation of the different heat pumps can reduce the likelihood that both heat pumps are active during the same on-peak time intervals, where the electrical service provider measures the maximum demand for electrical service for the purposes of billing.

These approaches may provide both a cost reduction for the customer as well as the benefit to the electrical service provider by allowing a further reduction in the peak demand capacity required for the grid. In particular, the electrical service provider may further reduce the peak capacity of their power generation as both heat pumps are less likely to be activated at the same time (i.e., during peak demand).

As described hereinbelow in greater detail, reducing the overlapping activation time of different electrical appliances at a single customer location can be provided by, for example, time shifting the activation of the different electrical appliances into different time intervals by manipulating the activation of one or more of the electrical appliances to shift the operation thereof to a time interval when other electrical appliances are disabled. For example, in some embodiments according to the invention, two heat pumps can be run simultaneously (during off peak hours) to determine the rate at which each of the respective heat pumps heats the corresponding living space at the single customer location. The rate at which those respective living spaces cool after the heat pumps are disabled can also be determined. These rates of heating/cooling can be used to determine a time at which one of the heat pumps can be prematurely deactivated so that by the time the respective living space cools to a point where it should be reheated, the other heat pump has heated the other living sufficiently and will switch off. Therefore, the two heat pumps can operate during two different time intervals (with reduced overlapping activation times).

In still other embodiments according to the invention, the heat pumps described above can be controlled to be active during different time intervals by providing respective enablement signals to allow the coupling/decoupling of power to the heat pumps. For example, in some embodiments according to the invention, both heat pumps may request activation, but only one may be enabled for activation (such as the higher priority heat pump) while the other heat pump waits until the higher priority heat pump is allowed to heat the respective living space adequately. Subsequently, the second heat pump can be enabled for activation while the higher priority heat pump is disabled.

In other embodiments according to the invention, the systems, methods, and computer program products described herein can be provided as part of a distributed system including a remote system and a local system (at the single customer location). Accordingly, the local system can receive requests from the different electrical appliances at the single customer location and transmit messages to the remote system via a network. The remote system can respond to the request messages with response messages either granting or denying the requests made by the respective electrical appliances.

The local system can receive the response messages and provide enablement signals to an input/output circuit which can control the coupling/decoupling of power to the respective electrical appliances. For example, in some embodiments according to the invention, a thermostat controlling a heat pump may signal the local system that the living space to which the heat pump is coupled should be heated. The local system can respond by transmitting a message to a remote system which can determine whether the request from the heat pump should be fulfilled while reducing overlapping activation time of different electrical appliances (such as other heat pumps or water heaters located at the same customer location which may be currently on or may later request activation).

If the remote system determines that the request from the heat pump should be fulfilled, the remote system can transmit a response message to the local system indicating that the local system should enable the heat pump for activation. Upon receiving the response message, the local system can assert an enablement signal to an input/output circuit associated with the heat pump. The enablement signal can control the respective input/output circuit to couple electrical power from the electrical service provider to the heat pump. Accordingly, the determinations of which electrical appliances should be enabled for activation and which electrical appliances should be disabled for activation can be determined by the remote system.

FIG. 1 is a block diagram that illustrates local and remote systems for reducing overlapping activation times of different electrical appliances at a single customer location in some embodiments according to the invention. As shown in FIG. 1, a system 100 can include both a local system 115 and a remote system 105, which can communicate with one another over a network 110. It will be understood that the network 110 can be any type of communications network that allows messaging between the local system 115 and the remote system 105. For example, the network 110 can be the Internet, an Intranet, a public switched telephone network, or a wireless communications network. The network 110 can also be a combination of these components.

The remote system 105 can provide a demand management server which can make determinations of when different electrical appliances located at the single customer location should be enabled/disabled to reduce overlapping activation times. In particular, the demand management server can make the determinations of which electrical appliances are to be enabled/disabled based on, for example, messages received from the local system 115, that indicate which electrical appliances are requesting activation.

The demand management server can be controlled by a user (such as the customer associated with a single customer location) via an interface so that the user can customize the controls provided to the demand management server to reduce the overlapping activation times. For example, the demand management server can allow the user to specify a comfort level for the single customer location where a higher comfort level allows the demand management server to increase overlapping activation times to increase the relative comfort of the environment at the single customer location. In contrast, a lower comfort setting can indicate that the demand management server can be more aggressive by further reducing the overlapping activation times to make the environment relatively less comfortable in the interest of allowing reductions in the cost of the electrical service provided to the single customer location.

It will be understood that the interface to the demand management server can be accessed via a computer 120 associated with the single customer location. It will be understood that the computer 120 can be any computer whether located at the single customer location or remote therefrom. For example, the computer 120 can actually be a computer system located in a different city than the single customer location so that the user can adjust the settings used by the demand management server while the customer is traveling for an extended period of time. Alternatively, the computer 120 can be located at the single customer location. In still other embodiments according to the invention, the computer 120 can actually be a system which is less capable than a general purpose computer system, such as a telephone, or other electronic device which can still provide an interface to the demand management server.

As further shown in FIG. 1, the computer 120 can access the network 110 through a network interface circuit 125 (such as a router/cable modem) typically provided by a broadband service to allow access for the computer 120 to the Internet. In other words, in some embodiments according to the invention, the communication between the local system 115 and the remote system 105 (as well as the computer 120) can be provided by a standard broadband connection to the Internet.

As further shown in FIG. 1, the local system 115 includes a local processor circuit 130 connected to the network interface circuit 125 and an input/output (I/O) circuit 135. The local processor circuit 130 can operate to receive requests from electrical appliances requesting activation. For example, the local processor circuit 130 can receive signals from thermostats associated with heat pumps, air conditioners, etc. that would otherwise activate the respective electrical appliances without any further intervention. However, in some embodiments according to the invention, the request from the respective electrical appliance is provided to the local processor circuit 130. The local processor circuit 130 can then formulate messages for transmission to the remote system 105 via the network 110 indicating that the respective electrical appliance is requesting activation.

If the remote system 105 determines that the requesting electrical appliance is to be enabled for activation, a response message 105 can be transmitted to the local processor circuit 130, whereupon the local processor circuit 130 can assert an enablement signal to the input/output circuit 135 to couple electrical power 145 provided by an electrical service provider 150 to an electrical appliance 140.

It will be understood that the electrical service provider can be an electric utility company which owns and operates large scale power generating plants for delivery to the power grid to which the single customer location is connected. However, it will be understood that the electrical service provider 150 can be any entity that provides electrical service to the single customer location and is not necessarily limited to those entities that own and operate electrical power generation facilities.

It will be further understood that although the determinations described herein to reduce the overlapping activation of different electrical appliances located at a single customer location are described as being made the demand management server at the remote system 105, in some embodiments according to the invention, some or part of the determinations can be made by the local system 115. For example, in some embodiments according to the invention, the local system 115 can operate independent of the remote system 105 when the local system 115 is unable to communicate with the remote system 105. For example, during periods when the network 110 is out of operation, the local system 115 may operate the electrical appliances 140 based on a simple set of rules that are stored locally for access by the local processor circuit 130.

In some embodiments according to the invention, the local processor circuit 130 may access a nonvolatile memory system that stores instructions for the local processor circuit 130 which, when executed by the local processor circuit 130, provide relatively simple control of the electrical appliances 140, which may still reduce overlapping activation times. For example, the local processor circuit 130 may enable the different electrical appliances on a round robin basis in different time intervals until the local system 115 is able to re-establish communication with the remote system 105.

It will be also understood that the term "electrical appliance" as used herein refers to any electrical appliance that can demand a substantial amount of electrical power for operation. For example, an electrical appliance can include an electric heat pump, an electric air conditioner, an electric water heater, an electric pump and/or an electrical appliance that includes a pump, such as a pump used to operate a pool or spa. These types of electrical appliances are also sometimes referred to herein as "switched" electrical appliances.

The electrical appliance can also include a transient electrical appliance that demands a substantial amount of electrical power for operation, such as an electric range, an electric oven, an electric clothes dryer and/or an electric fan or blower, any of which are sometimes referred to herein as un-switched electrical appliances. It will be further understood that any combination of these electrical appliances can be included at the single customer location and controlled by the local system 115.

FIG. 2A is a block diagram that illustrates a local processor circuit 200 coupled to the input/output circuit 135 and electrical appliances 140 shown in FIG. 1, in some embodiments according to the invention. According to FIG. 2A, the processor circuit 200 receives requests from the switched electrical appliances (such as heat pumps, air conditions, water heaters, etc.) which indicate that the respective electrical appliance should be switched on responsive to some environmental parameter. For example, the environmental parameter can be an indication from a thermostat associated with a heat pump signaling that the measured temperature in the associated living space has reached a lower limit and, therefore, the heat pump should be activated to begin heating the living space. In some embodiments according to the invention, the processor circuit 200 can be an MC9S12NE64 microprocessor marketed by FreeScale® of Austin, Tex., which includes onboard memory (such as RAM, ROM, flash, etc.), I/O circuits, analog to digital converters, as well as a physical and/or wireless connection to an Ethernet network.

According to FIG. 2A, each of the switched electrical appliances can have an associated request provided to the processor circuit 200, where each indicates a request for activation from, for example, a thermostat associated with the respective electrical appliance. It will be understood that these switched request inputs from the electrical appliances can be provided to the processor circuit 200 directly or indirectly, including wired or wireless transmission, to an analog to digital converter circuit (not shown). Alternatively, the analog to digital converter circuit can be included in the processor circuit 200 itself, such as at an input stage of the processor circuit 200.

The processor circuit 200 is also coupled to relays (R205, R210, R215, R220, R225, and R230) via respective enablement signals corresponding to each of the requests received from the electrical appliances. For example, the processor circuit 200 provides an enablement signal to relay R205 that is used to enable/disable the activation of heat pump 1. The enablement signal provided to the relay R205 can cause the contacts of the relay R205 to be configured to couple a request (H/P 1 "ON" 137) from thermostat to the heat pump. Similarly, each of the remaining relays is also provided with a respective enablement signal from the processor circuit 200 that is intended to control the respective electrical appliance which provided the associated request. Accordingly, each of the electrical appliances having a thermostat associated therewith can be activated/deactivated responsive to a corresponding relay providing the activation/deactivation signal from the associated thermostat. Accordingly, although not shown explicitly in FIG. 2A, each of the relays coupled to the switched electrical appliances can provide an associated request from the corresponding thermostat controlling the switched electrical appliance.

In some alternative embodiments according to the invention, the relays R205-230 are provided with electrical power 145, which can be coupled/decoupled to the respective electrical appliance responsive to the corresponding enablement signal from the processor circuit 200. For example, electrical power 145 can be coupled to the heat pump 1 responsive to an enablement signal to the relay 8205 responsive to a request from a thermostat associated with heat pump 1 provided to the processor circuit 200. It will be understood that the enablement signals provided by the processor circuit 200 can undergo a digital to analog conversion before being provided to the respective relays R205-230 so that the processor circuit 200 can provide adequate control.

Figure 2B:
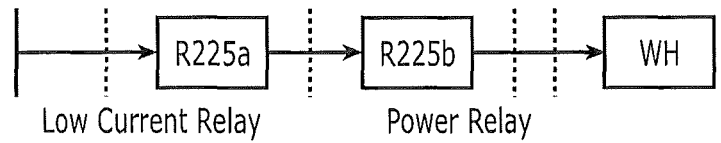
FIG. 2B is a block diagram that illustrates the relay circuits shown in FIG. 2A, including a low current relay and a power relay in some embodiments according to the invention.

Moreover, relays which control relatively high power electrical appliances (such as a water heaters), can include a low current relay configured to drive a high power relay as shown, for example, in FIG. 2B. As shown in FIG. 2B, the relay 225 configured to couple/decouple power to the water heater can include a low current relay 225a that is connected in series with a higher power relay 225b, which in-turn is configured to couple/decouple power to/from the water heater.

It will further be understood that the relays R205-230 can be configured to remain in a closed position in the absence of any input from the processor circuit 200. For example, if the processor circuit 200 goes off-line, fails, or is otherwise unable to communicate with the remote system 105 so that no determinations can be provided regarding which electrical appliances are to be enabled/disabled, the relays 205-230 can remain in a state that statically couples the power 145 to each of the electrical appliances. Accordingly, continuous electrical service may be provided to the single customer location uninterrupted despite the suspension of the determination to reduce overlapping activation times of the different electrical appliances.

It will further be understood that the relays 205-230 can refer to two or more relays coupled together to facilitate the control of the processor circuit 200 over the switched electrical appliances, as shown in FIG. 2B. For example, the relays can actually refer to a power relay that is suitable for coupling/decoupling of substantial amounts of current to/from the electrical appliance connected to a relatively lower power relay that is more suited for operation by the processor circuit 200.

It will further be understood that although each of the switched inputs provided to the processor circuit 200 are illustrated as being the same, each of the inputs may call for separate signal conditioning based on, for example, the voltage levels over which the respective signal operates. For example, the request from the water heater may operate over relatively high voltage levels due to the nature of the switches integrated into the hot water heater for the operation thereof. Accordingly, the request from the hot water heater may undergo conditioning so that the voltage levels provided to the processor circuit 200 are adequate. Furthermore, the switched requests from the electrical appliances may be optically coupled to the processor circuit 200 to provide adequate isolation between the electrical appliance and the processor circuit 200.

The processor circuit 200 also receives inputs from transient un-switched electrical appliances, such as an electric range, an electric oven, an electric dryer, and/or an electric blower or fan. The inputs from these un-switched electrical appliances can take the form of signals indicating that the respective electrical appliance is in operation. For example, the processor circuit 200 can receive a signal indicating that an electric range has been switched on, which is provided via a current transformer 235. Similarly, each of the other un-switched electrical appliances can be associated with a respective current transformer 240, 245, and 250, each of which provide an indication to the processor circuit 200 that the respective un-switched electrical appliance is in operation.

The processor circuit 200 can use these indications of un-switched electrical appliance activation as the basis of messages to the remote system 105. In accordance, the remote system 105 may respond to the message from the processor circuit 200 that an un-switched electrical appliances is currently in operation by transmitting a response message to the processor circuit 200 indicating that one or more of the switched electrical appliances should be disabled.

It will further be understood that the inputs provided from the current transformers 235-250 can undergo signal conditioning (such as analog to digital conversion) as described above in reference to the requests from the switched electrical appliances. In some embodiments according to the invention, the analog to digital conversion for the inputs provided by the current transformers may be different than the analog to digital conversion provided for the inputs from the switched electrical appliances.

Figure 3:
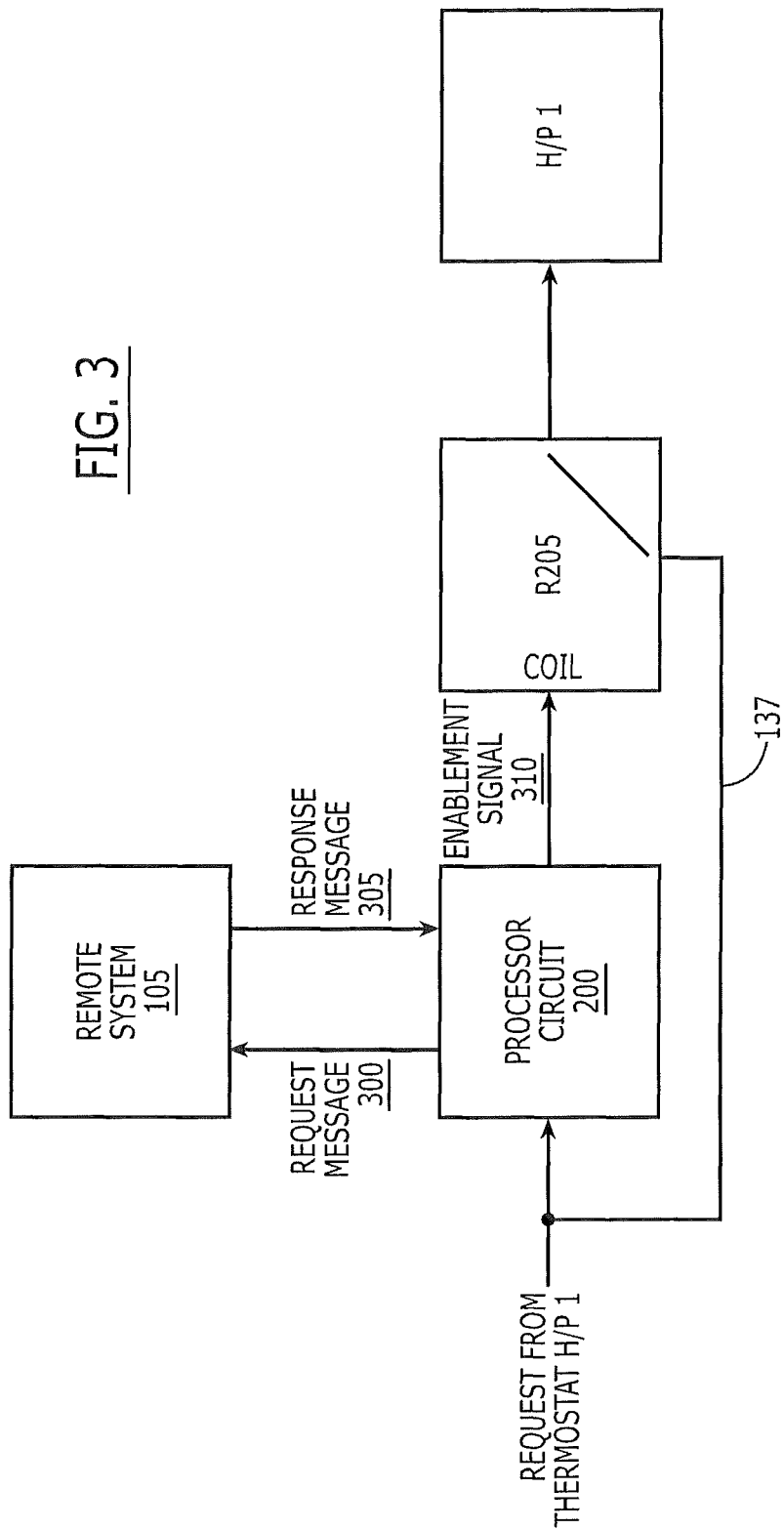
FIG. 3 is a block diagram that illustrates message traffic between a local system processor circuit and a remote system in response to requests to enable/disable the respective electrical appliances by coupling/decoupling power thereto in some embodiments according to the invention.

FIG. 3 is a block diagram that illustrates processing of messages by the demand management server/remote system 105 and the processor circuit 200 located at the single customer location in response to requests from electrical appliances in some embodiments according to the invention. According to FIG. 3, the processor circuit 200 receives a request from a thermostat associated with a heat pump 1 indicating that an environmental parameter (e.g., temperature) has reached a lower operating level so that the living space should be heated by heat pump 1.

In some embodiments according to the invention, the processor circuit 200 formulates a message request 300 to the remote system 105 including a payload that indicates which electrical appliance (i.e., heat pump 1) has requested activation. It will be understood that the payload of the request message 300 can include additional information beyond the identity of the electrical appliance requesting activation.

If the remote system 105 determines that heat pump 1 should be activated, the response system 105 transmits a response message 305 to the processor circuit 200. Upon receipt of the response message 305, the processor circuit 200 asserts an enablement signal 310 to the relay 8205 that couples the request from the thermostat to heat pump 1. It will be further understood that the remote system 105 can subsequently determine that heat pump 1 should be deactivated whereupon a response message 305 is sent to the processor circuit 200 indicating that the enablement signal 310 should be deactivated. In response, the relay 8205 is reset so that the request from the thermostat is decoupled from the heat pump 1. In still other embodiments according to the invention, the response message 305 that caused the heat pump 1 to be activated can also include an indication of when the heat pump should be disabled by the processor circuit 200, to thereby reduce the need for additional messages.

The demand management server can control the different electrical appliances based on the nature of the specific electrical appliance requesting activation as well as general rules regarding off-peak and on-peak time intervals. For example, the demand management sever can operate so that during off peak time intervals, little or no effort can be made to reduce overlapping activation times as the demand during off-peak hours may not be critical to electrical service providers and, moreover, is not used to determine maximum power usage for time of use billing.

During on-peak time intervals, the demand management server may operate each of the electrical appliances differently during each of the time intervals. For example, during on-peak time intervals, the demand management server may operate water heaters with a default setting that such heaters are only enabled for activation when no other electrical appliances are active. In some embodiments according to the invention, the demand management server can operate so that electric water heaters are enabled for activation for only a portion of every time interval, and further, can be enabled for activation based on what other electrical appliances are currently enabled. For example, the electric hot water heater may be assigned a relatively low priority so that other electrical appliances will be enabled for activation before the electric hot water heater.

The demand management server/remote system 105 can operate heat pumps and air conditioners according to a prioritization scheme during on-peak intervals so that certain living spaces known to be used more during the peak time intervals have priority over other living areas. For example, the living area of a house including the bedrooms may have lower priority during peak hours during colder months of the year as these rooms are typically not used significantly during the peak time intervals. In some embodiments according to the invention, the demand management server can control the maximum amount of time that heat pumps and air conditioners are allowed to run during any time interval. For example, the demand management server may limit the maximum run time to one-half of a time interval. Furthermore, in some embodiments according to the invention, the demand management server can operate the heat pumps and/or air conditioners so that a minimum time between enablement or activations is observed. For example, the demand management server may operate heat pumps/air conditioners so that the high priority living space is provided with service more frequently than less important living spaces. In still other embodiments according to the invention, the demand management server may toggle the priority of the living spaces or assign the priority in a round-robin type scheduling.

Referring to FIGS. 2 and 3, the demand management server can monitor operations of the electrical appliances to collect performance data. The performance data may be used to provide service notices to, for example, the customer. For example, the demand management server can monitor a heat pump's air handling blower fan's operation (on/off time etc.) to notify the customer that air filters may need to be changed. In particular, the blower fan can be monitored by tapping the corresponding thermostat wire that provides an indication to the processor circuit 200 regarding the operation of the blower. Accordingly, the processor circuit 200 can monitor the periodic operation of the blower and formulate request messages 300 to the remote system 105 which indicates the usage of the blower. Such information may be used by the remote system to signal when periodic maintenance should be provided to the system in which the blower is included.

In still further embodiments according to the invention, the demand management server can monitor requests from particular electrical appliances to determine whether the respective electrical appliance is operating as expected. For example, the remote system 105 may determine that heat pump 1 is experiencing potential problems due to either the number of request messages 300 requesting activation of heat pump 1 or the duration that the heat pump is running during uncontrolled off peak hours is different then expected. The remote system 105 may determine that (based, for example, on the number of times that heat pump 1 has been cycled to date) that heat pump 1 may require service. The remote system 105 may also determine that heat pump 1 may require service based on the time needed to heat the associated living space with reference to an outside temperature. Alternatively, the remote system 105 may determine that the heat pump 1 is likely experiencing some undiagnosed problem such as a leak which may affect the efficiency of heat pump 1.

In still further embodiments according to the invention, the demand management server may monitor the time elapsed between a request for activation and the time at which the request from heat pump 1 is removed. In particular, the demand management server may determine historic data regarding the performance of heat pump 1. For example, the demand management server may collect historic data that indicates that heat pump 1 has, on average, taken an approximate amount of time to heat the associated living space to a desired temperature. Over time, the demand management server may further determine that the time between the initiation of a request from heat pump 1 and the removal of the request from heat pump 1 has increased (indicating that the upper temperature limit associated with the thermostat has been reached) thereby indicating that heat pump 1 may be experiencing a loss in efficiency due to the increased time needed to heat the living space to the desired upper temperature limit. Although the operations described above reference the operation of a heat pump and a blower, it will be understood that similar types of monitoring may be provided for other electrical appliances such as air conditioners, hot water heaters, pumps, etc.

In some embodiments according to the invention, messages between the local and remote systems can be structured according to any format that allows the transmission thereof over the network(s) described herein. For example, the message format can be that of an ICMP message, which is are described in the RFC 792 specification located on the Internet at http://www.faqs.org/rfcs/rfc792.html. The disclosure of RFC 792 is hereby incorporated herein by reference in its entirety. Other message structures, such as UDP, TCP/IP, IGMP, ARP, and RARP, can also be used.

The messages may also be transmitted wirelessly using, for example, Short Message Service (SMS) or Enhanced Message Service (EMS) formatted messages, Multimedia Message Service (MMS), and/or Smartmessaging™ formatted messages. As is known to those skilled in the art, SMS and EMS messages can be transmitted on digital networks, such as GSM networks, allowing relatively small text messages (for example, 160 characters in size) to be sent and received via the network operator's message center to the mobile device 20, or from the Internet, using a so-called SMS (or EMS) "gateway" website. Accordingly, if either the local or remote system is off-line, the SMS messages (or commands) can be stored by the network, and delivered later when the respective system is on-line again.

MMS is a messaging system for asynchronous messaging, which is based on the SMS standard, but which enables communication of messages containing "rich media" content, i.e., content of types that tend to be more data-intensive than text. MMS is standardized by the WAP Forum and the Third-Generation Partnership Project (3GPP) and is described in: "WAP MMS, Architecture Overview," WAP-205, WAP Forum (Approved Version Apr. 25, 2001); "WAP MMS, Client Transactions Specification," WAP-206, WAP Forum (Approved Version Jan. 15, 2002); "WAP MMS, Encapsulation Specification," WAP-209, WAP Forum (Approved Version Jan. 5, 2002); "Requirements", 3GPP specification 22.140; and "Architecture and Functionality," 3GPP specification 23.140.

Figures 4, 5:
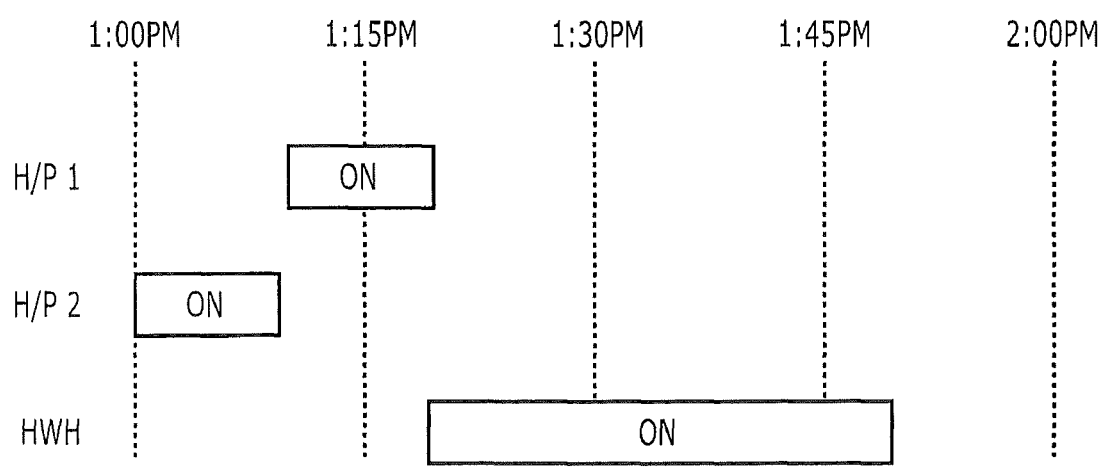
FIG. 4 is a table that illustrates state information related to the current status and previous status of selected electrical appliances in some embodiments according to the invention.
FIG. 5 is a timeline illustrating enablement/disablement of respective electrical appliances in some embodiments according to the invention.

FIG. 4 is a table that illustrates status information that may be maintained by the demand management server for use in determining whether enablement of a particular appliance should be provided by the processor circuit 200. In particular, the demand management server can record which of the electrical appliances is currently on and which of the electrical appliances was previously on during the current time interval. For example, the demand management server can monitor request messages from the processor circuit 200 to determine that heat pump 1 is currently on but has not previously been on during the current time interval. Furthermore, messages from the processor circuit 200 can indicate that heat pump 1 is not currently on but was previously on during the current time interval. Similar data can be recorded for the other electrical appliances.

FIG. 5 is a timeline that illustrates activation of electrical appliances located at the single customer location so as to reduce overlapping activation times thereof during time intervals of the day. According to FIG. 5, heat pump 2 (H/P 2) is enabled for activation at approximately 1:00 p.m. and disabled for activation at about 1:10 p.m. Subsequent to the disablement of heat pump 2, heat pump 1 (H/P 1) is enabled for activation until about 1:20, whereupon heat pump 1 is disabled. Subsequent to the disablement of heat pump 1, the hot water heater (WH) is enabled for activation through approximately 1:50 p.m. Therefore, as shown in FIG. 5, the electrical appliances HP1, HP2, and WH are enabled for activation during different time intervals so as to reduce the overlapping activation time thereof.

It will be understood that the time interval as defined in FIG. 5 includes any time interval for which one of the electrical appliances is enabled for activation. For example, the time interval for H/P2 is the time between 1:00 p.m. and 1:10 p.m., whereas the time interval for H/P1 is about 1:10 p.m. to about 1:20 p.m. Accordingly, none of the electrical appliances is activated during overlapping time intervals, which may allow a reduction in the demand associated with the single customer location serviced by the electrical service provider.

Figure 6:
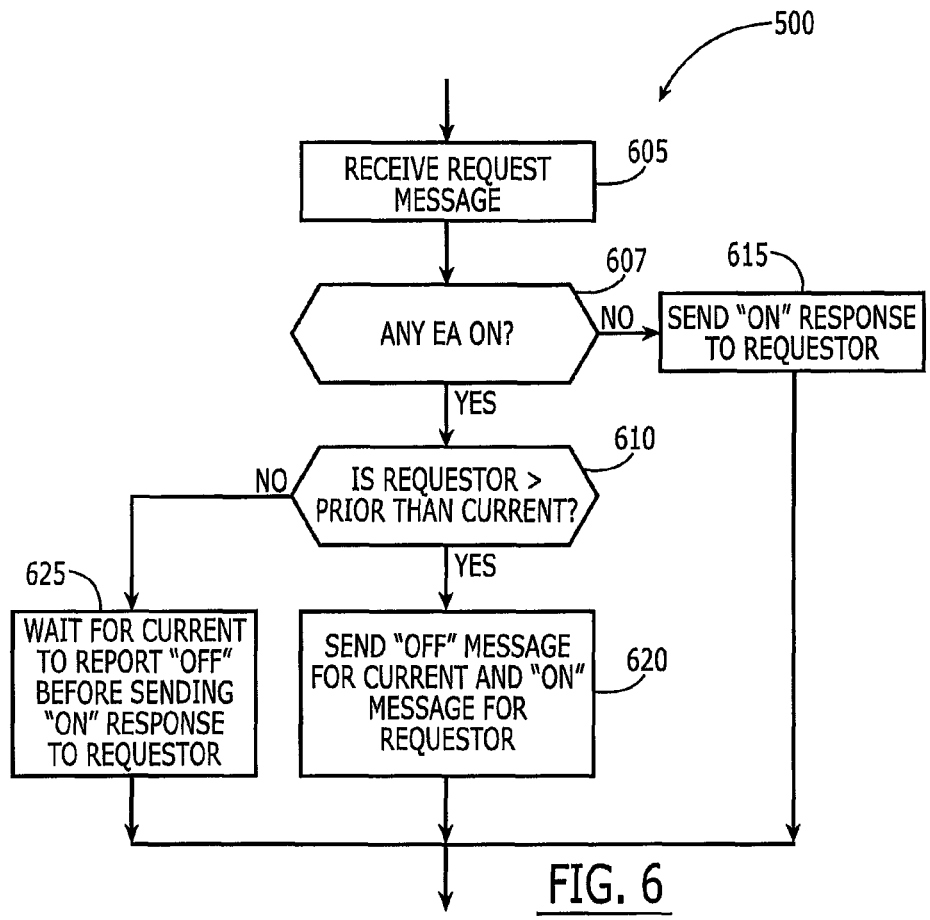
FIG. 6 is a flowchart that illustrates operations of local and remote systems according to the timeline illustrated in FIG. 5 in some embodiments according to the invention.

FIG. 6 is a flowchart that illustrates operations of local and remote systems according to the timeline illustrated in FIG. 5 in some embodiments according to the invention. Referring to FIGS. 3-6, a request from an electrical appliance (EA) is received at the processor circuit 200, whereupon the processor circuit 200 transmits a request message 300 to the demand management server (block 605). The demand management server accesses the table shown in FIG. 4 to determine if any of the appliances are currently enabled at the single customer location (block 607). If no electrical appliances are currently enabled for activation at the single customer location (block 607), the remote system 105 transmits a response message 305 indicating that the processor circuit 200 is to enable the requesting electrical appliance for activation by asserting the enablement signal 310 (block 615), and then returns to a state awaiting a new request from an electrical appliance.

If, however, at least one of the other electrical appliances at the single customer location is currently enabled for activation at the single customer location (block 607), the demand management server determines if the requesting electrical appliance has a greater priority than the electrical appliance that is currently enabled for activation (block 610). If the requesting electrical appliance has a lower priority than the currently enabled electrical appliance (block 610), the demand management server waits for the currently enabled electrical appliance to report an off status before sending a response message 305 indicating that the requesting electrical appliance is to be enabled by the processor circuit 200 (block 625), whereupon the demand management server returns to a state awaiting a new request.

If, however, the requesting electrical appliance does have a higher priority than the currently enabled electrical appliance (block 610), the remote system 105 transmits a response message 305 indicating that the currently enabled electrical appliance is to be disabled by the processor circuit 200. Furthermore, the remote system 105 transmits a response message 305 indicating that the processor circuit 200 is to enable the requesting electrical appliance having the higher priority (block 620), whereupon the demand management server returns to a state awaiting a new request.

It will be understood that although the demand management server is described above as sending separate response messages 305 indicating first an off for the currently enabled electrical appliance and a second message indicating enablement of the higher priority requesting electrical appliance, both commands may be included in a single response message in some embodiments according to the invention.

Figure 7:
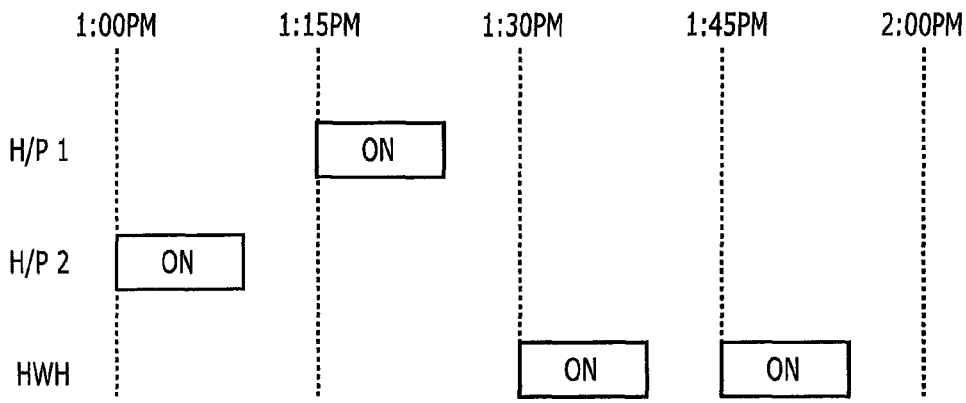
FIG. 7 is a timeline that illustrates enablement/disablement of respective electrical appliances during different time intervals in some embodiments according to the invention.

FIG. 7 is a timeline that illustrates enablement for activation of electrical appliances during different time intervals defined by the electrical service provider in some embodiments according to the invention. According to FIG. 7, electrical appliance H/P 2 is enabled for activation at a time interval beginning at 1:00 p.m. At some time during the first time interval beginning at 1:00 p.m., the electrical appliance H/P 2 is deactivated after reaching an upper operational limit (e.g. upper temperature setting of a thermostat).

As shown in FIG. 7, during the latter part of the first time interval after the deactivation of electrical appliance H/P 2, no other electrical appliances are enabled for activation during that time interval. At the start of the second time interval at about 1:15 p.m., electrical appliance H/P 1 is enabled for activation. Subsequently, during the same time interval beginning at 1:15 p.m., the electrical appliance H/P 1 is deactivated. During a later portion of the second time interval, no other electrical appliance is activated for the remainder of that time interval. As further shown in FIG. 7, the electrical appliance WH is enabled for activation during the third time interval at around 1:30 p.m., and later deactivated during the same time interval. No electrical appliance is activated during the third time interval after the deactivation of the electrical appliance WH. During a fourth time interval beginning at around 1:45 p.m., the electrical appliance WH is again enabled for activation during the subsequent time interval, and is deactivated during the same fourth time interval prior to the end thereof. Accordingly, as shown in FIG. 7, the activation of the different electrical appliances can be controlled so that only one electrical appliance is on during a single time interval.

Although the time interval described in reference to FIG. 7 is defined as 15 minutes, the time interval can be defined by the electrical service provider to be any predetermined time. Moreover, the time interval is defined by the electrical service provider to coincide with the periods during which the electrical service provider measures the maximum amount of power used for the purposes of billing under the time-of-use billing system described herein. Accordingly, the operations shown in FIG. 7 can allow the reduction of overlapping activation times of the different electrical appliances by synchronizing the activation times to the predetermined time intervals defined by the electrical service provider.

Figure 8:
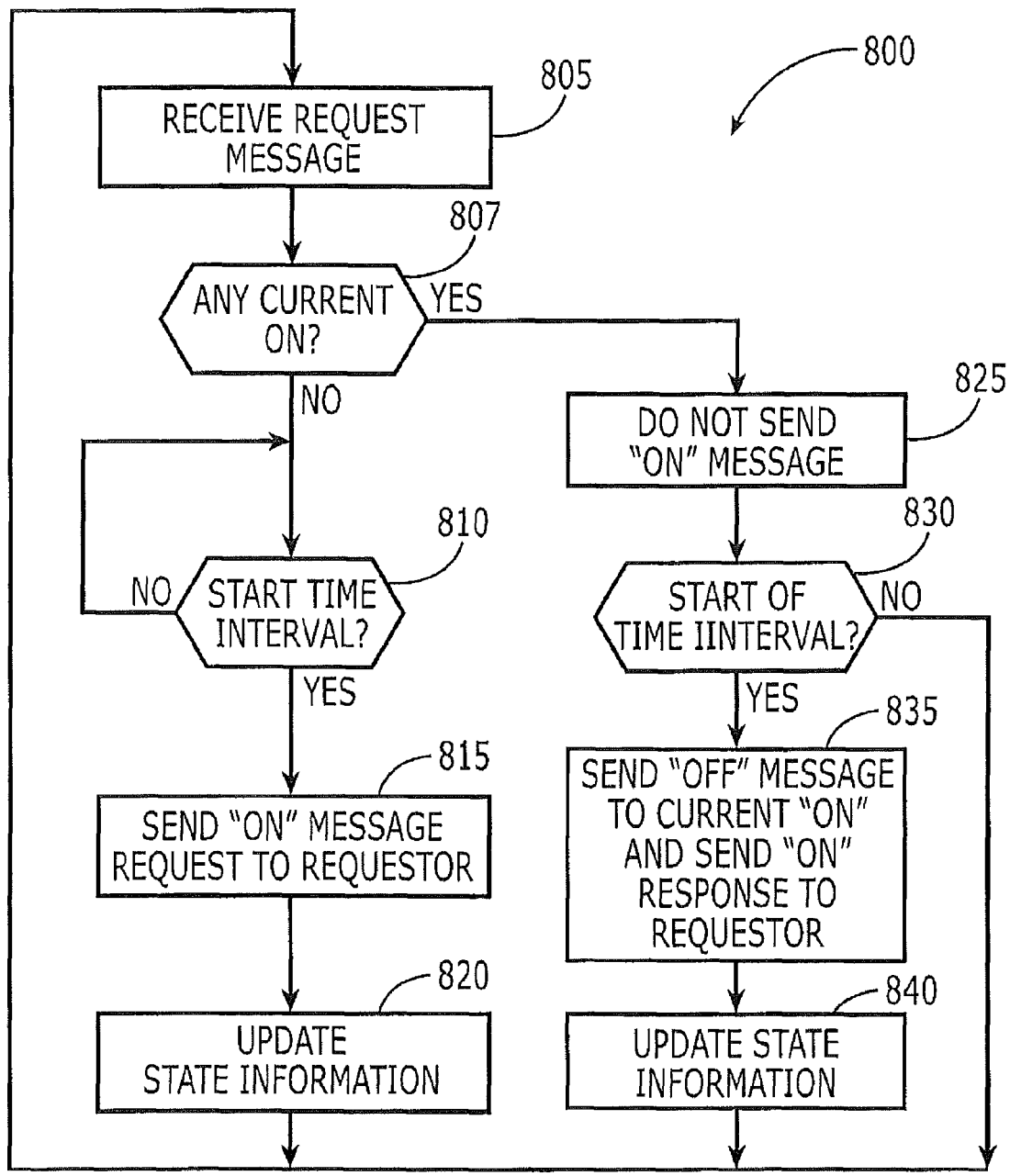
FIG. 8 is a flowchart that illustrates operations of local and remote systems according to the timeline illustrated in FIG. 7 in some embodiments according to the invention.

FIG. 8 is a flowchart that illustrates operations of the systems described herein in accordance with the timeline shown in FIG. 7 in some embodiments according to the invention. According to FIG. 8, a request for activation is received from an electrical appliance and the processor circuit 200 forwards a request message 300 to the remote system 105 (block 805). The demand management server determines if any electrical appliance is currently enabled for activation at the single customer location (block 807). If the demand management server determines that no other electrical appliance is currently enabled for activation (block 807), the demand management server further determines whether the start of a predetermined time interval defined by the electrical service provider has been reached (block 810). If the demand management server determines that the start of the time interval has not been reached (block 810), the demand management server withholds the transmission of response messages until the start of the next time interval.

If however, the demand management server determines that the next time interval has started (block 810), the demand management server sends a response message 305 indicating that the requesting electrical appliance is to be enabled for activation through the processor circuit 200 assertion of the enablement signal 310 (block 815). The demand management server further updates the state table shown in FIG. 4 indicating that the requesting electrical appliance has been enabled for activation at the single customer location (block 820), and returns to a state awaiting another request.

If, however, the demand management server determines that another electrical appliance is currently enabled for activation at the single customer location (block 807), the demand management server withholds a response message 305 indicating that the requesting electrical appliance is to be enabled (block 825). It will be understood that, in some embodiments according to the invention, a response message 305 may be sent, however, the response message 305 may simply be an indication that the request was received while not indicating that the requesting electrical appliance is to be enabled. If the demand management server determines that the start of the next time interval has begun (block 830), a response message 305 is transmitted to the processor circuit 200 indicating that the requesting electrical appliance is to be enabled for activation.

Furthermore, the demand management server transmits a message indicating that the currently on electrical appliance is to be disabled (block 835). The demand management server further updates the state table shown in FIG. 4 to indicate that the currently on electrical appliance has now been disabled and that the requesting electrical appliance has been enabled for activation (block 840). The demand management server then returns to a state awaiting another request for activation.

Figure 9:
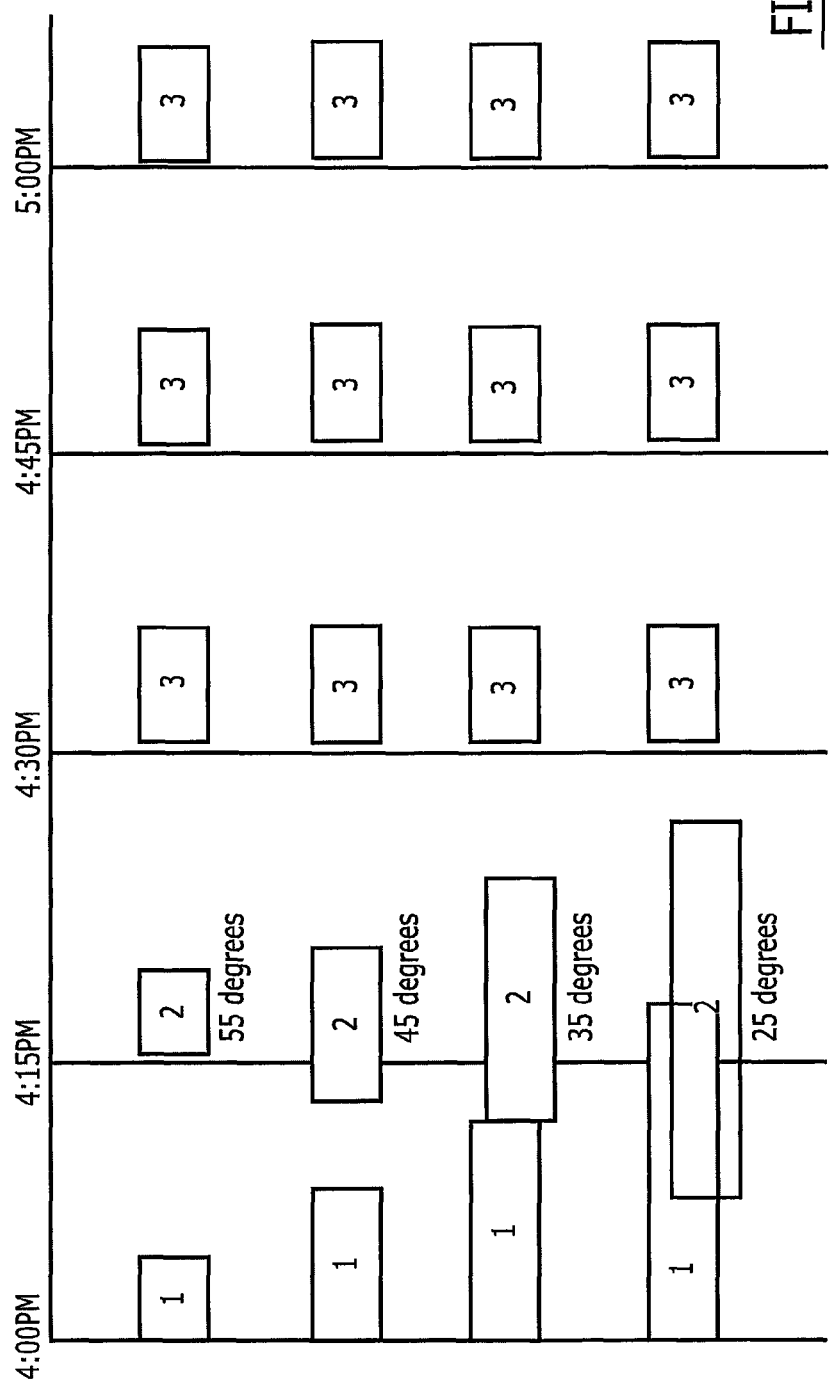
FIG. 9 is a timeline that illustrates enablement/disablement of respective electrical appliances as a function of environmental factors in some embodiments according to the invention.

FIG. 9 is a timeline that illustrates variation in the enablement for activation of electrical appliances in different time intervals and within the same time interval including overlapping times in response to variations in outside temperature in some embodiments according to the invention. According to FIG. 9, when the temperature outside is relatively mild (i.e. 55 degrees), an electrical appliance (such as heat pumps and hot water heaters) can operate as described above in reference to FIGS. 7 and 8 where different electrical appliances are enabled for activation during different time intervals to reduce overlapping activation times.

However, as further shown in FIG. 9, as the outside temperature begins to drop, it may be more difficult to maintain a suitable comfort level inside the single customer location so that some of the electrical appliances may be enabled for activation during a later portion of the same time interval in which another electrical appliance was enabled. For example, as shown in FIG. 9, when the outside temperature decreases to 45 degrees, the second heat pump (2) may be enabled for activation during the first time interval when the first heat pump is also enabled. Although the first and second heat pumps can be enabled during the same time interval, the demand management server may enable the different heat pumps so as to reduce the overlapping activation times by advancing the activation time of the second heat pump from the beginning of the second time interval. In other words, the demand management server can advance the time at which the second heat pump would otherwise be enabled into the first time interval, but also avoid concurrent activation of the second heat pump with the first heat pump.

As further shown in FIG. 9, when the outside temperature is further reduced to 35 degrees, the second heat pump may be activated within the first time interval immediately adjacent to the time at which the first heat pump is disabled. Again, the activation of the second heat pump can be advanced from the start of the second time interval (where the second heat pump would otherwise be enabled) to maintain the comfort level at the single customer location.

When the outside temperature drops to 25 degrees, the first and second heat pumps may operate concurrently during the first time interval, but may still have reduced overlapping activation times as the first heat pump may operate from the start of the first time interval, whereas the second heat pump may activate during the later portion of the first time interval so as to still reduce the overlapping activation time despite the need to increased heating due to the lower outside temperature.

FIG. 9 also shows the periodic enablement for activation of the hot water heater during the third and fourth time intervals between 4:30 pm and 5:00 pm as well as the first interval after 5 pm. Accordingly, the time shifting of the enablement for activation of the hot water heater allows for a reduction in the overlapping activation time with either the first or second heat pumps. In other words, the demand management server may still reduce overlapping activation time of the hot water heater by recognizing the increased need for the heat pumps to possibly run concurrently and, therefore, time-shift the operation of the hot water heater to other time intervals.

Figure 10:
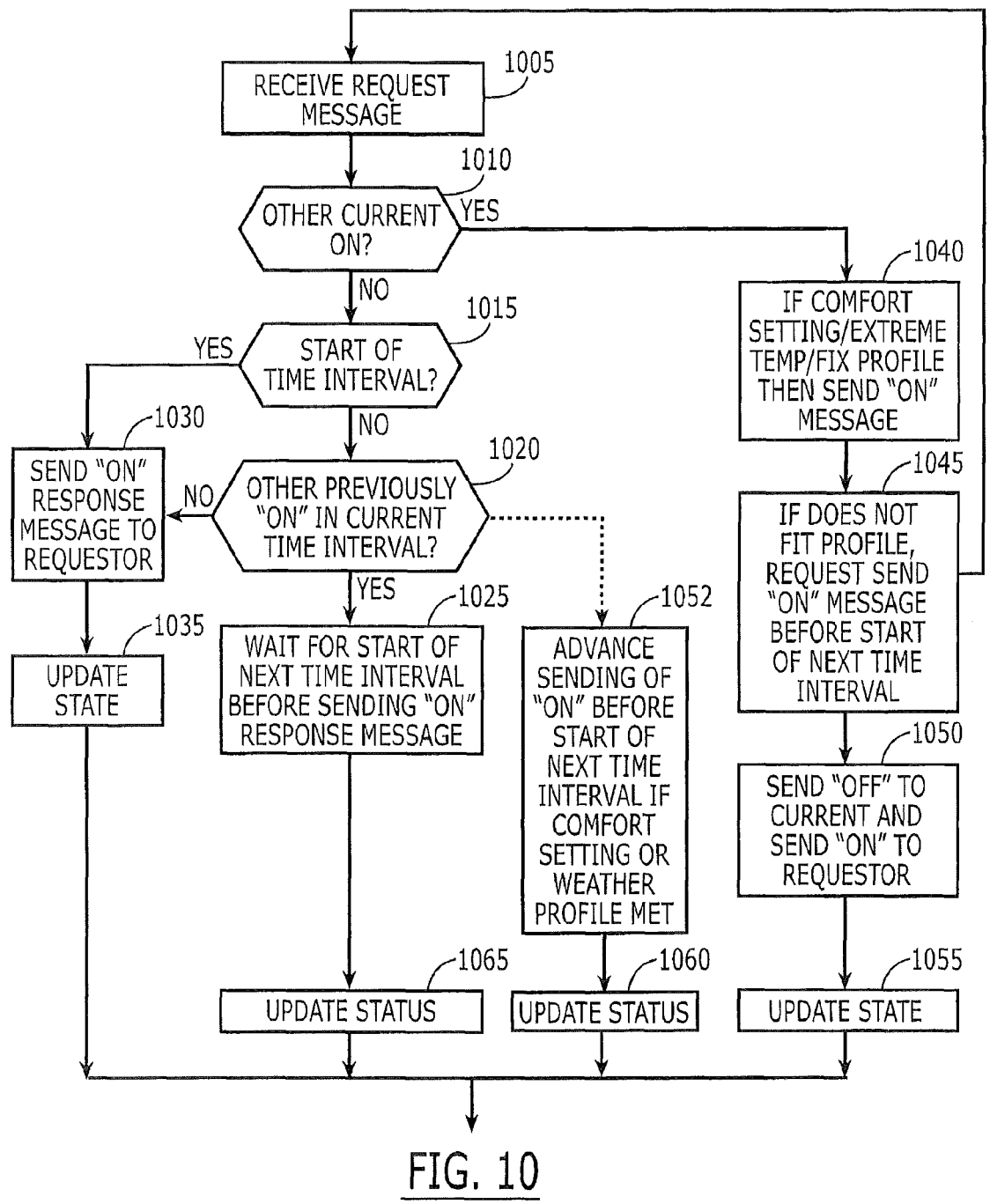
FIG. 10 is a flowchart that illustrates operations of local and remote systems according to the timeline illustrated in FIG. 9 in some embodiments according to the invention.

FIG. 10 is a flow chart that illustrates operations of the systems described herein in accordance with the timeline shown in FIG. 9 in some embodiments according to the invention. According to FIG. 10, an electrical appliance provides a request to the processor circuit 200 for activation, which forwards a request message 300 to the remote system 105 (Block 1005). The demand management server determines if any other electrical appliances are currently enabled for activation (Block 1010). If no other electrical appliances are enabled for activation (Block 1010) the demand management server determines whether the start of a time interval has begun (Block 1015). If the demand management server determines that a time interval has begun (Block 1015), the remote system 105 sends a response message 305 indicating that the requesting electrical appliance should be enabled by the processor circuit 200 (Block 1030). The remote system 105 then updates the status table shown in FIG. 4 to reflect that the requesting electrical appliance has been activated during the current time interval (Block 1035), and returns to a state awaiting the receipt of another request for activation.

If, however, the demand management server determines that a new time interval has not begun (Block 1015), the demand management server determines whether other electrical appliances were previously enabled for activation in the current time interval (Block 1020). If other electrical appliances were not enabled for activation during the current time interval, the remote system 105 sends a response message 305 to the processor circuit 200 indicating that the requesting electrical appliance should be enabled for activation (Block 1030), and then proceeds according to Blocks 1030 and 1035.

If, however, the demand management server determines that other electrical appliances were previously enabled during the current time interval (Block 1020), the demand management server waits for the start of the next time interval before sending a response message 305 indicating to the processor circuit 200 that the electrical appliance requesting activation be enabled (Block 1025). The demand management server then updates the status table shown in FIG. 4 to reflect that the requesting electrical appliance is now enabled for activation during the current time interval, and returns to a state awaiting the next request for activation (Block 1065).

Alternatively, upon determining that other electrical appliances have previously been enabled for activation in the current time interval (Block 1020), the remote system 105 can send a response message 305 to the processor circuit 200 indicating that the enablement for activation of the requesting appliance should be advanced into the current time interval, and should not be withheld until the start of the next time interval when, for example, the comfort settings or current weather associated with the single customer residence meet the profile associated with increased activation indicating that additional activations may be required, such as when the outside temperature is particularly low (Block 1052). The remote system 105 then updates the information included in the status table shown in FIG. 4 (Block 1060), and returns to a state of waiting for the next request for activation.

If, however, the demand management server determines that other electrical appliances are currently enabled for activation in the current time interval (Block 1010) the demand management server sends a response message 305 activating a second electrical appliance if the comfort settings, or temperature, etc. fit the profile associated with increased activation (Block 1040), such as when the external temperature is such that additional heating may be required. If, however, the demand management server determines that the current conditions do not warrant additional activation, the demand management server does not send a response message 305 activating the requesting electrical appliance until the start of the next time interval (Block 1045).

The demand management server can also send a response message 305 indicating that the processor circuit 200 should disable the currently activated electrical appliance and indicating that the requesting electrical appliance should be enabled for activation (Block 1050). The demand management server then updates the information in the status table shown in FIG. 4, and returns to a state of waiting a next request for activation.

Figure 11:
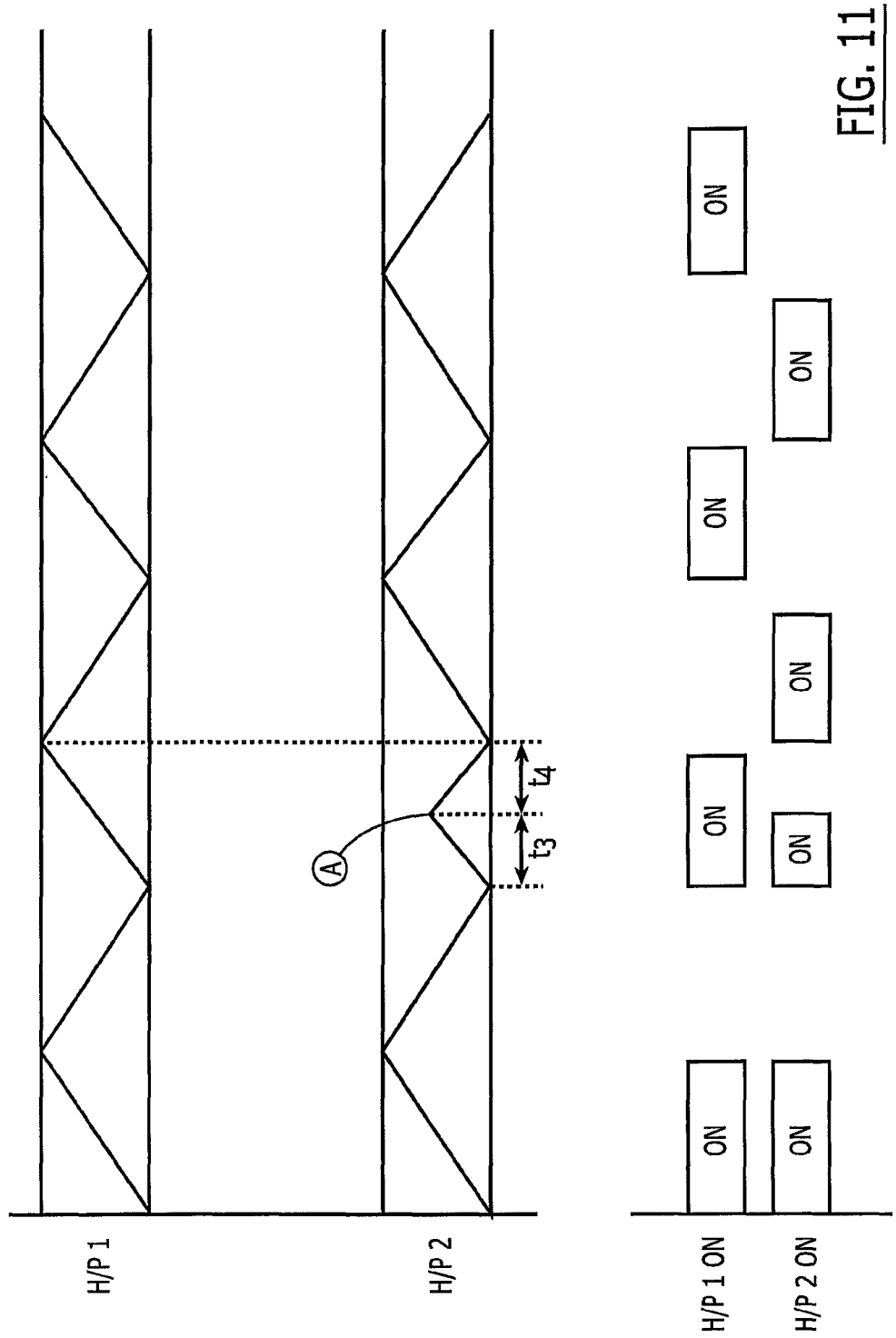
FIG. 11 is a timeline showing enablement/disablement of respective electrical appliances time-shifted into different time intervals in some embodiments according to the invention.

FIG. 11 is a timeline illustrating time shifting the activation of different electrical appliances into different time intervals during the day to reduce overlapping activation times in some embodiments according to the invention. In particular, FIG. 11 shows active and inactive time intervals for two respective heat pumps H/P1 and H/P2. During an initial phase (i.e., off-peak), H/P1 and H/P2 can both operate concurrently so that both heat pumps heat the respective living spaces simultaneously. During this off-peak interval, heating and cooling rates can be determined for the heat pump, which is to be time shifted relative to the other. For example, in FIG. 11 heat pump 2 is time-shifted relative to the operation of heat pump 1.

Both heat pump 1 and heat pump 2 operate by starting from an initial level in heating the respective living space to respective operational limits. Once the operational limit of heat pump is reached, the respective heat pump is inactivated through the operation of the thermostat. Accordingly, the off-peak interval can be used to determine respective heating and cooling rates for each of the heat pumps operating to heat the respective living space.

As further shown in FIG. 11, heat pump 2 can be time shifted to operate out of phase with respect to heat pump 1 by determining a deactivation time t3 for heat pump 2 to provide an initial time shift interval, after which heat pump 2 will be allowed to be activated while heat pump 1 is concurrently deactivated. In particular, the deactivation time t3 can be determined by estimating the amount of time needed for the respective living space heated by heat pump 2 to cool to the initial level at about the time that heat pump 1 is projected to reach the operational limit and become inactive. For example, if the projected time at which heat pump 1 is projected to become inactive is t3, the initial time shift interval can be provided by deactivating heat pump 2 in advance of the projected deactivation time for heat pump 1 based on the estimated rate of cooling of the living space associated with heat pump 2 upon reaching a temperature A.

Once the temperature of the living space heated by HP2 reaches temperature A, the heat pump 2 can be deactivated so that the living space starts to cool at a rate that is estimated during the off-peak interval. During the same time, heat pump 1 continues to heat the respective living space until reaching the projected time at which heat pump 2 will become inactive. At about the same time, the living space associated with heat pump 2 should have returned to the initial level after cooling in response to the deactivation of heat pump 2 during the initial time shift interval at time t3. Once heat pump 2 is reactivated and heat pump 1 is deactivated at time t4, both heat pump 1 and heat pump 2 can operate out of phase with each other.

Moreover, the operation of heat pump 1 and heat pump 2 can occur without the imposition of control signals by the processor circuit 200. In other words, once the operation of the heat pump 1 and heat pump 2 are time shifted with respect to one another, the operation of the respective heat pumps may be allowed to continue uninterrupted while still remaining out of phase with one another. This out of phase operation can allow a reduction in overlapping activation time of heat pumps at the single customer location to provide a reduction and a maximum amount of power monitored by the electrical service provided in a time of use billing arrangement thereby leading to both a reduction in the peak power that need be generated by the electrical service provider as well as a reduction in the demand at the single customer location.

Figure 12:
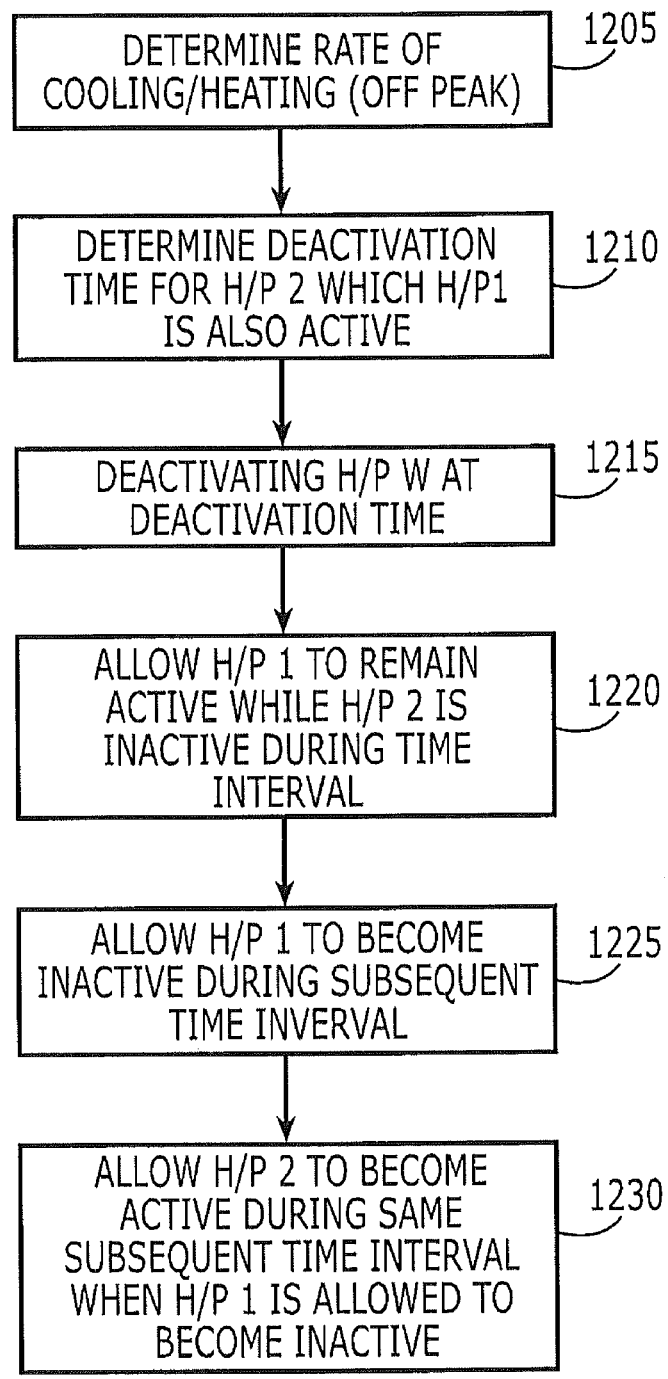
FIG. 12 is a flowchart that illustrates operations of local and remote systems according to the timeline illustrated in FIG. 11 in some embodiments according to the invention.

FIG. 12 is a flow chart that illustrates operations of heat pump 1 and heat pump 2 according to the timeline shown in FIG. 11 in some embodiments according to the invention. According to FIG. 12, a determination is made during off-peak operation of the rate of cooling and/or heating associated with the respective heat pump HP1/HP2 (Block 1205). A determination is then made of deactivation time for H/P2 when H/P1 is also active to provide an initial time shift interval (Block 1210).

Heat pump 2 is disabled at the determined deactivation time while heat pump 1 continues activation (Block 1215). Heat pump 1 is allowed to remain active while HP2 remains inactive during the initial time shift interval (Block 1220). HP1 is allowed to become inactive during the subsequent time interval that projected time (Block 1225) and HP2 allowed to become active during the same time interval when HP1 is inactive (Block 1230).

Figure 13:
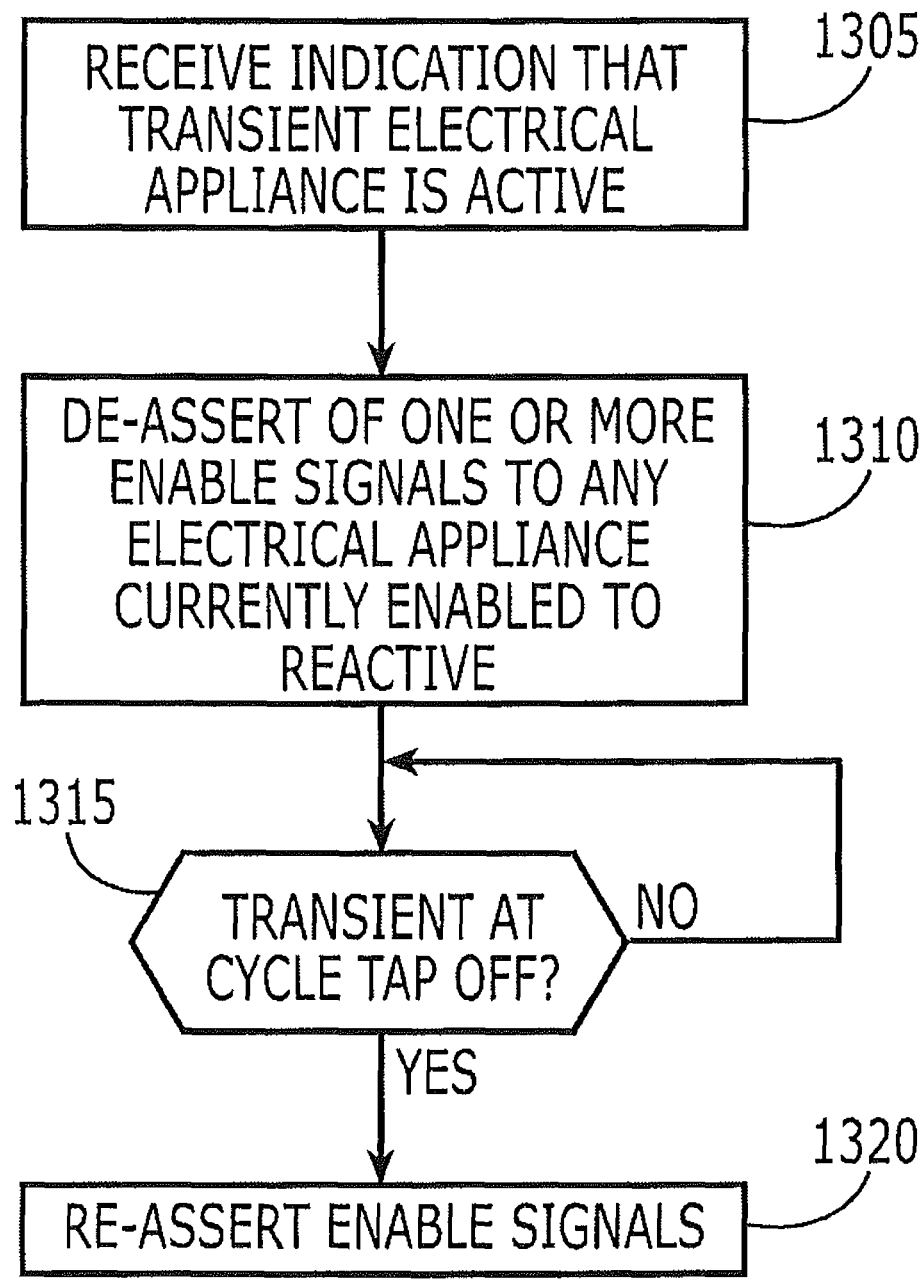
FIG. 13 is a flowchart that illustrates operations of local and remote systems responsive to indications that a transient electrical appliance has been activated in some embodiments according to the invention.

FIG. 13 is a flow chart that illustrates operations of local and remote systems in response to receipt of indications that transient electrical appliances are active in some embodiments according to the invention. It will be understood that these operations can be utilized in conjunction with any of the embodiments described herein to provide support for the handling of the operation of transient electrical appliances. According to FIG. 13, an indication is received at the processor circuit 200 that a transient electrical appliance (such as an electric range, an electric oven, electric clothes dryer, or the like) has become active (Block 1305). In response, the processor circuit 200 transmits a request message 300 to the demand management server indicating that the transient electrical appliance has been activated.

In response, the demand management server determines if any other electrical appliance is currently enabled for activation at the single customer location. If any other electrical appliances are currently enabled for activation, the demand management server transmits a response message 305 indicating that all switched electrical appliances that are currently active should be disabled by de-asserting the enablement signal 310 thereto (Block 1310). The processor circuit 200 continues to monitor the indication from the transient electrical appliances and can periodically transmit corresponding request messages 300 to the demand management server indicating the same.

Once the transient electrical appliances switches off, such as after reaching its preheat temperature or the temperature at which it will begin to cycle subsequently, (Block 1315) the processor circuit 200 transmits a request message 300 to the demand management server indicating that the transient electrical appliance has switched off. Accordingly, the remote system 105 then transmits a response message 305 indicating that the previously disabled electrical appliances can be re-enabled through assertion of the enablement signal 310 (Block 320).

Figure 14:
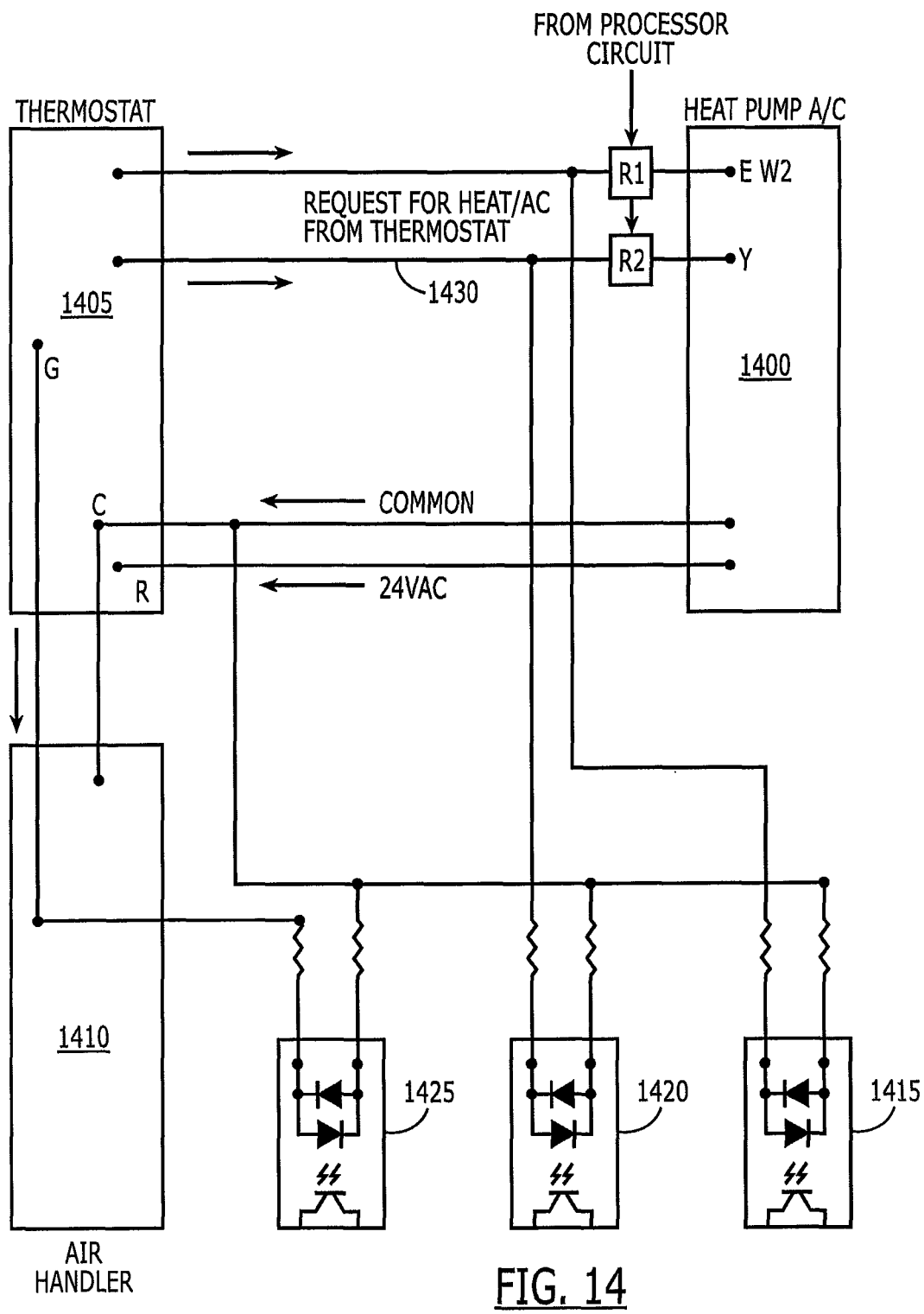
FIG. 14 is a schematic diagram that illustrates circuits and methods used for sensing activation/deactivation of, for example, heat pumps/air-conditioners in some embodiments according to the invention.

FIG. 14 is a schematic diagram that illustrates methods, circuits, and systems for sensing operations of electrical appliances in some embodiments according to the invention. According to FIG. 14, a thermostat 1405 is configured to operate an electrical appliance 1400 (such as a heat pump or air-conditioner) in conjunction with in an air handler or blower 1410. Opto-couplers 1415, 1420, and 1425 are electrically coupled to the thermostat 1405, electrical appliance 1400, and the air handler 1410 for sensing the operations thereof and reporting to the processor circuit.

As further shown in FIG. 14, the electrical appliance 1400 provides 24 Volt AC signal and a common reference voltage to the thermostat 1405 at terminals R and C respectively. It will be understood that the thermostat 1405 can use the common reference voltage and 24 Volt AC signal for operational power. Furthermore, the thermostat 1405 can provide 24 V AC power to the air handler 1410 (via terminal G) for operation in conjunction with the electrical appliance 1400. For example, the thermostat 1405 can enable the electrical appliance 1400 along with the air handler 1410 so that heated or conditioned air provided by the electrical appliance 1400 can be circulated throughout the living space by the air handler 1410.

The thermostat 1405 can also provide requests to the relays R1 and the R2 which, in-turn, can provide for the activation/deactivation of the electrical appliance 1400 in response to respective enablement signals provided by the processor circuit as described above. For example, the thermostat 1405 can provide a Request for Heat/Air Conditioning 1430 to R2, which can be coupled to the electrical appliance 1400 in response to an enablement signal from the processor circuit (not shown).

In operation, the opto-couplers 1415, 1420, and 1425 are each configured to sense different operations provided by the structure shown in FIG. 14. In particular, when the Request for Heating/Air Conditioning 1430 is provided by the thermostat 1405, the voltage is provided to the relay R2 and to one of the terminals of the opto-coupler 1420. Therefore, the terminals of the opto-coupler 1420 are biased by the Request for Heat/Air Conditioning 1430 and the common reference voltage provided by the electrical appliance 1400. In response, the opto-coupler 1420 can provide an indication to the processor circuit that the thermostat 1405 is requesting heating or cooling from the electrical appliance 1400.

The opto-couplers 1415 is configured to sense a voltage difference across the Request for Emergency Heat/Air Conditioning provided by the thermostat 1405 and the common reference voltage. Accordingly, when the thermostat 1405 provides the Request for Emergency Heating/Air Conditioning, the opto-coupler output indicates to the processor circuit that the thermostat 1405 is requesting Emergency Heating/Air Conditioning.

Still referring to FIG. 14, the opto-coupler 1425 can sense the activation of the air handler 1410 in response to the voltage provided thereto by the thermostat 1405. Accordingly, when the thermostat 1405 enables the air handler 1410, the terminals of the opto-coupler 1425 are biased across the 24 V AC signal (provided to the air handler 1410) and the common reference voltage (provided by the heat pump 1400). In response, the processor circuit can received the output of the opto-coupler 1425 to indicate operation of the air handler 1410.

Figure 15:
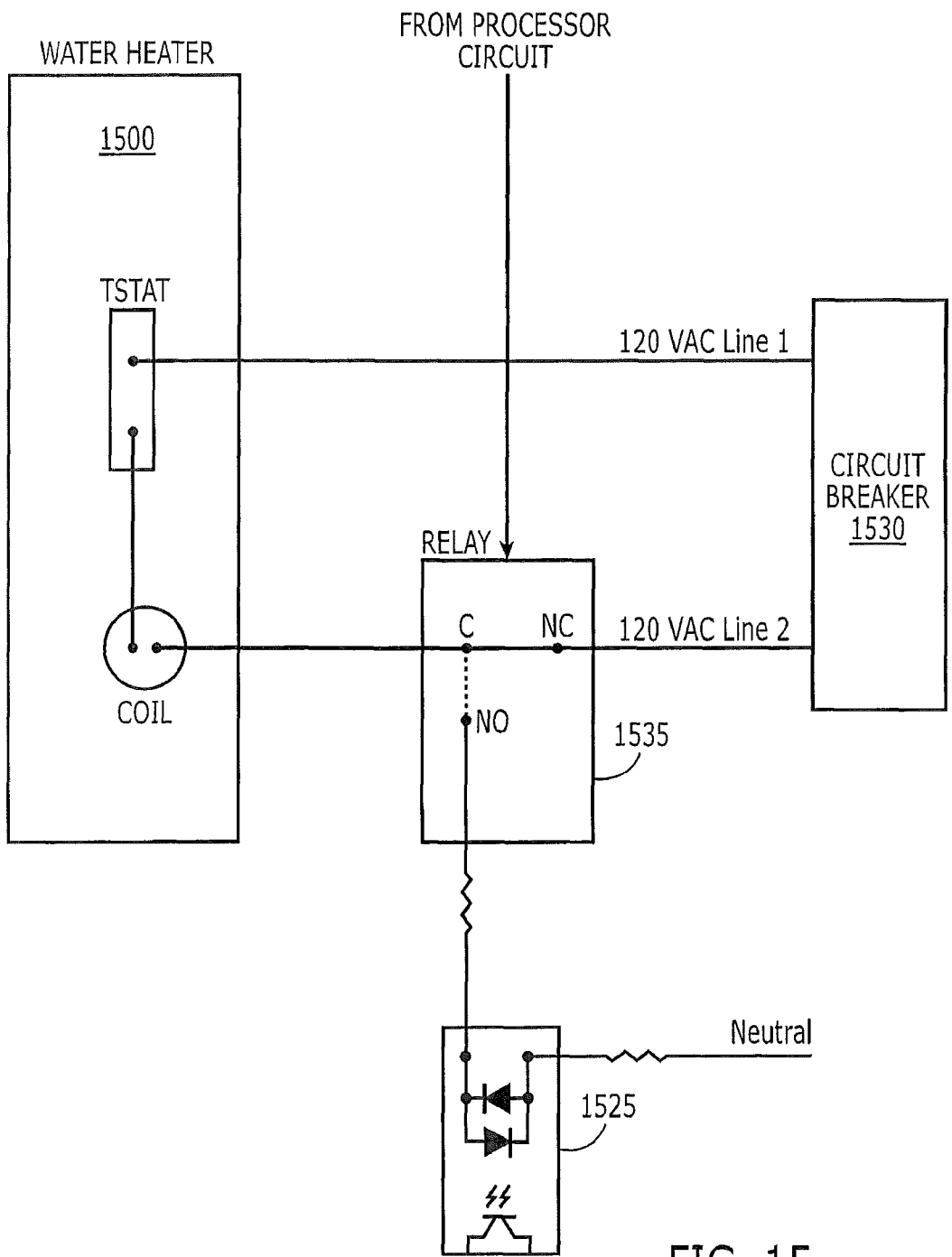
FIG. 15 is a schematic diagram that illustrates circuits and methods used for sensing activation/deactivation of, for example, water heaters in some embodiments according to the invention.

FIG. 15 is a schematic diagram that illustrates methods, circuits, and systems used to sense the operations of water heaters in some embodiments according to the invention. According to FIG. 15, a water heater 1500 can be coupled to a pair of 120 V AC lines via a relay 1535. Specifically, the water heater 1500 includes a heating element used to heat water stored in a tank, according to a water heater thermostat setting.

The relay 1535 is coupled to an enablement signal provided by the processor circuit as described above. In normal operation, the enablement signal is disabled so that the relay 1535 couples one of the 120 V AC lines from a circuit breaker 1530 to a terminal of the heating coil. Accordingly, when the relay 1535 is in this configuration, the water heater 1500 can heat water to a temperature setting indicated by the thermostat. However, when the enablement signal from the processor circuit is enabled, the relay 1535 decouples the terminal of the heating coil from the 120 V AC line provided via the relay 1535. Accordingly, in this configuration, the water heater 1500 is not able to heat water as the second 120 V AC line is decoupled from the heating coil.

When the relay 1535 decouples the 120 V AC line from the heating coil, the terminal of the heating coil is instead coupled to a first terminal of an opto-coupler 1525. A second terminal of the opto-coupler 1525 is connected to a reference voltage so that the terminals of the opto-coupler 1525 can be biased to indicate to the processor circuit whether the water heater 1500 is requesting heat. In particular, when the water heater thermostat is closed, the water heater 1500 is requesting water to be heated. Accordingly, the 120 V AC line coupled directly to one of the terminals of the thermostat can be sensed at the terminal of the opto-coupler 1525. Accordingly, the output of the opto-coupler 1525 provided to the processor circuit can indicate that the water heater 1500 is requesting heating. Furthermore, when the thermostat is open, the 120 V AC signal provided at the other terminal the thermostat is not provided to the first terminal of the opto-coupler 1525, thereby indicating to the processor circuit that the water heater 1500 is not requesting heating.

Figure 16:
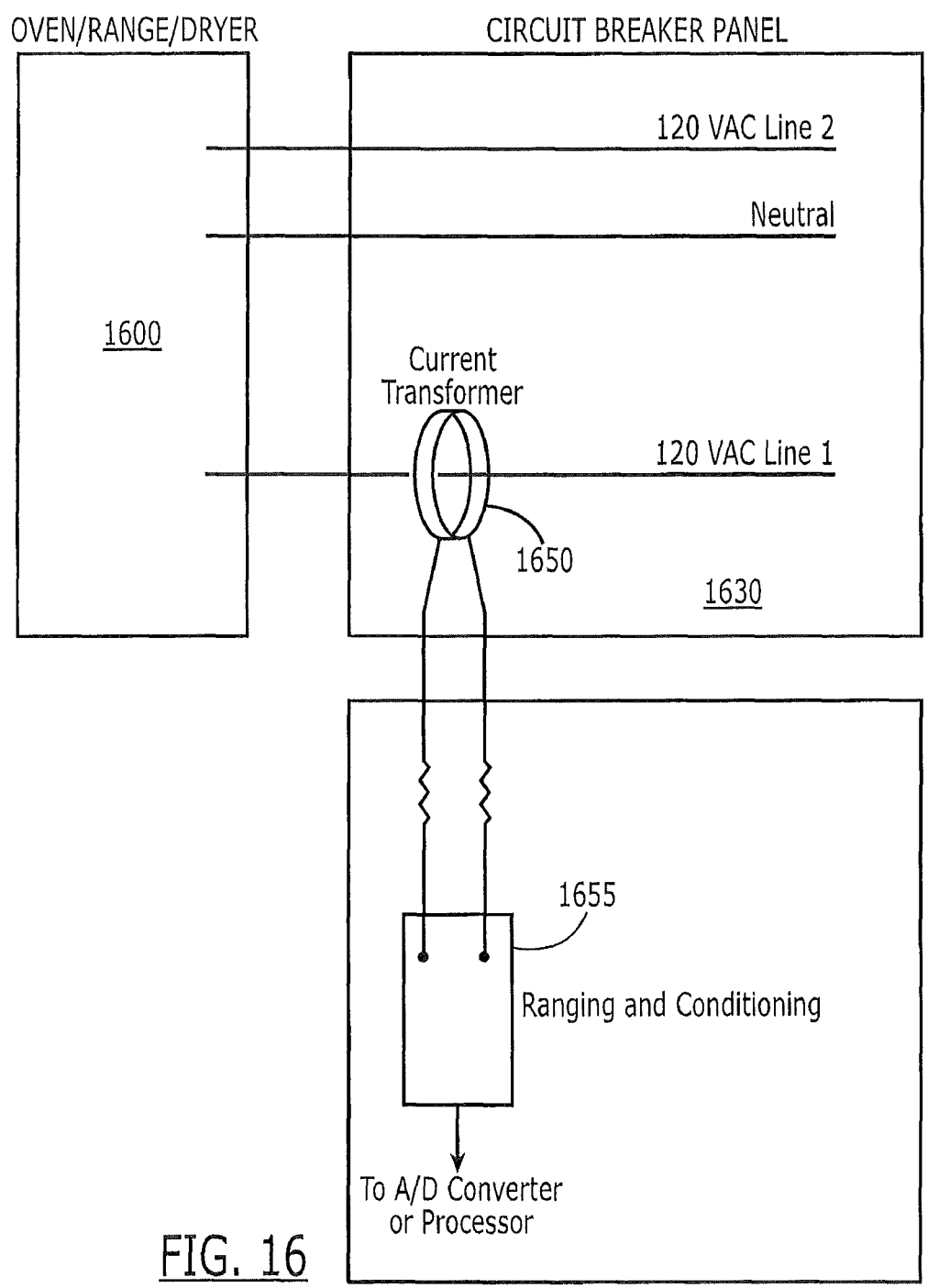
FIG. 16 is a schematic diagram that illustrates circuits and methods for sensing activation/deactivation of, for example, ovens/ranges/dryers in some embodiments according to the invention.

FIG. 16 is a schematic diagram that illustrates methods, circuits, and systems for sensing the operation of electrical appliances in some embodiments according to the invention. According to FIG. 16, an electrical appliance 1600 can be, for example, an electric oven, electric range top, electric dryer, or another type of electrical appliance, which may be unswitched. The electrical appliance 1600 is provided with power via first and second 120 V AC lines and a reference or neutral line from a circuit breaker panel 1630. A current transformer 1650 may be placed in close proximity to the circuit breaker panel 1630 and positioned to sense current flow in one of the 120 V AC lines.

Accordingly, when the electrical appliance 1600 is in operation, the current transformer 1650 can provide a voltage across terminals of a ranging and conditioning circuit 1655, which can provide an output to an analog to digital converter circuit and subsequently to the processor circuit to indicate operation of the electrical appliance 1600. It will be understood that the ranging and conditioning circuit 1655 can operate to change the nature of the voltage signals (e.g., from AC to DC), as well as scale the voltage levels to the appropriate thresholds for the processor circuit, the analog to digital converter circuit, or other circuit which interfaces to the ranging and conditioning circuit 1655.

Operation of the ranging and conditioning circuit 1655 can vary based on which type of electrical appliance 1600 is being monitored. For example, if the electrical appliance 1600 is an electric range top, the ranging and conditioning circuit 1655 may indicate different levels of operation of the electric range top 1600 which may be output as different voltage levels indicating different degrees of operation. For example, a first value provided by the ranging and conditioning circuit 1655 can indicate that only a single burner of the electric range top is activated. In other embodiments according to the invention, other digital outputs can indicate that 2, 3, or more burners of the electric range top are activated. Accordingly, the processor circuit can determine whether to enable/disable other electrical appliances based on the sensed operation of the electric range top.

In some embodiments according to the invention, if the electrical appliance 1600 is an electric dryer, a relay can be electrically coupled to the dryer's heating element so that the processor circuit can take partial control of the electric dryer if desired. For example, if the processor circuit determines that the demand should be reduced, one option would be to temporarily disable or, alternatively, duty cycle the dryer's heating element to reduce peak demand In yet other embodiments according to the invention, generated excess electrical power can be efficiently stored at a customer location, whereas in conventional approaches the generated excess electrical power might be stored inefficiently or even go un-stored. For example, it maybe advantageous to maintain the output of an electrical power plant so that it operates at higher efficiency despite the fact that demand for electricity is below the level that is provides for this higher efficiency. The generated excess electrical power provided by this higher efficiency can be stored at a customer location and used later, when demand may be greater. Storing the generated excess electrical power for later use during higher demand periods may reduce the load during the greater demand period so that an existing power plant may more readily meet the demand.

Accordingly, in some embodiments according to the invention, an electrical service provider can maintain control of storage water heaters located at customer locations (e.g., residences and/or businesses) so that generated excess electrical power (i.e., power produced above present demand) can be stored by heating water that may otherwise be heated when demand is higher. For example, the water heaters may be enabled by the electrical service provider during hours when demand for power is less, such as during the night. The heating of the water during the night may reduce the need to heat water during periods of greater demand, thereby storing the excess generated electrical power in the form of hot water.

In some embodiments according to the invention, two or more water heaters may be installed in series at a customer location, such that an output of a first (or storage) water heater is coupled to the input of a second (or primary) water heater, the output of which provides hot water to the customer location. During normal operation, only the primary water heater may actually heat water for use at the customer location. However, during periods of excess capacity, the electrical service provider may enable the storage water heater to store the excess electrical power that is generated by operating the power plant at higher output (which may be more efficient). Later, during hours of greater demand, the electrical service provider may disable the storage water heater used to store the excess capacity, whereas the primary water heater may operate normally. However, during the time of greater demand, the storage water heaters (even though disabled) may provide pre-heated water to the primary water heater, which in-turn, may need to be heated less or perhaps not at all.

In some embodiments according to the invention, the primary water heater in the sequence of water heaters operates without intervention by the electrical service provider. In other words, the final stage of the water heater arrangement may operate under the customer's control, whereas the storage water heater(s) may operate under control of the electrical service provider.

Although the operations described herein illustrate the use of water heaters to store excess capacity produced during lower demand periods, it will be understood that embodiments according to the invention can be utilized to store electrical energy in any form where the excess is generated during periods of reduced demand where higher efficiencies may be provided if the power generation is maintained above demand during the low demand period. Furthermore, it will be understood that the electrical storage devices located at the customer locations, operate responsive to electrical service providers indication that excess capacity exists. Accordingly, the electrical service provider can activate the storage devices located at the customer locations so that the excess electrical power can be stored and utilized later to reduce demand at that customer location.

Furthermore, it will be understood that although the storage water heater used to store the excess generated power is electrically powered, the primary water heater can be powered by a source other than electrical energy, such as gas. Accordingly, the primary water heater can be described as an energy storage device as the water heater can store energy embodied in gas, electrical power, or other source in the form of hot water.

Figure 17:
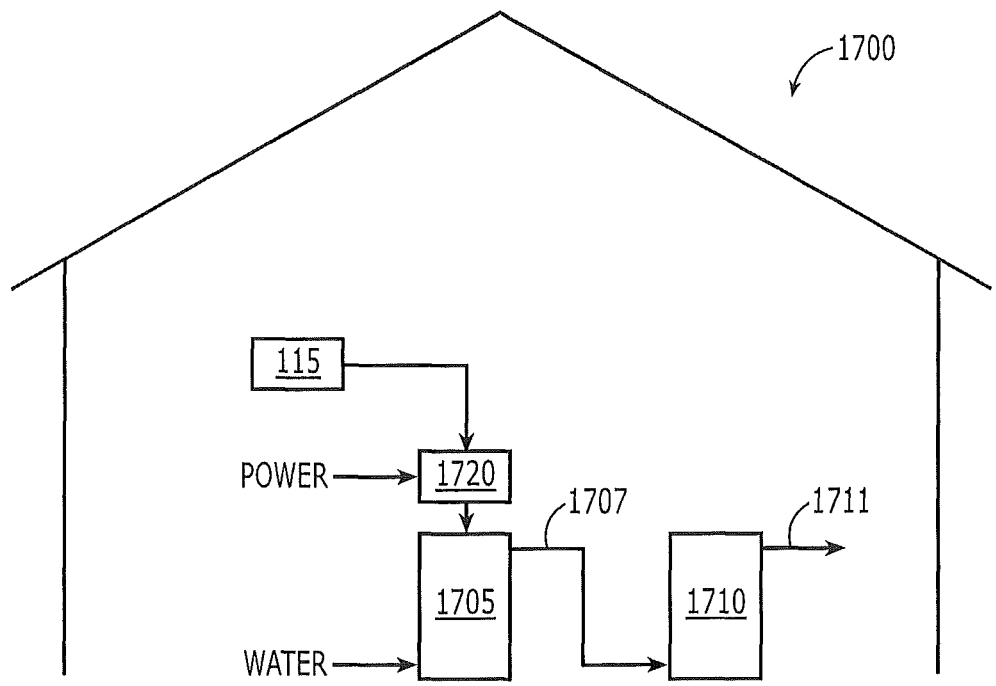
FIG. 17 is a schematic representation of water heaters connected in series in some embodiments according to the invention.

FIG. 17 shows an exemplary embodiment of water heaters at a customer location 1700 where a water heater 1705 operating under control of an electrical service provider is coupled in series to a primary (and potentially pre-existing) water heater 1710 that provides hot water 1711 to the customer location. In operation, the electrical service provider can enable/disable the storage water heater 1705 during times when excess electrical power capacity exists until the storage water heater 1705 reaches capacity, which can be indicated via a thermostat output from the storage water heater 1705.

Accordingly, when the storage water heater 1705 is enabled, the water therein is heated to the temperature indicated by the associated thermostat. Water 1707 heated by the storage water heater 1705 can be provided as an input to the primary water heater 1710. The primary water heater 1710 may heat the water 1707 provided by the storage water heater 1705 very little if the water 1707 has been preheated by the storage water heater 1705. Later, when the period of excess capacity has passed, the storage water heater 1705 may be disabled by the electrical service provider, whereupon only the primary water heater 1710 is enabled to heat the water.

However, still referring to FIG. 17, even though the period of excess capacity has passed, the primary water heater 1710 can still receive pre-heated water 1707 from the storage water heater 1705, thereby reducing demand by heating the water 1707 less than would otherwise be needed. When the water in the storage water heater 1705 is depleted, the storage water heater 1705 may simply pass cold water through to the primary water heater 1710, which would heat the water 1707 according to a thermostat associated therewith.

Figure 18:
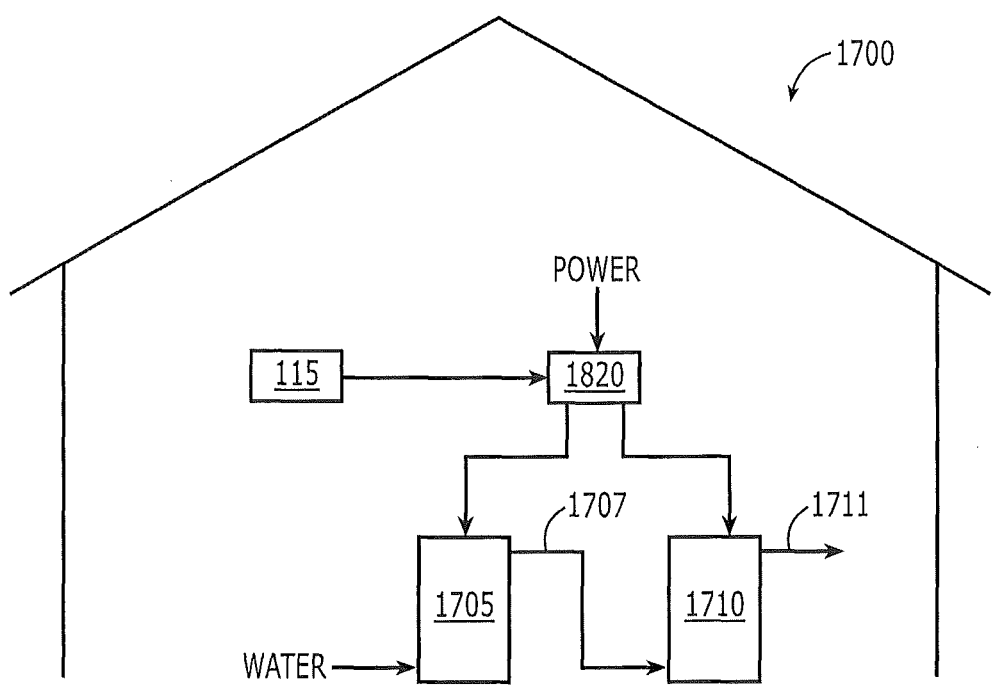
FIGS. 18 and 19 are schematic representations of water heaters coupled in series with one another under the control of power relay circuits in some embodiments according to the invention.
Figure 19:
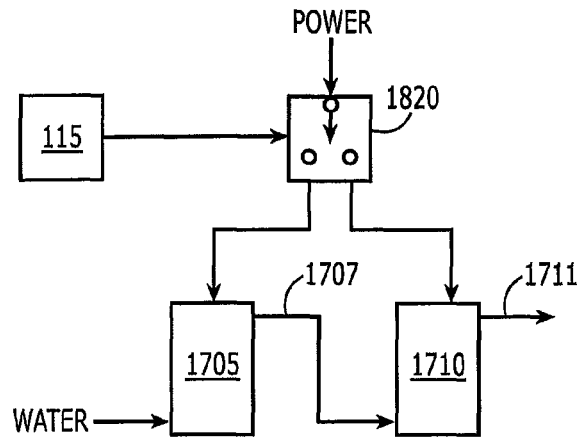

According to FIGS. 18 and 19, in some embodiments according to the invention, the electrical service provider can maintain control (i.e., enable/disable) over the storage water heater 1705 by coupling/de-coupling electrical power to/from the storage water heater 1705, using a power relay circuit 1820 that is responsive to an enable signal provided the processor circuit 200 as shown above, for example, in FIG. 2A. The power relay circuit 1820 can be used to couple/de-couple electrical power to/from the storage water heater 1705 to enable/disable heating of water. Moreover, the power relay circuit 1820 can be used to couple/de-couple electrical power to both the storage water heater 1705 and the primary water heater 1710. Alternatively, the power relay circuit 1820 can be used to toggle power between the storage water heater 1705 and the primary water heater 1710, as shown in FIG. 19.

Relays which control relatively high power electrical appliances (such as a water heaters), can include a low current relay configured to drive a high power relay as shown, for example, in FIG. 18. The low current relay can be connected in series with the higher power relay, which in-turn is configured to couple/decouple electrical power to/from the storage water heater 1705. Moreover, the relay can be operated by the electrical service provider over a network, such as the Internet, connected to an internal network at the customer location including the processor circuit 200.

It will be understood that the electrical service provider can be an electric utility company which owns and operates large scale power generating plants for delivery to the power grid to which the customer location is connected. However, it will be understood that the electrical service provider can be any entity that provides electrical service to the single customer location and is not necessarily limited to those entities that own and operate electrical power generation facilities.

Figure 20:
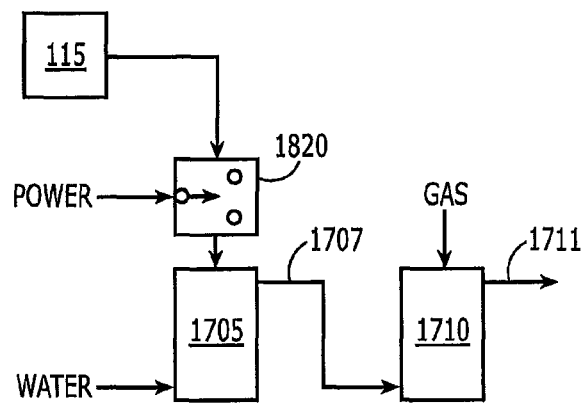
FIG. 20 is a schematic representation of an electric water heater and a gas water heater connected in series with one another wherein the electric water heater is operated under control of the electrical service provider.

Furthermore, the electrical service providers may operate in concert with other energy providers, such as natural gas providers, where the primary water heater operates using gas, as shown in FIG. 20. According to FIG. 20, the storage water heater 1705 operates using electricity whereas the primary water heater 1710 operates using gas such that the providers (electric and gas) may coordinate operations of the storage and primary water heaters responsive to, for example, comparative pricing of gas versus electricity, availability of gas versus electric, etc. For example, in some embodiments according to the invention, the providers may determine that, because electricity is less expensive and/or more plentiful, the (electric) storage water heater is enabled to provide hot water to the customer location during periods greater demand for gas. In such embodiments, the gas water heater may still be enabled, but only operate to marginally heat the pre-heated water provided by the (electric) storage water heater. It will be understood that a single provider may provide both the gas and the electrical power in some embodiments according to the invention.

Figure 21:
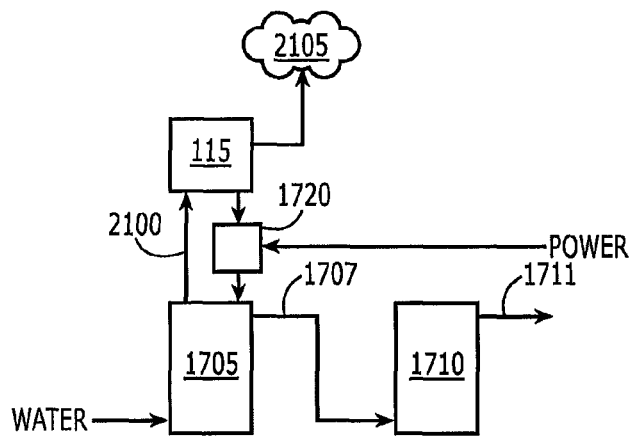
FIG. 21 is a schematic representation of water heaters coupled in series with one another wherein a storage water heater provides an indication of remaining capacity in some embodiments according to the invention.

In some embodiments according to the invention, as shown in FIG. 21, the storage water heater 1705 can provide an indication 2100 to the system 115 (described above in reference to FIG. 2A). It will be understood that the indication 2100 can indicate the state of the water stored in the storage water heater 1705. For example, the indication 2100 can show that the water stored in the storage water heater 1705 has reached a predetermined temperature defined by a thermostat setting for the water heater. In particular, the indication 2100 can be provided by the thermostat within the storage water heater 1705 to show whether the water heater has additional storage capacity. For example, when the water in the water heater 1705 reaches a temperature equal to that indicated by the thermostat setting, the indication 2100 can be provided to the system 115, which can relay the indication to the electrical service provider via the network 110. The electrical service provider can then disable the storage water heater 1705 via the power relay circuit 1720. Further, the indication 2100 may provide the temperature of the water in the storage water heater 1705, which the electrical service provider may use to determine the remaining capacity of the storage water heater 1705.

When the electrical service provider is provided with the indication 2100, the electrical service provider can manage the plurality of storage water heater 1705 across a number of customer locations. For example, the electrical service provider may disable a first storage water heater 1705 at a first customer location when that storage water heater reaches capacity, and may activate a second storage water 1705 at a second customer location to equalize the demand for the capacity provided by the electrical service provider.

Later, for example when water is used at the customer location, cold water may flow into the first storage water heater 1705, thereby reducing the temperature of the water therein. The reduction in temperature can be shown via the indication 2100, which is relayed to the electrical service provider. In response, the service provider can note that the first storage water heater 1705 now has additional storage capacity, which can be utilized by enabling the first storage water heater 1705 when additional demand is needed.

Figure 22:
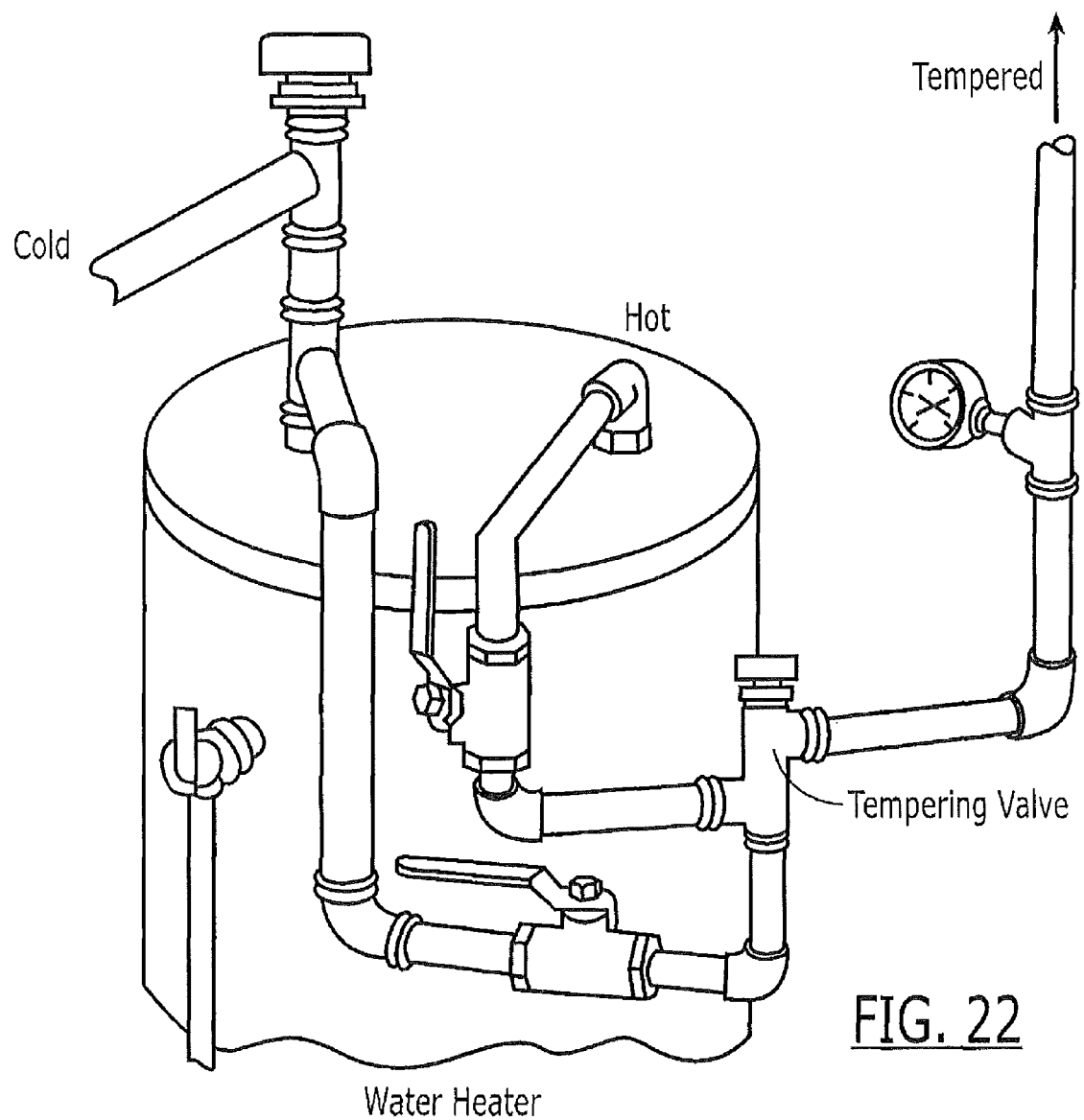
FIG. 22 is a schematic representation of a water heater having a tempering valve configuration in some embodiments according to the invention.

In still further embodiments according to the invention, the storage water heater 1705 can utilize a configuration such as that shown in FIG. 22 to insure that the water 1707 provided by the storage water heater 1705 is not so hot that it provides a risk of scalding to users of the primary water heater 1710. According to FIG. 22, cold water provided at the input of storage water heater 1707 can be mixed with heated water 1707 provided at the output thereof to the input of the primary water heater 1710. Accordingly, the cold water mixed with the heated water can reduce the temperature of the water provided to the primary water heater 1710, which may be ultimately used at the customer location.

As described above, a storage device at the customer location can be remotely enabled in response to determining whether excess electrical capacity exists and, therefore, the demand at the associated customer location can be increased to store the excess electrical capacity. Moreover, the availability of the generated electricity can include the availability of excess generated electricity that exceeds demand. For example, the generated electricity can be electricity that is generated by a wind or solar farm, the nature of which is transient. In particular, wind farms generate electricity based on prevailing winds whereas solar farms generate electricity during daylight and, further, depend on relatively clear atmospheric condition. Accordingly, wind and solar farms can generate more electricity during some times compared to others.

Figure 23:
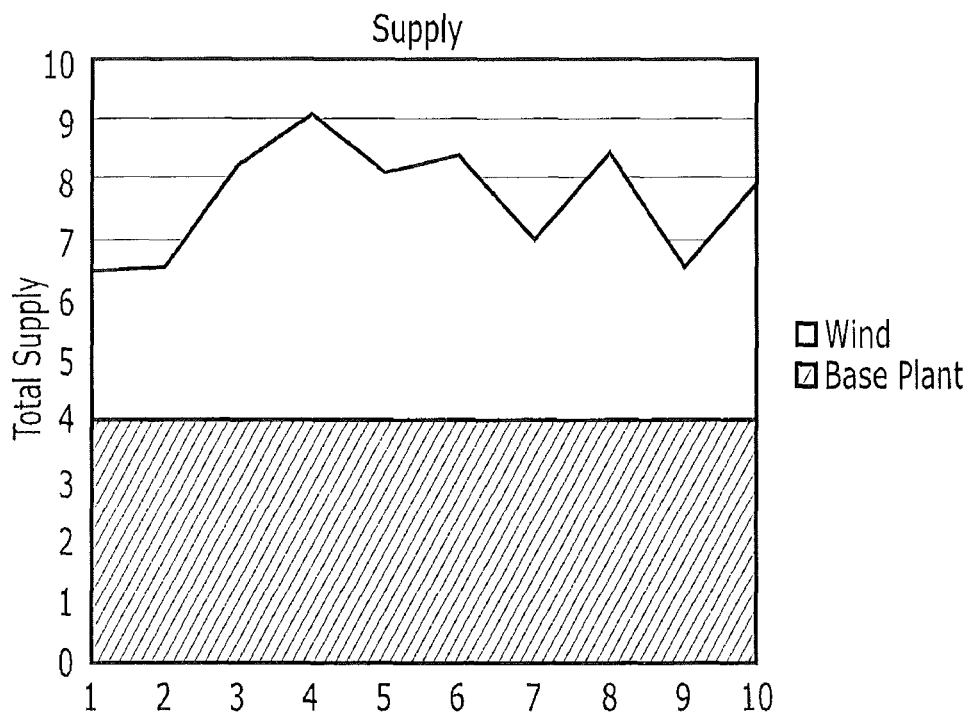
FIG. 23 is a graphical representation of the generation of a "base" amount of electrical power in some embodiments according to the invention.

For example, in some systems utilizing embodiments according to the invention, a conventional power plant (such as a nuclear power plant) generates a "base" amount of electrical power, which is shown as the base portion of the graph in FIG. 23. It will be understood that a wind farm can generate electricity based on the prevailing winds located at the farm. Accordingly, the wind farm can produce electrical power on a transient basis based on the wind available, so that the electrical power generated by the wind farm varies while the output of the conventional power plant (i.e., the base) can remain static. However, the electrical power generated by the base power plant and the wind farm can be combined to produce a total electrical power capacity which varies over time based on the prevailing wind available to the wind farm as shown in FIG. 23.

Figure 24:
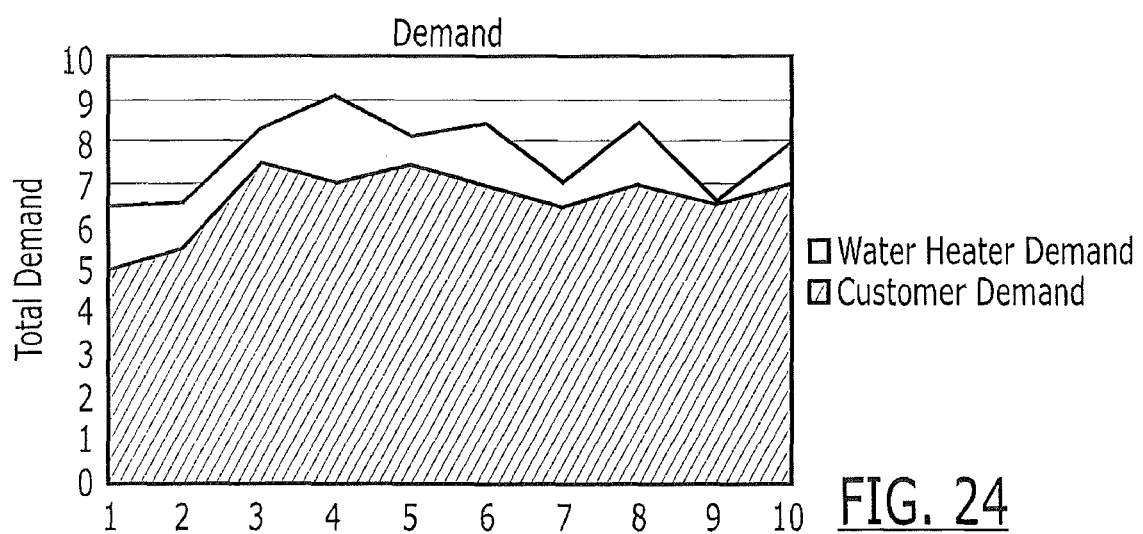
FIG. 24 is a graphical representation of aggregate demand adjusted to approximate the total electrical supply shown in FIG. 23 by selectively enabling/disabling water heaters at customer locations as the total electrical supply shown in FIG. 24 varies in some embodiments according to the invention.

As shown by the graph in FIG. 24, aggregate demand can be adjusted to approximate the total electrical supply shown in FIG. 23 by selectively enabling/disabling water heaters at customer locations as the total electrical supply shown in FIG. 24 varies. In particular, FIG. 24 shows that water heaters at customer locations can be enabled so that the customer demand added to the remotely enabled demand can approximate the total electrical supply shown in FIG. 23.

The table in FIG. 25 shows exemplary electrical power that can be generated by the wind farm at different times. Moreover, the excess electrical power generated by the wind farm varies as the wind varies over the time intervals 1-10 shown in FIG. 25. For example, at Time 1 the conventional power plant generates a static output of 4, whereas the wind farm can generate excess electrical power of 1.8 to provide a total electric supply of 5.8.

As shown in FIG. 26, at Time 1 the demand for electricity may be equal to 5 so that 0.8 of excess capacity (i.e., the conventional power plant output added to the wind farm output at Time 1 shown in Table 1) exists. Accordingly, a number of water heaters at the customer locations can be selectively enabled to approximate the total electrical supply available. In other words, enough water heaters can be enabled to store the excess electrical power generated by the combined output of the conventional plant and the wind farm. As shown in FIG. 26, at Time 1, it is estimated that 1848 water heaters can be selectively enabled to store the excess electrical power that exceeds the demand (i.e., 0.8).

It will be further understood that the water heaters may also be selectively disabled as the total electrical supply decreases. For example, as shown in FIG. 23, at Time 4, the total electrical supply available from the conventional plant and the wind farm is at peak output, but later drops at Time 5. Accordingly, at Time 4, 5308 water heaters may be selectively enabled to store the excess total electrical supply, whereas at Time 5, only 1311 water heaters are enabled. Accordingly, approximately 4000 water heaters can be disabled when transitioning from Time 4 to Time 5.

In further embodiments according to the invention, water heaters can be remotely enabled to more readily maintain a balance between supply and demand for electricity. In particular, a marginal number of water heaters may be remotely enabled to store excess electrical capacity so that the demand associated with the marginal water heaters can be more readily adjusted as total demand changes. For example, a number of marginal water heaters may be enabled to bring demand above the capacity of a base power plant coupled with relatively coarse following power plants. However, the increased demand associated with the marginal water heaters may not require additional relatively fine following power plants to be brought on-line.

As shown in FIG. 27, in some exemplary embodiments according to the invention, 100,000 water heaters may be remotely enabled as a nominal operating condition so that demand may be adjusted to more readily match supply provided by the base power plant output coupled with output from wind farms and following power plants (relatively small and in-efficient power plants that can be brought on/offline more easily than the base power plants). For example, if actual consumer demand decreases while 100,000 water heaters are enabled, an additional 4,434 water heaters can be enabled to absorb the excess capacity so that the plant outputs can be maintained (at time 1). In comparison, at time 2, actual demand increases so that 72,504 water heaters are disabled so that the associated capacity can be provided to meet the actual demand while maintaining the same plant outputs.

In this way, the total number of water heaters that are enabled can be used as a quiescent operating point about which the demand in adjusted or "trimmed." For example, if about 1 million water heaters are available for remotely enabling/disabling, about 200 megawatts of supply/demand variance can be adjusted for (or "smoothed") by enabling/disabling (i.e., trimming) of a marginal number of water heaters. In some embodiments according to the invention, this estimate is based on an average water heater having a capacity of 60 gallons receiving water at a temperature of 60 degrees Fahrenheit and producing water at a temperature of 125 degrees Fahrenheit, which is estimated to consume about 9.54 kW/hr/day. Scaling this estimate up assuming the availability of 1 million water heaters would provide smoothing of about 200 mW in supply/demand variance.

Figure 28:
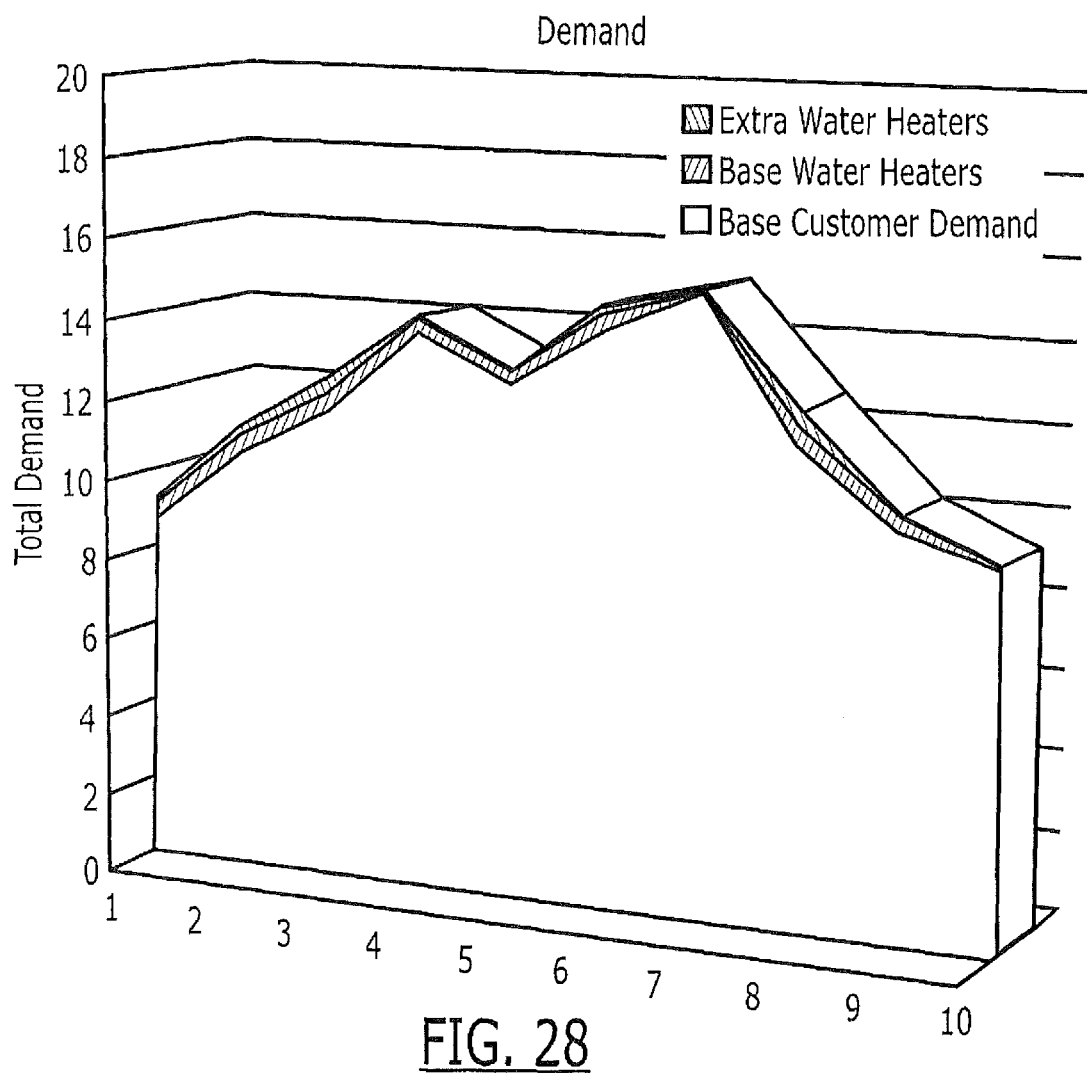
FIG. 28 is a graphical representation of the number of enabled water heaters changed (relative to a nominally enabled number) to either increase or lower demand to more smoothly meet capacity in some embodiments according to the invention.

Referring again to FIG. 27, the table illustrates an exemplary embodiment according to the invention, where 100,000 water heaters are nominally enabled. In particular, FIG. 27 shows a randomized customer demand over time T1-T10 to show trimming the number of enabled water heaters in response to actual demand variation over time. For example at time T1, the randomized customer demand is below a nominal demand value so that an additional 4,434 water heaters are enabled to store the otherwise unused excess capacity. Further, at time T2, the randomized customer demand increases above the nominal demand so that enabled water heater are disabled, so that only 72,504 water heaters are enabled, which is less than the nominally enabled 100,000 water heaters. In other words, water heaters are trimmed from the demand to allow power delivery to the actual customer demand. These examples show how the number of enabled water heaters can be changed (relative to a nominally enabled number) to either increase or lower demand to more smoothly meet capacity, which is also illustrated in FIG. 28.

In still further embodiments according to the present invention, a single water heater having at least two heating elements can be configured for separate remote management by the electrical service provider. In some embodiments according to the invention, the electrical service provider can configure an upper heating element in the water heater to operate under the control of an upper thermostat control relay to heat the water in an upper portion of the water heater. In contrast, a lower heating element is disabled from heating the water in a lower portion of the water heater. When desired, however, the electrical service provider can remotely activate the lower heating element, separate from the upper heating element, to heat the water in the lower portion. The upper heating element can, therefore, be used to provide hot water to the customer location relatively quickly by heating just the upper portion, whereas the lower heating element can be used to store energy in the form of hot water. Additionally, heating the lower portion of the water can provide additional hot water to the customer location, which otherwise may have been heated at times when demand would have been greater.

Accordingly, the lower elements of a plurality of water heaters can be enabled relatively quickly to absorb un-needed additional electrical power capacity, whereas un-needed water heater elements can be disabled when less demand is to be absorbed (such as when actual consumer demand increases). This approach may reduce the need to operate relatively expensive fine following power plants (i.e., power plants which provide relatively small marginal power output in response to increased demand that are relatively inefficient).

Moreover, managing the heating elements within the water heaters separately from one another can provide the capability to store excess capacity, for example, but without the need for an additional water heater. Stated differently, in some embodiments according to the invention, a single water heater having separately managed heating elements can allow some of the same benefits provided by multiple water heaters, but without the additional cost and space requirements of additional water heaters.

FIGS. 29-32 are schematic representations of a water heater including upper and lower heating elements configured for separate remote management by an electrical service provider in some embodiments according to the invention.

Figure 29:
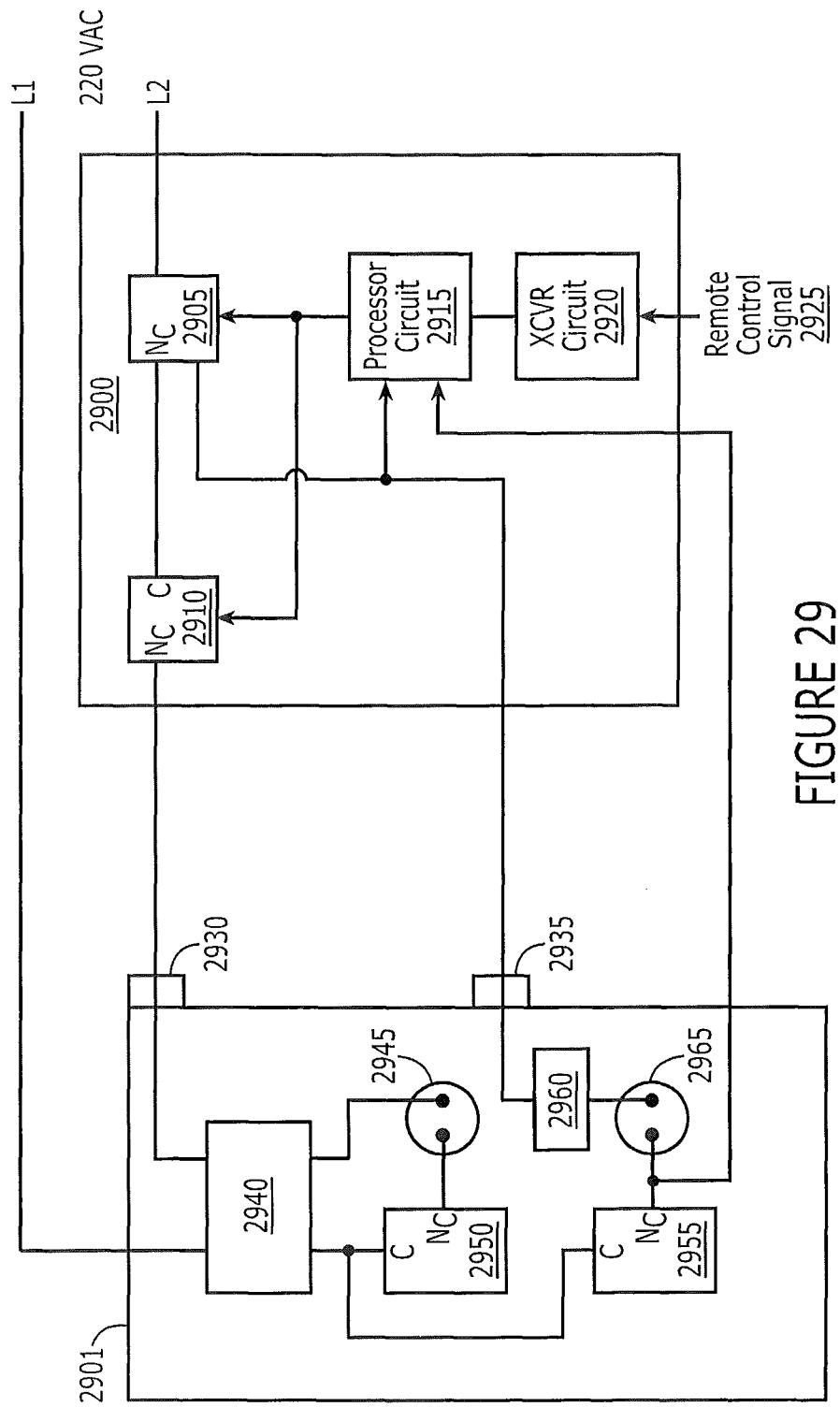
FIGS. 29-32 are schematic representations of a water heater including upper and lower heating elements configured for separate remote control by an electrical service provider in some embodiment according to the invention.

In particular, FIG. 29 is a schematic illustration of a load control module 2900 coupled to a water heater 2901. The water heater 2901 includes separate upper and lower heating elements 2945 and 2965, each of which can be separately controlled by the load control module 2900. In operation, the load control module 2900 can couple power to either the upper heating element 2945 or to the lower heating element 2965 so that one of the heating elements is allowed to heat water in the water heater 2901 to the limit specified by the respective upper and lower thermostat relays 2950 and 2955 and the high temperature cutoff circuits 2940 and 2960.

The load control module 2900 operates under the control of remote control signal 2925 which can be provided by the electrical service provider based on whether excess power capacity is available and is to be stored locally within the water heater 2901. The remote control signal 2925 is received by the load control module 2900 via a transceiver circuit 2920 which provides the remote control signal 2925 to a processor circuit 2915.

The processor circuit 2915 coordinates overall operation of the load control module 2900 and, more particularly, to set the respective states of the control relays associated with operation of the upper and lower heating elements in the water heater 2901. A lower heating element control relay 2905 is configured to receive a portion of power "L2" coupled to the load control module 2900. The processor circuit 2915 operates to control the state of the relay 2905 so the power at the common terminal (C) can be coupled to either a normally closed (NC) terminal or to a normally open (NO) terminal. In turn, the processor circuit 2915 controls an upper heating element control relay 2910 to couple the input at the common (C) terminal thereof to a normally closed (NC) terminal which is ultimately connected to a first external terminal 2930 located on a housing of the water heater 2901. Also, the lower heating element control relay 2905 can selectively provide power to a second external terminal 2935 located on the exterior of the housing of the water heater 2901.

It will be understood that the load control module 2900 can operate under control of the processor circuit 2915 to set the mode of operation thereof so that power is provided either to the upper heating element 2945 or the lower heating element 2965, both of which are located within a water tank inside the water heater 2901. It will be further understood that the power provided to either the first or second external terminals 2930 and 2935 are both subject to the high temperature cutoff circuits 2940 and 2960, operatively coupled to the respective heating elements 2945 and 2965. In operation, the high temperature cutoff circuits 2940 and 2960 can block power from the heating elements to prevent further heating once a predetermined cutoff temperature is reached inside the tank in the respective upper and lower portions.

It will be further understood that each of the heating elements 2945 and 2965 is located in a respective portion of the tank within the water heater 2901. In particular, the upper heating element 2945 is located within an upper portion of the tank whereas the lower heating element 2965 is located within a lower portion of the tank. Still further, the thermostat control relay 2950 couples power from outside the water heater 2901 to a first terminal of the upper heating element 2945 whereas a second control relay 2955 provides power to the first terminal of the lower heating element 2965. The load control module 2900 operates to provide power selectively to the second terminals of each of the upper and lower heating elements 2945 and 2960 under the control of the processor circuit 2915.

Figure 30:
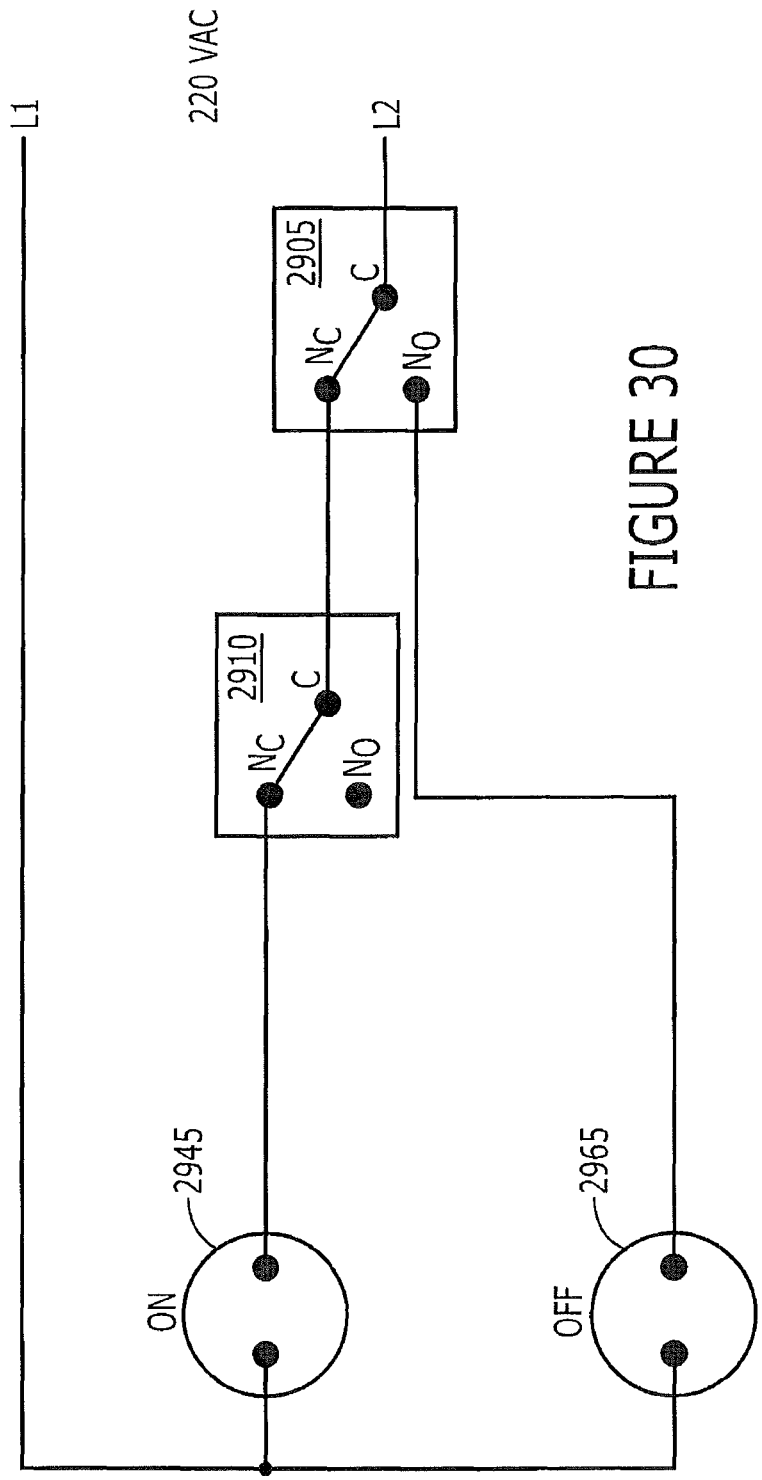

FIG. 30 is a schematic circuit illustrating operations of the load control module 2900 and water heater 2901 shown in FIG. 29 in a default configuration. According to operations described in FIG. 30, the processor circuit 2915 receives a remote control signal 2925 to place the load control module 2900 in default mode so that power is provided only to the upper heating element 2945. In particular, the lower heating element control relay 2905 is set to a state such that the portion of the power L2 provided thereto is switched to the normally closed terminal. The processor circuit 2915 also sets the upper heating element control relay 2910 to a state such that the input received via the common terminal (C) is provided to the normally closed (NC) terminal thereof. Accordingly, the portion of the power L2 is ultimately coupled to one of the terminals on the upper heating element 2945 while the other terminal of the upper heating element 2945 is provided the portion of the power L1 so that the upper heating element 2945 remains on (subject to the operation of the high temperate cutoff circuit 2940 and thermostat control relay 2950 associated therewith).

In contrast, in the default mode of operation, power is not provided to the normally open (NO) terminal of the lower heating element control relay 2905 so that power is removed from at least one terminal of the lower heating element 2965. Therefore, in operation, the upper and lower heating element control relays provide power to only the upper heating element 2945 so that water in the upper portion of the tank can be heated subject to demand by the customer. It will be further understood that once the temperature of the water in the upper portion of the tank reaches the desired temperature specified by the thermostat control relay 2950, power is removed from the upper heating element 2945. Subsequently, when the temperature of the water in the upper portion drops below the temperature set by the thermostat control relay 2950, power is again supplied to the upper heating element 2945 by the relay 2950.

In contrast, during the default mode the lower heating element 2965 is decoupled from power at all times. In particular, and as described above, the lower heating element control relay 2905 has decoupled the portion of the power L2 from the corresponding terminal of the lower heating element 2965 whereas the portion of the power L1 may be provided to the remaining terminal of the lower heating element 2965 via the second relay 2955 and the high temperature cut off 2960 located within the water heater 2901. Accordingly, in the default mode of operation, the water heater 2901 heats the water in the upper portion of the tank subject to the demand by the customer, but does not allow operation of the lower heating element 2965.

Figure 31:
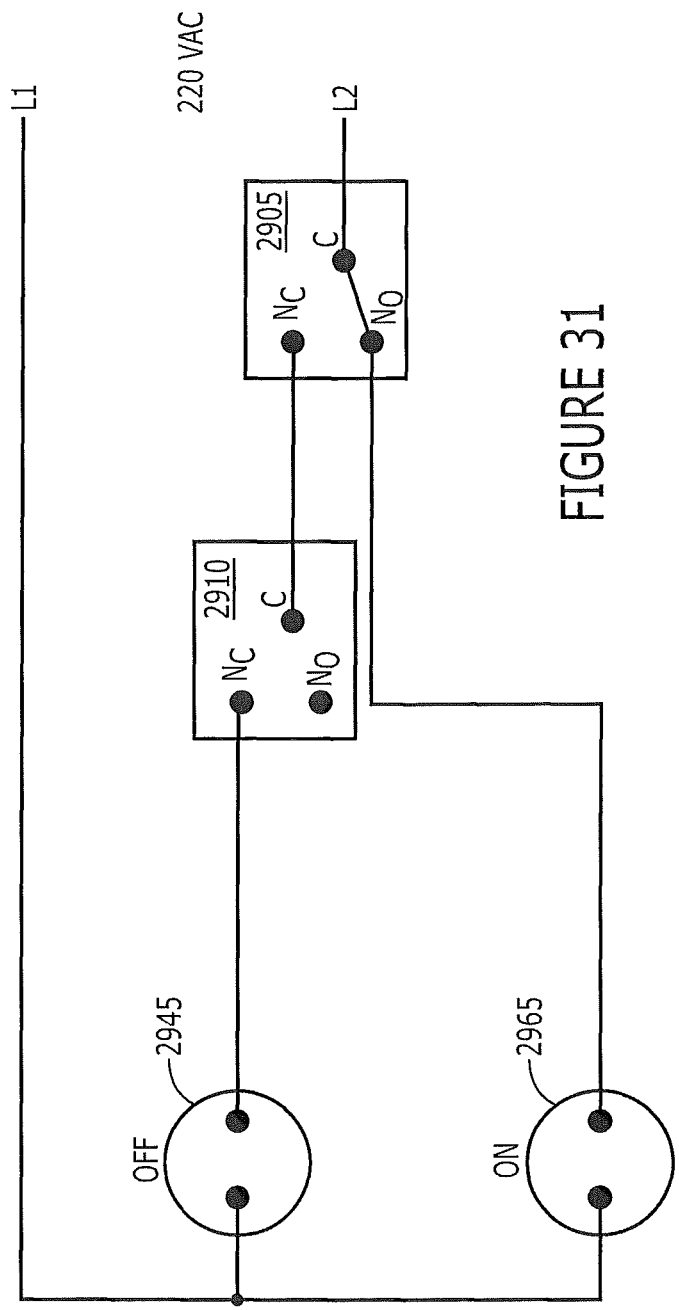

FIG. 31 is a circuit schematic which illustrates operations of the control module 2900 in an energy storage mode in some embodiments according to the invention. In particular, the processor circuit 2915 has received the remote control signal 2925 indicating the water heater 2901 is to be used for storage of excess power. The processor circuit 2915 operates to place the lower heating element control relay 2905 is a state such that the portion of the power L2 is switched from the common (C) input terminal to the normally open (NO) terminal. The portion of the power L2 is then provided to a first terminal of the lower heating element 2965. The remaining portion of the power L1 is provided to the second terminal of the lower heating element 2965 so that the lower heating element 2965 is switched on to heat water in the lower portion of the tank. It will be further understood that once the temperature of the water in the lower portion of the tank reaches the temperature specified by the thermostat control relay 2955, power is removed from the lower heating element 2965. Subsequently, when the temperature of the water in the lower portion drops below the temperature set by the thermostat control relay 2955, power may again be supplied to the lower heating element 2965 by the relay 2955 if the load control module maintains the portion of the power L2 to the lower heating element 2965.

As also shown in FIG. 31, when the lower heating element control relay 2905 is switched to provide power to the normally open (NO) terminal, the power is removed from the normally closed (NC) terminal thereof which in turn removes power from the normally closed (NC) terminal output of the upper heating element control relay 2910. Accordingly, the upper heating element 2945 turns off and does not heat water in the upper portion of the tank during energy storage mode. Therefore, in operation, the water in the lower portion of the tank is heated to store energy under control of the electrical service provider which may in turn be used at a later time by the customer.

Figure 32:
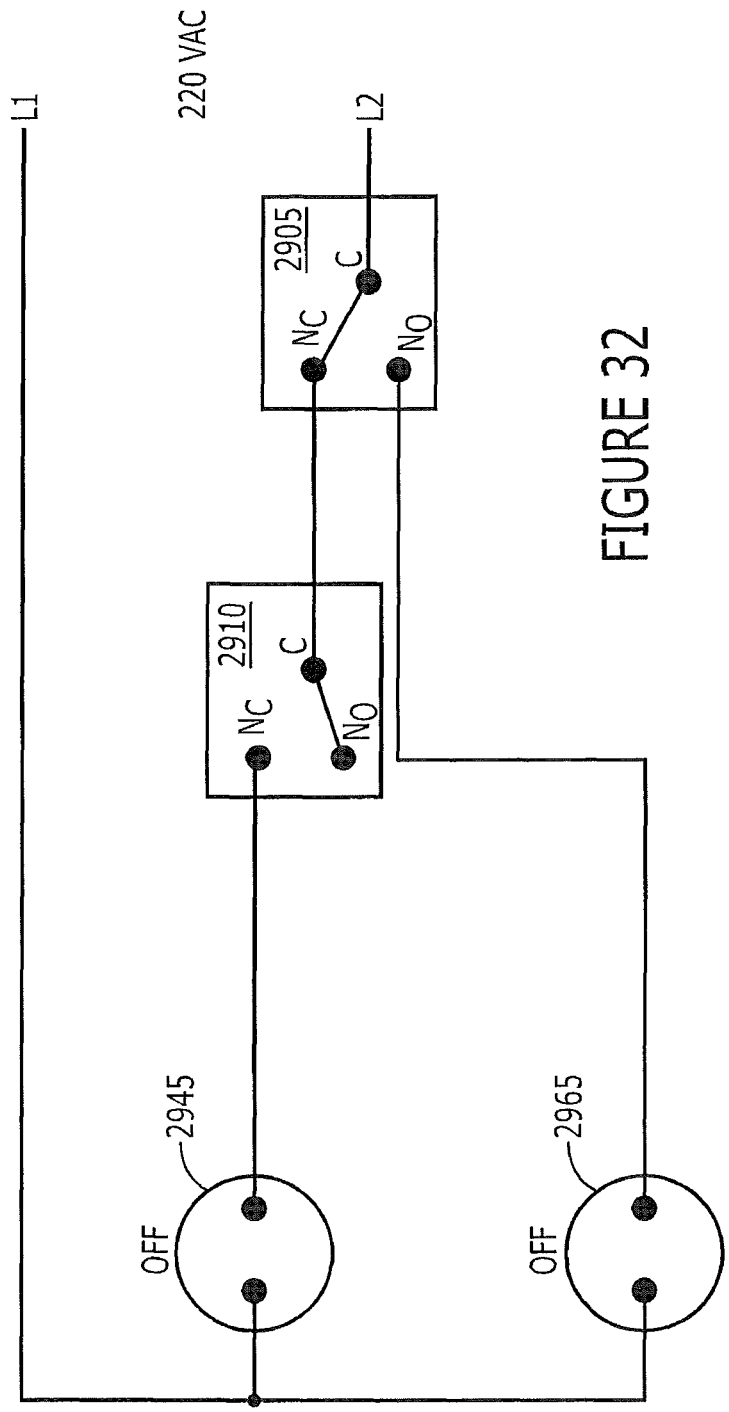

According to FIG. 32, the processor circuit 2915 receives the remote control signal 2925 indicating both heating elements are to be switched off. Accordingly, the processor circuit 2915 places the lower heating element control relay 2905 in a state such that the portion of the power L2 is provided to the normally closed (NC) terminal output. Therefore, power is removed from the normally opened (NO) terminal of the relay 2905, thereby decoupling power from the lower heating element 2965. Still further, the processor circuit 2915 controls the relay 2910 so the portion of the power L2 provided at the common (C) input thereof is switched to the normally open (NO) terminal which decouples power from the normally closed (NC) terminal and therefore disables the upper heating element 2945 so that both the upper and lower heating elements do not heat water.

Figure 33:
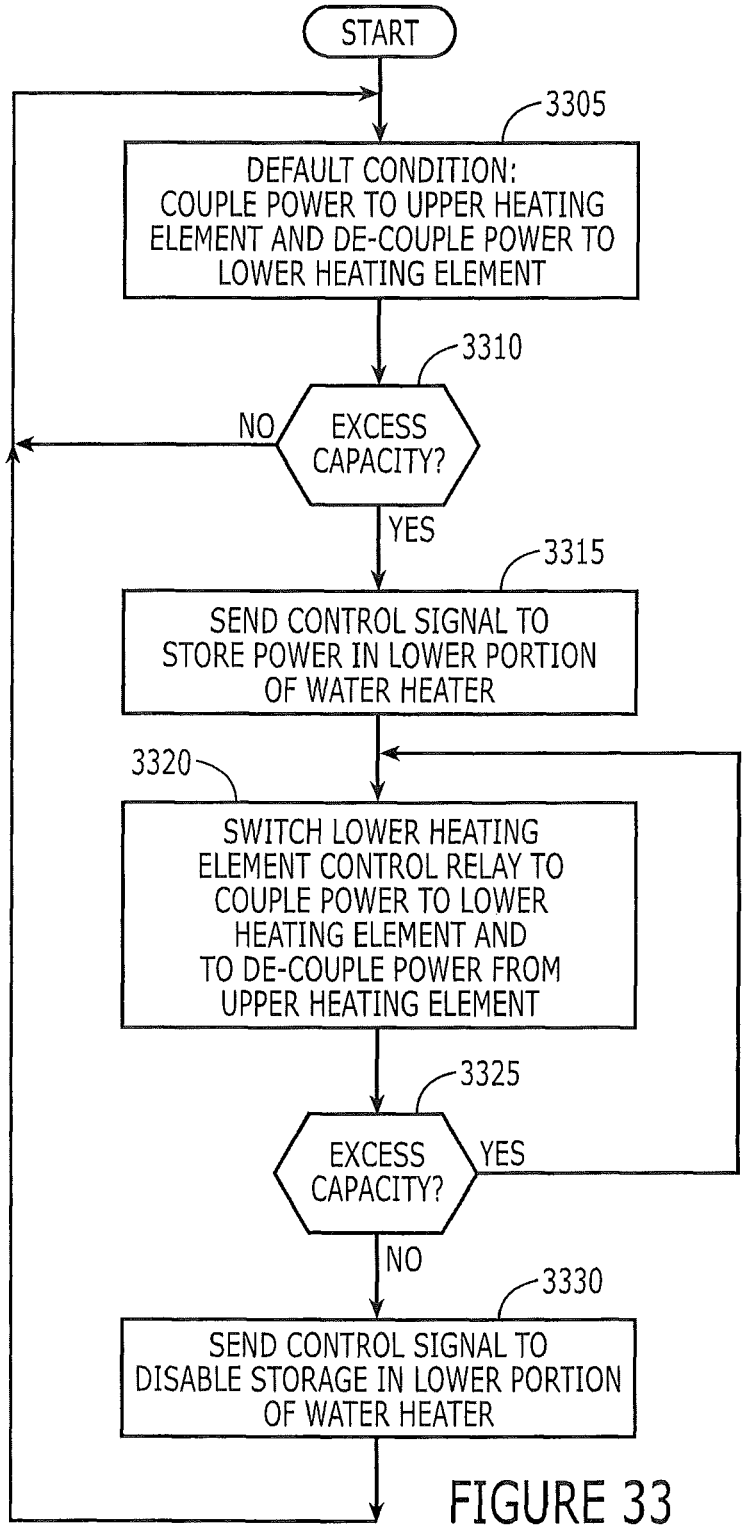
FIG. 33 is a flowchart illustrating operations of embodiments according to the present invention.

FIG. 33 is a flowchart which illustrates operations of the load control module 2900 in some embodiments according to the invention. According to FIG. 33, the default condition applies to the water heater 2901 so that power is coupled to the upper heating element 2945 and is de-coupled from the lower heating element 2965 so that only the upper heating element 2945 is allowed to heat water in the tank (Block 3305).

When the electrical service provider determines excess capacity is available for storage as hot water within the water heater 2901 (Block 3310), the remote control signal 2925 is sent to the processor circuit 2915 within the load control module 2900. The remote control signal 2925 indicates power is to be stored in the lower portion of the water tank by allowing the lower heating element 2965 to receive power (Block 3315).

Accordingly the load control module 2900 configures the lower heating element control relay 2905 and the upper heating element control relay 2910 such that the portion of the power L2 is provided only to the lower heating element 2965 via the external terminal 2935 located on the housing of the water heater 2901. In contrast, the portion of the power L2 is removed from the upper heating element 2945 (Block 3320).

These operations continue until the electrical service provider determines excess capacity is no longer available for storage (Block 3325), whereupon the remote control signal 2925 is provided to the processor circuit 2915 indicating the lower heating element 2965 is to be disabled (Block 3330). Accordingly, the default condition is again applied to the lower heating element control relay 2905 and the upper heating element control relay 2910 so power is provided to only the upper heating element 2935 and removed from the lower heating element 2965.

It will be understood the processor circuit 2915 may maintain the operation of the load control module 2900 to enable the lower heating element 2965 until the lower thermostat relay 2955 removes power from the other terminal of the lower heating element 2965 once the water in the lower portion of the tank reaches the threshold temperature associated with the thermostat relay 2955. It will be further understood the processor circuit 2915 can determine when the lower heating element 2965 has been disabled by the lower thermostat relay 2955 by monitoring current flow associated with a portion of the power L2 coupled to the lower heating element 2965. Still further, in some embodiments according to the invention, the water heater 2901 may provide an external signal from the upper thermostat relay 2950 and/or the lower thermostat relay 2955 indicating the respective thermostat has disabled the respective heating element 2945 and 2965. Accordingly, the processor circuit 2915 can alert the electrical service provider that the lower portion of the tank has reached capacity for storage of excess power.

As described above, an electrical service provider can maintain control of storage water heaters located at customer locations (e.g., residences and/or businesses) so that generated excess electrical power (e.g., power produced above demand) can be stored by heating water that would otherwise be heated when demand is higher. For example, the lower heating elements may be enabled by the electrical service provider during hours when demand for power is less, such as during the night. The heating of the water in the lower portions of the water heaters during the night may reduce the need to heat water during periods of greater demand, thereby storing the excess generated electrical power in the form of hot water.

It will be understood that the energy storage devices (such as the different portions of the single water heaters) described herein can be enabled/disabled for the purposes of balancing demand and capacity as discussed above in reference to FIGS. 17-21. For example, the electrical service provider (or other organization) can enable/disable the heating elements in a water heater at customer location via respective networks, such as the Internet, connected to an internal network at the customer locations. Further, the respective networks at the customer locations may be coupled to a system such as that described above in reference to FIG. 2A including the processor circuit 200, which can operate the upper and lower heating elements in the single water heaters via the relay configurations shown in the figures.

In still other embodiments according to the invention, the energy storage devices can be provided by, for example, three different portions of a single water heater which can be enabled/disabled for the purposes of storing generated electricity in the form of heated water to, for example, address imbalances associated with a power grid. For example, in some embodiments according to the invention, a load imbalance on the grid may be addressed by remotely controlling the activation of selected heating elements (in selected single water heaters) located in particular regions of the grid. Furthermore, a phase imbalance can also be addressed by enabling/disabling heating elements in selected single water heaters that are powered by a particular phase of the voltage distributed by the power grid. In still other embodiments according to the invention, remotely controlling the activation of selected heating elements (in selected single water heaters) can address both the load imbalance as well as a phase imbalance.

Figure 34:
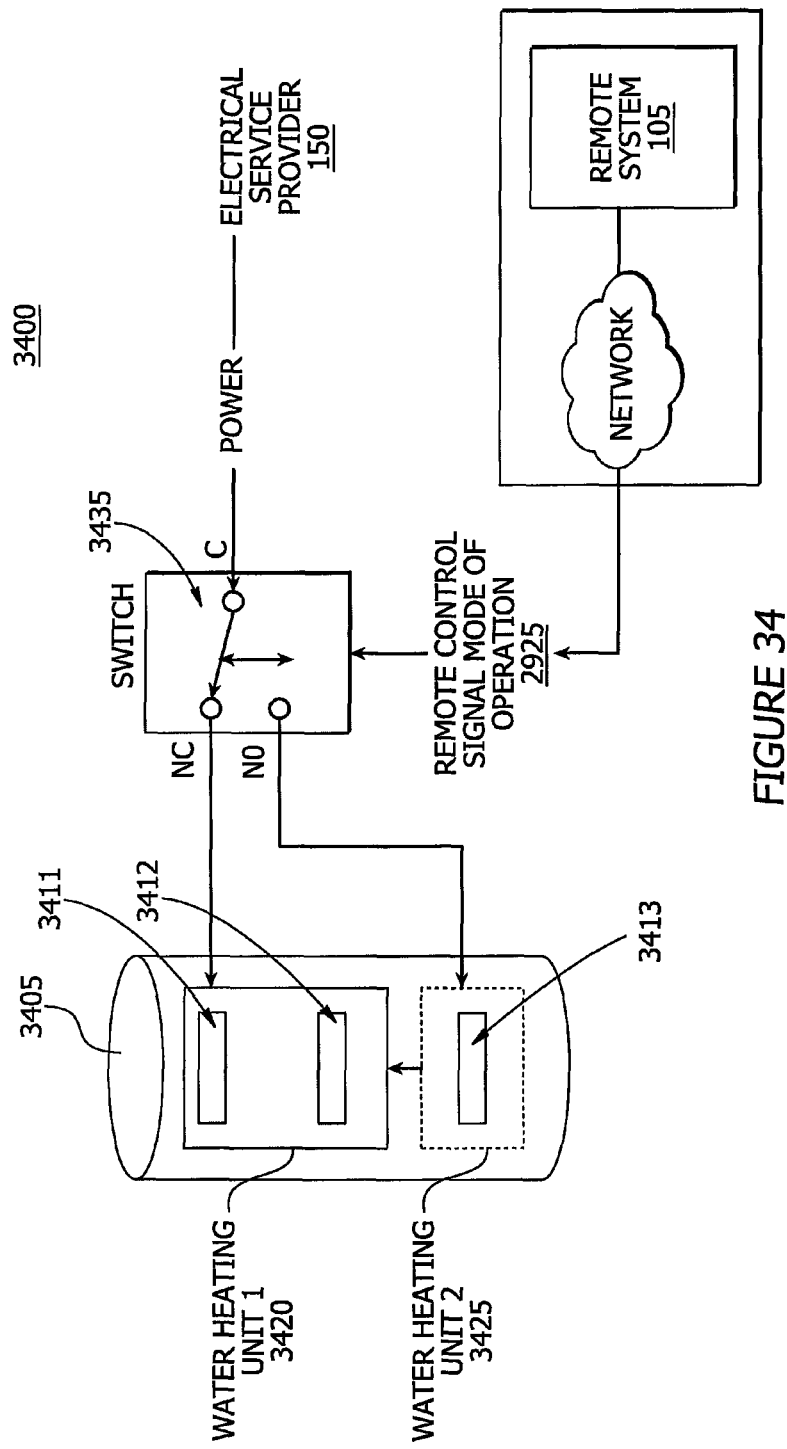
FIG. 34 is a schematic illustration of a system that includes a single water heater having three heating elements configured for separate remote control by a remote system in some embodiments according to the invention.

FIG. 34 is a schematic illustration of a system 3400 that includes a single water heater 3405 having three water heating elements therein in some embodiments according to the invention. According to FIG. 34, the single water heater 3405 includes first, second, and third water heating elements 3411, 3412, and 3413, respectively. The water heating elements 3411-3413 can be logically grouped into water heating units where each water heating unit includes at least one of the water heating elements 3411-3413. In particular, a first water heating unit 3420 includes the first and second water heating elements 3411 and 3412, whereas a second water heating unit 3425 includes only the third water heating element 3413.

It will be understood that the configuration described above and shown in FIG. 34 is only exemplary and the present disclosure is not limited to the particular configuration shown. For example, the water heating units may include more water heating elements and, moreover, the single water heater 3405 may include more than two water heating units.

In operation, the first and second water heating units can be remotely controlled, separately from one another, by the remote system 105. For example, in some embodiments according to the invention, in a default mode of operation the remote system 105 can remotely couple power to the first water heating unit while blocking power to the second water heating unit, whereas in a utility controlled mode of operation, the remote system 105 can remotely couple power to the second water heating unit while blocking power to the first water heating unit.

It will be understood that the term "utility controlled mode" should not be interpreted to limit that a particular "utility" (such as an electrical service provider) owns, operates, or otherwise administers the remote system 105, which provides for the remote control. It will be further understood that, in some embodiments according to the invention, the remote system 105 may contract with electrical service provider and/or customers where the single water heaters are installed. It will be further understood that the customers may own or lease the single water heaters from the electrical service provider, the administrator of the remote system 105, a manufacturer of the single water heater, or a third-party.

The first and second water heating units 3420 and 3425, can be separately provided with power responsive to the mode of operation indicated by the remote system 105. In particular, the remote system 105 can transmit an indication of the mode in which the single water heater 3405 is to operate. The indication of the mode of operation can be used to selectively couple power to the appropriate water heating unit. It will be understood that the term "remote control signal 2925" is sometimes also used herein to refer to the indication of the mode of operation of the single water heater 3405.

In some embodiments according to the invention, when the remote system 105 indicates that the single water heater 3405 is to operate in the default mode of operation, power can be coupled to the first water heating unit 3420 via a switch 3435 so that the first water heater unit operates as described herein. Moreover, the second water heating unit 3425 does not receive power in the default mode of operation, so that the water in the lowest most portion of the single water heater 3405 is not heated.

When the remote system 105, however, transmits the indication that the single water heater 3405 is to operate in the utility controlled mode, the power can be switched away from the first water heating unit 3420 to the second water heating unit 3425. Accordingly, the first water heating unit 3420 does not receive power in the utility controlled mode, whereas the second water heating unit 3425 does receive power and can therefore heat the water in the lowest most portion of the single water heater 3405. Accordingly, the remote system 105 can remotely control which mode of operation the single water heater 3405 is to operate in.

For example, when the remote system 105 determines (or is provided with information indicating) that an imbalance exists on the grid, selected ones of the water heaters 3405 can be utilized to address the imbalance by changing the mode of operation of the selected single water heaters 3405. For example, when it is determined that additional load should be added to address the imbalance, the remote system 105 may remotely place selected ones of the second water heating units 3425 in the utility controlled mode to store energy in the form of preheated water.

The preheated water that is stored in the lowest most portion of the single water heater 3405 may be preheated for the first water heating unit 3420. In particular, the water heated in the lowest most portion of the single water heater 3405 may flow from the second water heating unit 3425 to the first water heating unit 3420 to exit the single water heater 3405. Therefore, when the water in the lowest most portion of the single water heater 3405 is preheated by the second water heating unit 3425, the first water heating unit 3420 may heat the water less due to the preheated temperature of the water provided.

Therefore, as appreciated by the present inventor, the remote system 105 may utilize selected ones of the single water heaters 3405 to aggregate demand to address imbalances in the power grid, such as power that is generated by transient power sources (such as solar or wind), while also providing the additional benefit of preheating water for use at the customer location when called on.

Referring again to FIG. 34, the first and second water heating elements 3411 and 3412 in the first water heating unit 3420 are configured so that the first water heating element 3411 is given a higher priority than the second water heating element 3412. For example, when power is supplied to the first water heating unit 3420, the first water heating element 3411 may be provided with power to heat water in the uppermost portion of the single water heater 3405 to a target temperature that is indicated by a thermostat control relay associated with the first water heating element 3411. While the first water heating element 3411 is heating the water in the uppermost portion of the single water heater 3405, power to the second water heating element 3412 is blocked.

When, however, the water in the uppermost portion of the single water heater 3405 is heated to the target temperature, the power is switched away from the first water heating element 3411 to the second water heating element 3412, whereupon the water in an intermediate portion of the single water heater 3405 can be heated to an associated target temperature indicated by a second thermostat control relay associated therewith.

It will be understood, however, that if the temperature in the uppermost portion of the single water heater 3405 were to drop below the target temperature associated therewith, the priority configuration of the first and second water heating elements 3411 and 3412 is such that power would be switched away from the second water heating element 3412 back to the first water heating element 3411 to again heat water to the target temperature associated therewith without heating water in the intermediate portion of the single water heater 3405 until the target temperature for the uppermost portion is again met. It will be further understood that the prioritized configuration described herein is only exemplary and the present disclosure is not limited to only these types of operations of the water heating elements in the water heating units.

It will be further understood that some of the components and operations described above as being responsive to the remote system 105 to control the water heating units can be provided by, for example, the load control module 2900 described above in reference to, for example, FIG. 29. In particular, the processor circuit, the transceiver circuit, and other components shown on the load control module 2900 may be used. Still further, operations of the load control module 2900 may be provided by the system shown in FIG. 2*a*, in some embodiments according to the invention.

It will be understood that each of the heating elements 3411-3413 can be an electric water heating element, such as 4500 W heating element. In some embodiments according to the invention, the heating elements 3411-3413 can be oriented horizontally as shown in FIG. 34, however, in other embodiments according to the invention, some or all of the heating elements 3411-3413 can be oriented vertically. In some embodiments according to the invention, the lower heating element 3413 is oriented vertically. In some embodiments according to the invention, the lower heating element 3413 can be a gas heating element.

In some embodiments according to the invention, the water heater 3405 can be configured so that the first water heating unit 3420 as an associated volume of about 45 gallons, whereas a combined capacity of the first and second water heating units is about 75 gallons. In some embodiments according to the invention, the water heater 3405 is rated to have a standby heat loss of about 1.3 kWh per day and a recovery rate of about 30 gallons per hour operating from a 240 V AC source using heating elements rated at about 4500 W each.

Figure 35:
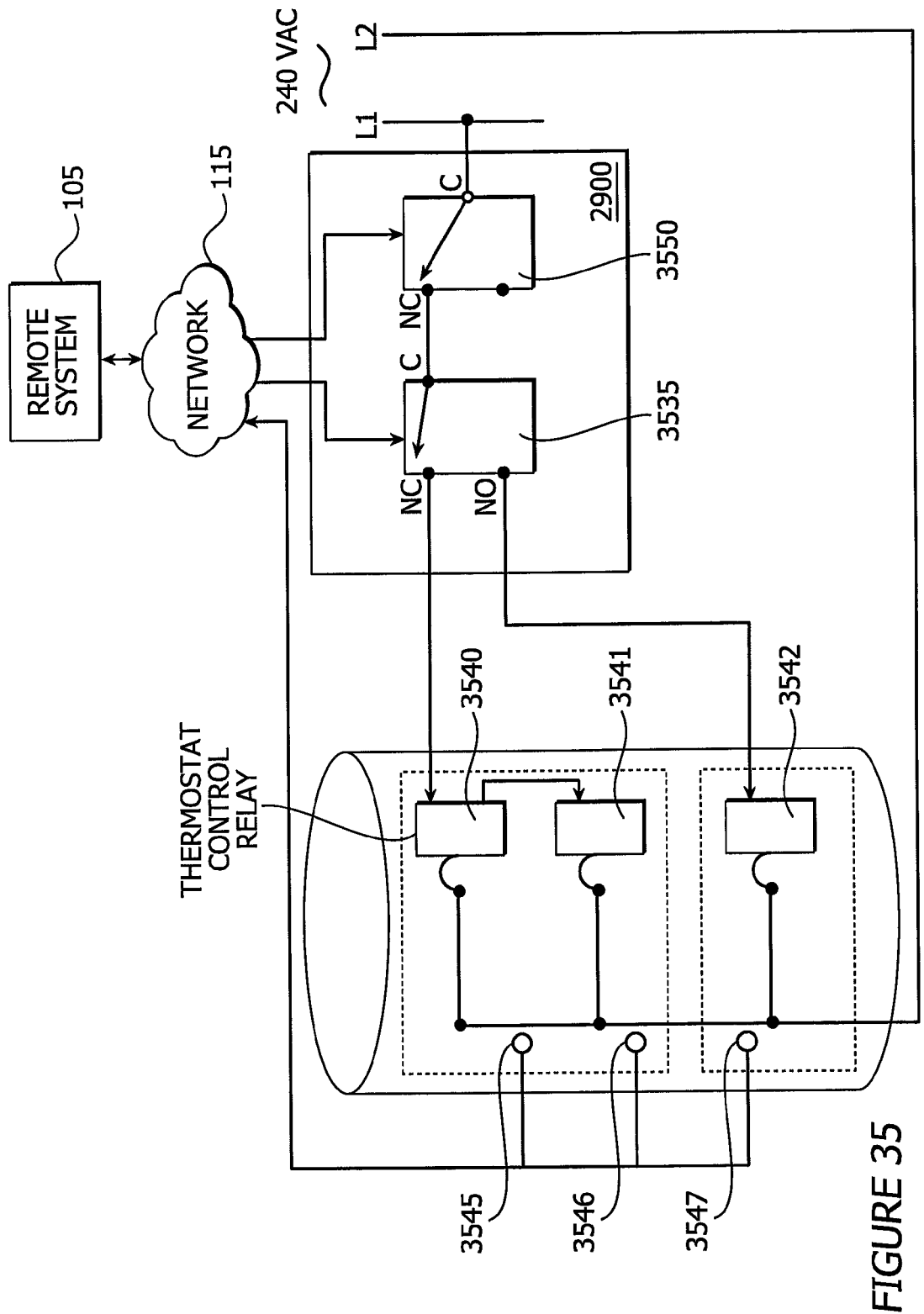
FIG. 35 is a schematic illustration of a system including a single water heater configured for separate remote control of water heating units by the remote system using a load control module in some embodiments according to the invention.

FIG. 35 is a schematic illustration of a system 3500 including the single water heater 3405 configured for remote control of the water heating units separately from one another by the remote system 105 using the load control module 2900 in some embodiments according to the invention. According to FIG. 35, in addition to the elements described above in reference to FIG. 34, the single water heater 3405 can also include first-third thermostats control relays 3540-3542 each of which is associated with a respective one of the water heating elements 3411-3413, to provide the operations described above in reference to FIG. 34.

According to FIG. 35, when the remote system 105 provides the indication to the system 3500 that the single water heater 3405 is to operate in the default mode, power is switchably coupled to the first thermostat control relay 3540 via the switch 3435 to power the first water heating element 3411. In response, the water in the uppermost portion of the single water heater 3405 can be heated to the target temperature under the control of the first thermostat control relay 3540.

When the water in the uppermost portion of the single water heater 3405 reaches the target temperature, the first thermostat control relay 3540 switches power away from the first heating element 3411 and instead switches the power to the second thermostat control relay 3541, which powers the second water heating element 3412 until the corresponding target temperature for the second thermostat control relay 3541 is achieved in the intermediate portion of the single water heater 3405. Moreover, power is not provided to the third thermostat control relay 3542 during the default mode of operation, which keeps the third water heating element 3413 off so that the water in the lowest most portion of the single water heater 3405 is not heated.

As further shown in FIG. 35, the single water heater 3405 includes temperature sensors 3545-3547 each of which is associated with a respective portion of the single water heater 3405. In particular, the first temperature sensor 3545 is configured to measure the temperature of water in the uppermost portion of the single water heater 3405, whereas the second temperature sensor 3546 is configured to measure the temperature of water in the intermediate portion, and the third temperature sensor 3547 is configured to measure the temperature of water in the lowest most portion of the single water heater 3405.

An indication of each of these temperatures can be provided to the load control module 2900, which may in turn forward the temperature values to the remote system 105 for use in remotely controlling the water heating units in the single water heater 3405 as part of the overall system in addressing imbalances in the power grid. It will be understood that, in some embodiments according to the invention, more or fewer temperature sensors may be used.

Still referring to FIG. 35, the load control module 2900 can include a second switch 3550 that is coupled to at least a first leg L1 of the ac voltage used to power the single water heater 3405. A second leg L2 of the ac voltage can be provided directly to the single water heater 3405 without routing through the load control module 2900 in some embodiments according to the invention. In such embodiments, the second leg L2 can be provided to one terminal of each of the water heating elements 3411-3413 as shown.

The second switch 3530 is configured to switchably couple the first leg L1 away from both of the water heating units responsive to a load shed indication from the remote system 105 via the network 115. Accordingly, in the load shed mode, the second switch 3550 can switch the first leg L1 to an open output terminal so that the first leg L1 is blocked from both the first and second water heating units 3420 and 3425. In the load shed mode, therefore, the remote system 105 can completely disable operation of the single water heater 3405 when the remote system 105 determines, for example, that the single water heater 3405 should be completely removed from the power grid.

When, however, the load shed mode indication is not specified, the second switch 3550 switches the first leg L1 to the input of the first switch 3435 for coupling to the selected water heating unit 3420 or 3425 responsive to the indication of the default mode/utility controlled mode indication. Accordingly, when the load shed mode is disabled, the first switch 3435 operates as described above in reference to FIG. 34 to provide power to either the first or second water heating unit 3420 or 3425.

As further shown in FIG. 35, in some embodiments according to the invention, the indications of the temperatures in each of the different portions of the single water heater 3405 can be provided to the remote system 105 via the load control module 2900. The remote system 105 can utilize the temperature indications of each of the portions of the single water heater 3405 to determine which of the single water heaters 3405 distributed among a plurality of customer locations may be utilized to address the imbalances described herein.

For example, if the temperature indications show that the lower portion of the single water heater 3405 is relatively cold, the remote system 105 can select one the single water heaters 3405 as one being available for storage of electricity in the form of heated water. Similarly, the remote system 105 can use the temperature indications of the other portions of the single water heater 3405 to determine whether the intermediate and upper portions of the water heater could be utilized as additional load to address an imbalance.

For example, if the remote system 105 were to determine that the temperatures in the intermediate and upper portions of the single water heater 3405 are relatively low, the remote system 105 may select the first water heating unit 3420 as being available to take on an additional load to address an imbalance. In particular, the remote system 105 can estimate the amount of load that could be stored by the first water heating unit 3420 based on the temperature indications and other parameters such as capacity and historical data associated with the customer location.

Figure 36:
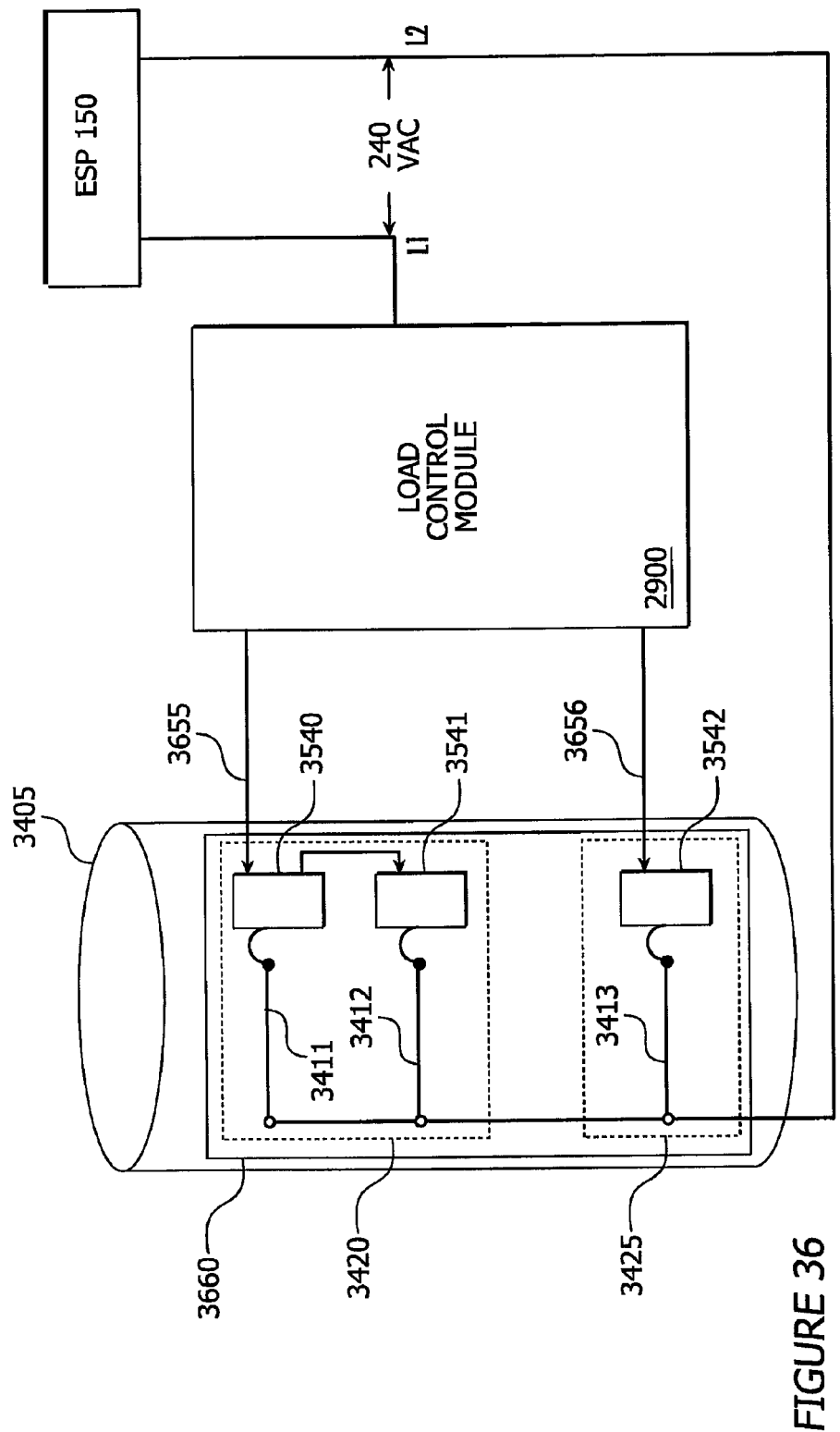
FIG. 36 is a schematic illustration of a system including a single water heater coupled to an external load control module in some embodiments according to the invention.

FIG. 36 is a schematic illustration of a system 3600 including a single water heater 3405 coupled to an external load control module 2900 in some embodiments according to the invention. According to FIG. 36, the single water heater 3405 is configured as described above, for example, in reference to FIGS. 34 and 35. In addition, external wiring is provided to electrically couple the single water heater 3405 to the external load control module 2900.

In some embodiments according to the invention, a first wire 3655 can be provided from the external load control module 2900 to the first thermostat control relay 3540 coupled to the first water heating element 3411 in the uppermost portion of the water heater tank 3660. In operation, the external load control module 2900 can switchably couple power to the first water heating unit 3420 in the default mode of operation using the first wire 3655.

A second wire 3650 can be provided to couple the external load control module 2900 to the third thermostat control relay 3542 coupled to the third water heating element 3413 located in the lowest portion of the water tank 3660. In operation, the external load control module 2900 can switchably couple power to the second water heating unit 3425 in the utility controlled mode of operation using the second wire 3650.

Accordingly, the first and second wires 3655 and 3650 can be provided from an external load control module 2900 to retrofit a two water heating element water heater with a third water heating element, which can be coupled to the external load control module 2900. It will be understood that the external load control module 2900 can be separate from the single water 3405, but be located proximate to the water heater 3405 at the customer location to facilitate connection to the first and second wires 3655 and 3650.

It will be understood that the load control module 2900 can be "integrated" with the single water heater 3405 in some embodiments according to the invention. It will be understood that, as used herein, the term "integrated" includes arrangements where the load control module (i.e., a control device) is configured to receive communication from a grid operator, electric service provider or utility, or other energy services company that can provide real-time control of the heating element(s). Further, the load control module can be integrated into the water heater at the point of manufacture or via a retrofit of an existing water heater using external wiring, for example, as described above in reference to FIG. 36 if the load control module 2900 were not external to the single water heater 3405.

It will be further understood that the term "real-time control" includes bi-directional communication allowing remote enabling/disabling of the heating element(s) as frequently as every second and may allow for verification that such control occurred or failed. Further information regarding the integration of control devices with water heaters used as storage water heaters is available at http://www.regulations.gov/#!documentDetail;D=EERE-2012-BT-STD-0022-0158.

Figure 37:
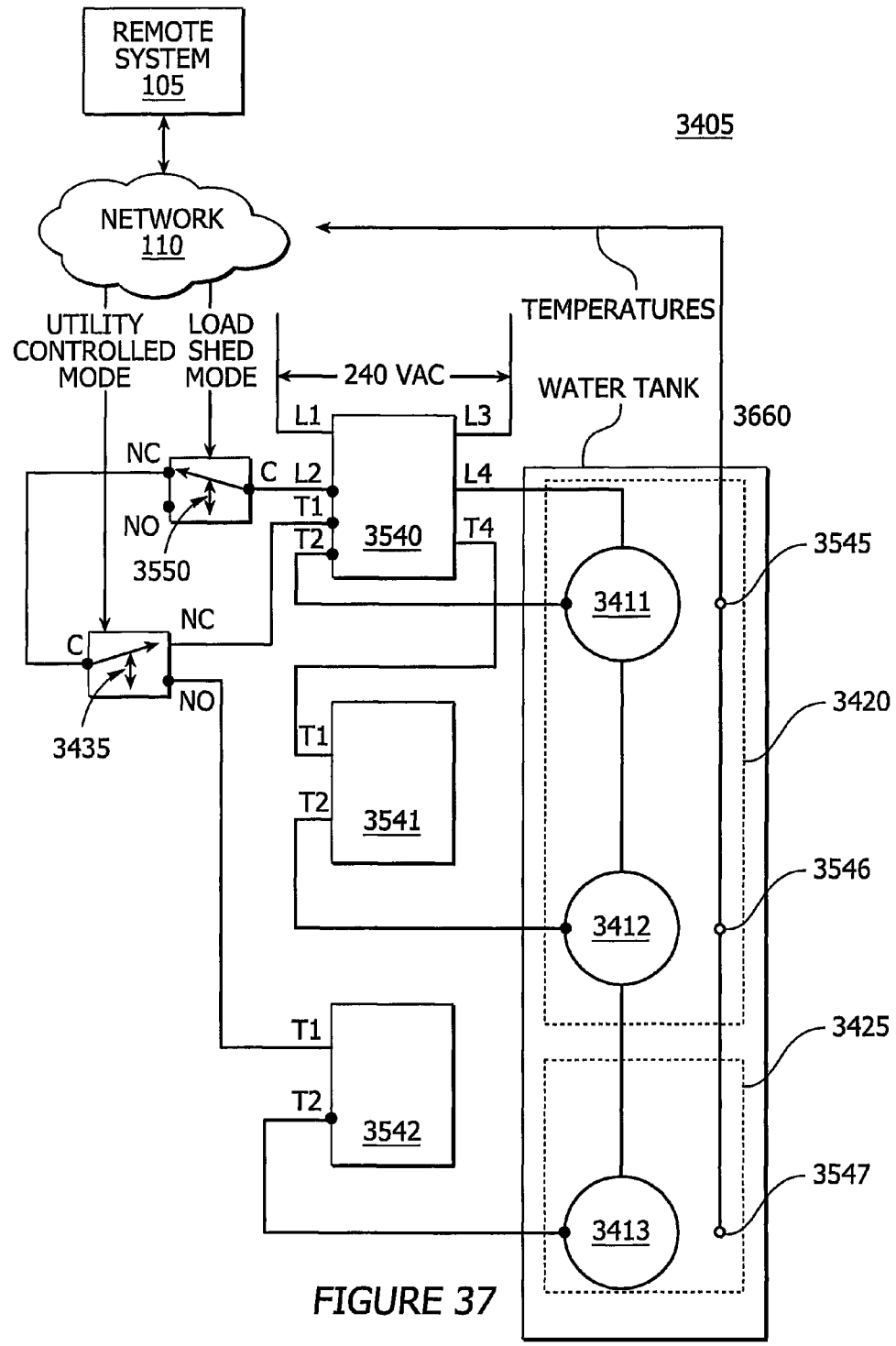
FIG. 37 is a schematic illustration of the single water heater coupled to components of the external load control module in communication with the remote control system in some embodiments according to the invention.

FIG. 37 is a schematic illustration of the single water heater 3405 coupled to components of the external load control module 2900 in communication with the remote control system 3430 in some embodiments according to the invention. It will be understood, however, that an analogous configuration may be used for connection to an integrated load control module 2900 in some embodiments according to the invention.

In particular, FIG. 37 illustrates the first and second switches 3550 and 3435 on the load control module 2900 coupled to the first through third thermostats control relays 3540-3542 included in the single water heater 3405. In particular, a first leg L1 of the ac voltage is provided to a terminal L1 of the thermostat control relay, whereas a second leg L2 of the ac voltage is provided to a second terminal L3 at the first thermostat control relay 3540.

It will be understood that the first thermostat control relay 3540 can include high temperature cut off feature which can block any power from being provided to any of the water heating elements in the water heater 3405 if the internal tank temperature exceeds a specified value. If the specified value for the maximum temperature of the tank is exceeded, the first thermostat control relay 3540 will disconnect both the first and second legs L1 and L2 from all of the thermostats in the single water heater 3405.

The first thermostat control relay 3540 provides the first leg L1 to the first switch 3550 which operates under control of the load shed mode signal provided by the remote system 105. In a default configuration, the first switch 3550 maintains a connection between the common terminal and the normally closed terminal of the switch so that the first leg L1 is provided to the common terminal of the second switch 3530 which operates responsive to the utility control mode signal.

When the utility controlled mode signal indicates that the water heater 3405 should operate in the default mode, the second switch 3435 provides the first leg L1 to the T1 input to the first thermostat control relay 3540. It will be understood that that the first thermostat control relay 3540 switches the first leg L1 to the T2 terminal if the temperature of the water included in the uppermost portion of the water heater 3405 is less than a particular value set by the first thermostat control relay 3540. Accordingly, the first thermostat control relay 3540 can couple both legs L1 and L2 to the first heating element 3411 via the T2 terminal and the L4 terminal.

Once the temperature of the water in the uppermost portion of the water heater 3405 reaches the particular temperature specified by the first thermostat control relay 3540, the first leg L1 is switched away from the T2 terminal to the T4 terminal so that the second thermostat control relay 3541 receives the first leg L1 at terminal T1.

It will be understood that the second thermostat control relay 3541 switches power to the T2 terminal if the water in the intermediate portion of the water heater 3405 remains below the particular temperature specified by the second thermostat 3541 so that power is provided to the second water heating element 3412. Once the temperature of the water in the intermediate portion of the water heater 3405 reaches the particular temperature specified by the second thermostat control relay 3541, however, the first leg L1 is removed from the second heating element 3412.

If, however, the remote system 105 transmits an indication that the single water heater 3405 should operate in the utility controlled mode, the switch 3435 switches power away from the first thermostat control relay 3540 to the third thermostat control relay 3542. Accordingly, in utility controlled mode, the first and second thermostat control relays do not receive power so that the first and second heating elements 3411 and 3412 do not heat the water in the associated portions of the single water heater 3405.

In the utility controlled mode, however, the third thermostat control relay 3542 switches power to the third water heating element 3413 via the T2 terminal. Once the water in the lowest portion of the single water heater 3405 reaches the particular temperature specified by the third thermostat control relay 3542, however, power is switched away from the T2 terminal so that the third water heating element is switched off. It will be understood that the temperature sensors 3545-3547 can be utilized by the remote system 105 to determine temperatures in each of the associated portions of the single water heater 3405.

Figure 38:
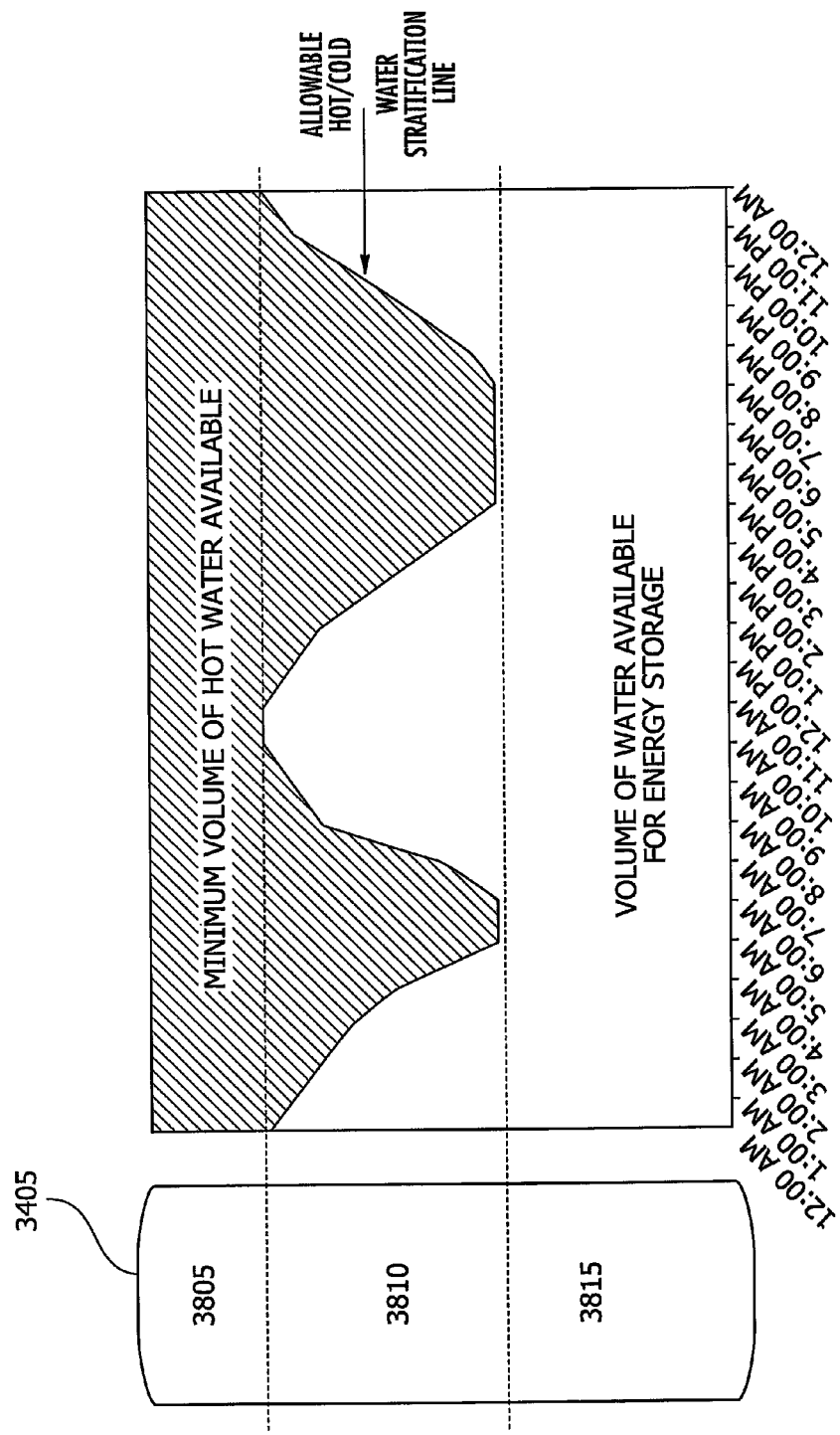
FIG. 38 is a schematic illustration of variation in the volume of hot water available to the customer location from the single water heater in some embodiments according to the invention.

FIG. 38 is a schematic representation of the utilization of the single water heater 3405 as an energy storage device by the remote system 105 in some embodiments according to the invention. According to FIG. 38, an uppermost portion of the water heater 3805 and an intermediate portion of the water heater 3810 can be remotely controlled by the remote system 105 to provide hot water to the customer location by maintaining the water heater 3405 in the default mode of operation.

As further shown in FIG. 38, however, the lowest portion of the water heater 3815 is switched off in the default mode of operation such that only the uppermost portion and intermediate portion 3805 and 3810 are used to heat water. Accordingly, the volume of hot water that is available to the customer location is depicted as a varying amount of the upper and intermediate portions 3805 and 3810, over the course of one day as a result of demand placed upon the water heater 3405 by usage at the customer location.

As further illustrated in FIG. 38, because the lowest portion of the water heater 3815 is not utilized in the default mode of operation, it remains available for storage of energy in the form of hot water when the remote system 105 remotely controls the single water heater 3405 to operate in the utility control mode of operation to store energy in the form of hot water which is then available as preheated water for the uppermost and intermediate portions 3805 and 3810 of the water heater 3405.

It will be further understood that the volumes of water available in the water heater 3405 can be represented by the stratification lines shown marking the proximate boundaries between the uppermost portion 3805, the intermediate portion 3810 and the lowest most portion 3815. As shown in FIG. 38, the lowest portion 3815 is not included in the volume of hot water available to the customer location, but instead remains available to the remote system for the storage of energy in the form of hot water. It will be understood that the lowest portion 3815 remains available for energy storage due to thermal layering between hot and cold portions of the single water heater. Therefore, the relatively cold lowest most portion 3815 remains thermally separated from the other relatively warm portions.

Figure 39:
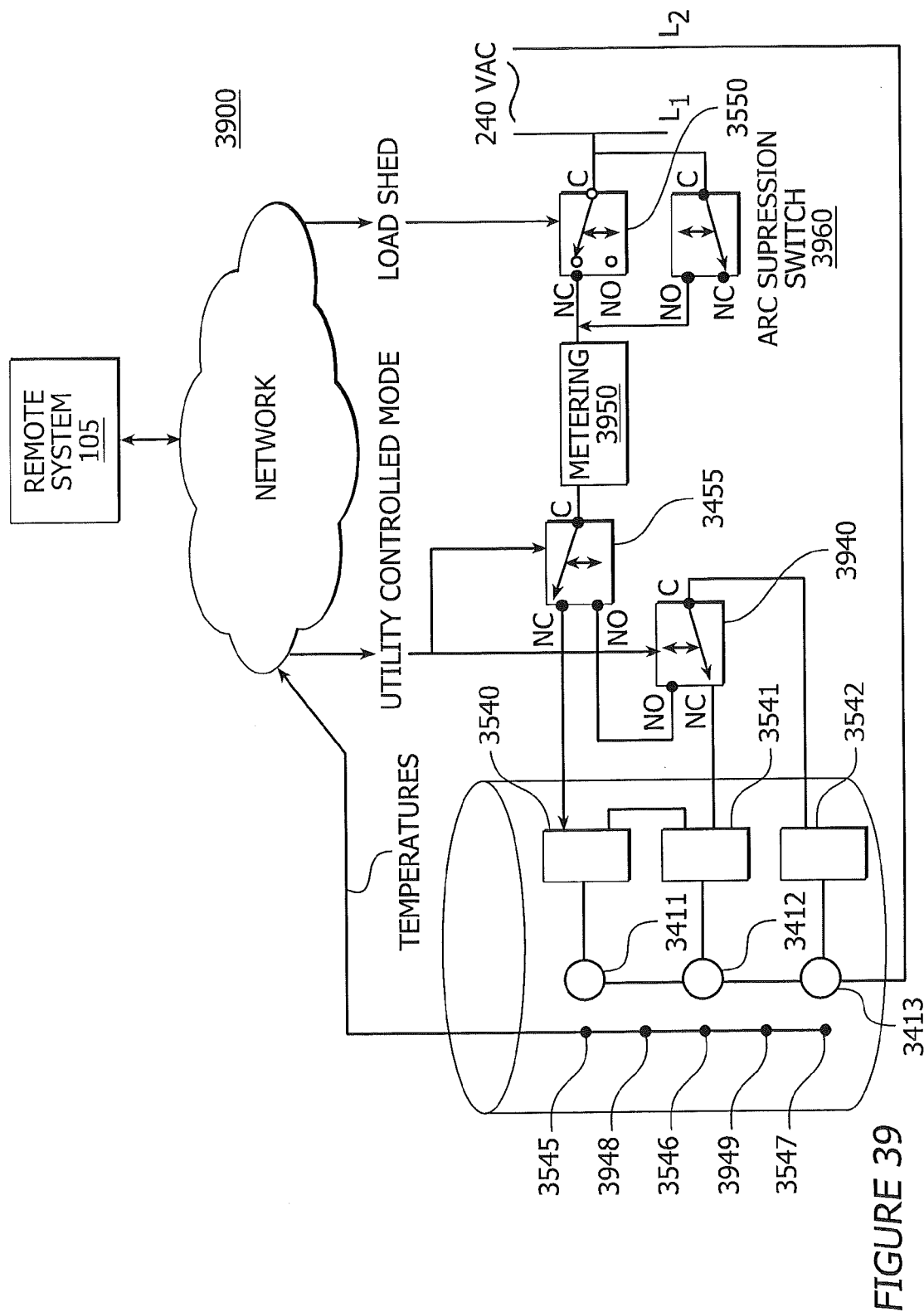
FIG. 39 is a schematic illustration of a system including components of a load control module coupled to the single water heater operating under the control the remote system in some embodiments according to the invention.

FIG. 39 is a schematic illustration of a system 3900 including components of a load control module 2900 coupled to a water heater 3405 operating under the control the remote system 105 in some embodiments according to the invention. According to FIG. 39, an arc suppression switch 3960 is coupled across the switch 3550 and is responsive to the load shed mode of operation. In operation, the arc suppression switch 3960 (which is normally open) can be switched to couple the first leg L1 to the output of the second switch 3550 before the load shed mode indication causes the second switch 3550 close. Accordingly, the arc suppression switch 3960 may shunt across the second switch 3550 to reduce the likelihood of an arc being developed by the switch 3550. In some embodiments according to the invention, the arc suppression switch 3960 can be a semiconductor based switch, such as a triac switch, which may prolong the life of the second switch 3550.

As further shown in FIG. 39, the output from the second switch 3550 is provided to a metering circuit 3950, which can be utilized to measure power provided to the single water heater 3405 in the utility controlled mode as well as in the default mode of operation. For example, when the remote system 105 activates the utility controlled mode for the single water heater 3405, the power provided to heat the water in the lowest portion of the single water heater 3405 can be measured and recorded by the load control module 2900 or communicated to the remote system 105.

When the remote system 105, however, indicates that the single water heater 3405 is to operate in the default mode of operation, the metering circuit 3950 may also measure the power provided to heat the water in the uppermost and intermediate portions of the water heater 3405. Accordingly, in some embodiments according to the invention, the remote system 105 may more accurately determine the power used at the customer location in response to demand placed on it by the customer in contrast to power provided for storage in the form of hot water under the control of the remote system 105 in the utility controlled mode.

As further shown in FIG. 39, a third switch 3940 can also operate responsive to the utility control/default mode of operation. In particular, the third switch 3940 may be configured to electrically couple power from the second thermostat control relay 3541 to the input of the third thermostat control relay 3542 in the default mode of operation, whereas the third switch 3940 can decouple power from the second thermostat control relay 3541 to the third thermostat control relay 3542 in the utility controlled mode of operation.

In some embodiments according to the invention, the third switch 3940 can be utilized by the remote system 105 to maintain still further control over operation of the single water heater 3405. For example, in some embodiments according to the invention, the remote system 105 may utilize the metering circuit 3950 to determine that some portion of the circuitry associated with the first and/or second thermostat control relays 3540 and 3541 is faulty and therefore may configure the third switch 3940 to receive power from the second thermostat control relay 3541 rather than separately. For example, if the uppermost heating element 3411 were to fail, the remote system 105 may configure the switch 3940 to couple the power from the second thermostat 3541 to the input of the third thermostat 3542 so that the two thermostats may operate the second and third water heating elements 3412 and 3413 to provide more hot water to the customer location until the water heater 3405 can be repaired.

In still further embodiments according to the invention, the remote system 105 may configure the third switch 3940 to couple power from the second thermostat control relay 3541 to the third thermostat control relay 3542 if the customer requests additional hot water capacity at specific times. For example, if the customer is aware that additional hot water may be desirable for a specific event or period of time, the customer can contract with the remote system 105 to enable the remote coupling of the second thermostat controlling the 3541 to the third thermostat controlled with 3542 so that all three thermostats may operate in conjunction with one another to heat water in the entire single water heater 3405.

In still further embodiments according to the invention, the remote system 105 may configure the third switch 3940 to periodically switch power from the second thermostat control relay 3541 to the third thermostat control relay 3542 to maintain a minimum temperature in the water tank to, for example, reduce the likelihood of harmful bacteria growth in the water tank due to the water temperature in the tank becoming too low for an extended period.

Figure 40:
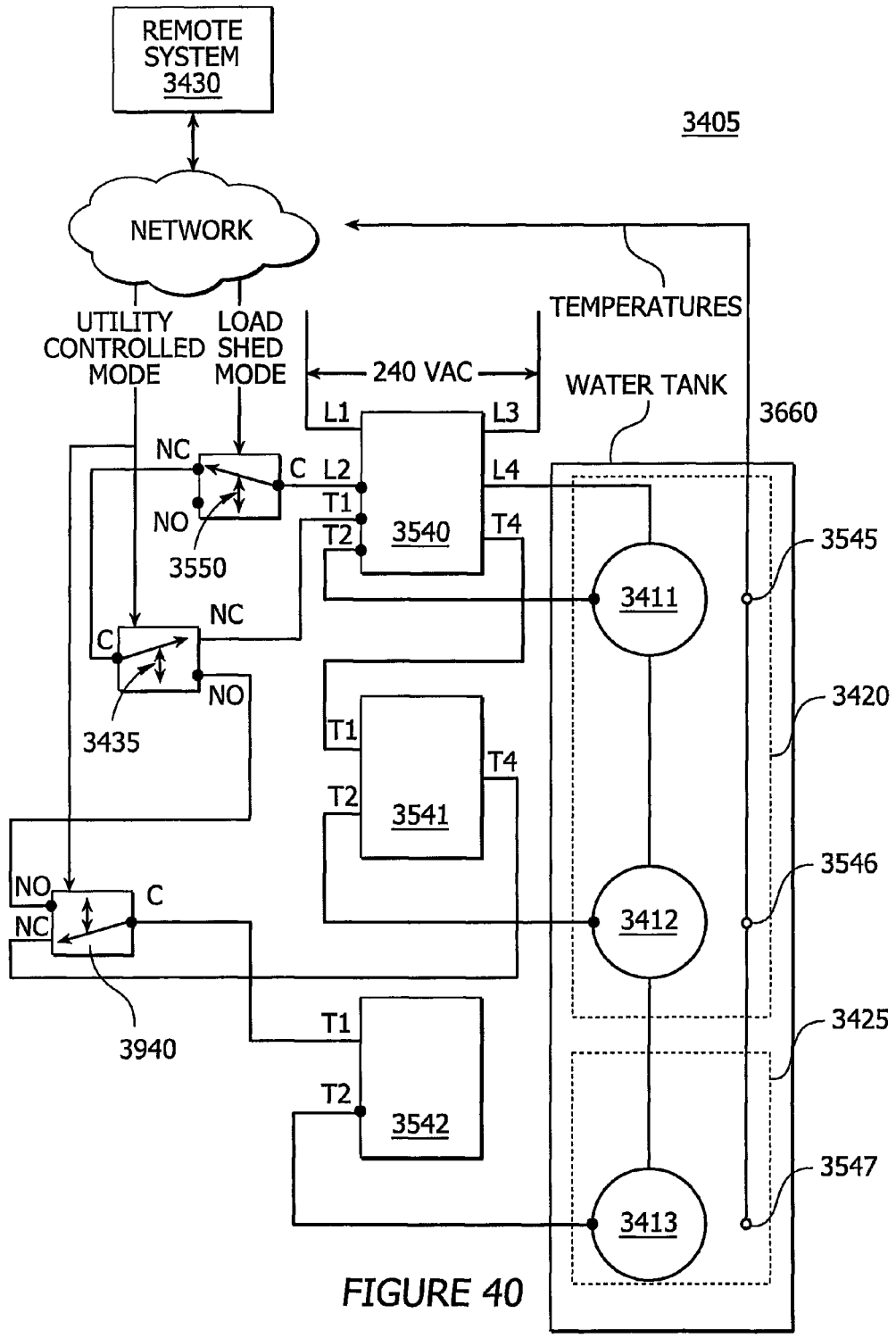
FIG. 40 is a schematic illustration of the single water heater coupled to components on the load control module as shown in FIG. 39 in some embodiments according to the invention.

FIG. 40 is a schematic illustration of the single water heater 3405 coupled to components on the load control module 2900 as shown in FIG. 39 in some embodiments according to the invention. According to FIG. 40, switches 3550 and 3435 can operate as described above in reference to, for example, FIGS. 34-39. As further shown in FIG. 40, however, the third switch 3940 can operate responsive to control by the remote system 105 to provide the modes of operation described above with reference to FIG. 39.

In particular, the switch 3940 can be configured to couple an output T4 from the second thermostat control relay 3541 to an input T1 of the third thermostat control relay 3542 so that the third water heating element 3413 can receive power once the second water heating element 3412 heats the water in the intermediate portion of the water tank to the temperature set by the second thermostat control relay 3541.

When the remote system 105, however, indicates that the single water heater 3405 is to operate in the utility controlled mode, the connection between the T4 terminal of the second thermostat control relay 3541 and the T1 terminal of the third thermostat control 3542 is disconnected. Instead, in the utility controlled mode of operation, the third switch 3940 couples power from the switch 3435 to the T1 terminal of the third thermostat control relay 3542 to activate the water heating element 3413 for the heating of water in the lowest portion of the tank to store energy in the form of hot water that is preheated for other portions of the water tank 3660.

Figure 41:
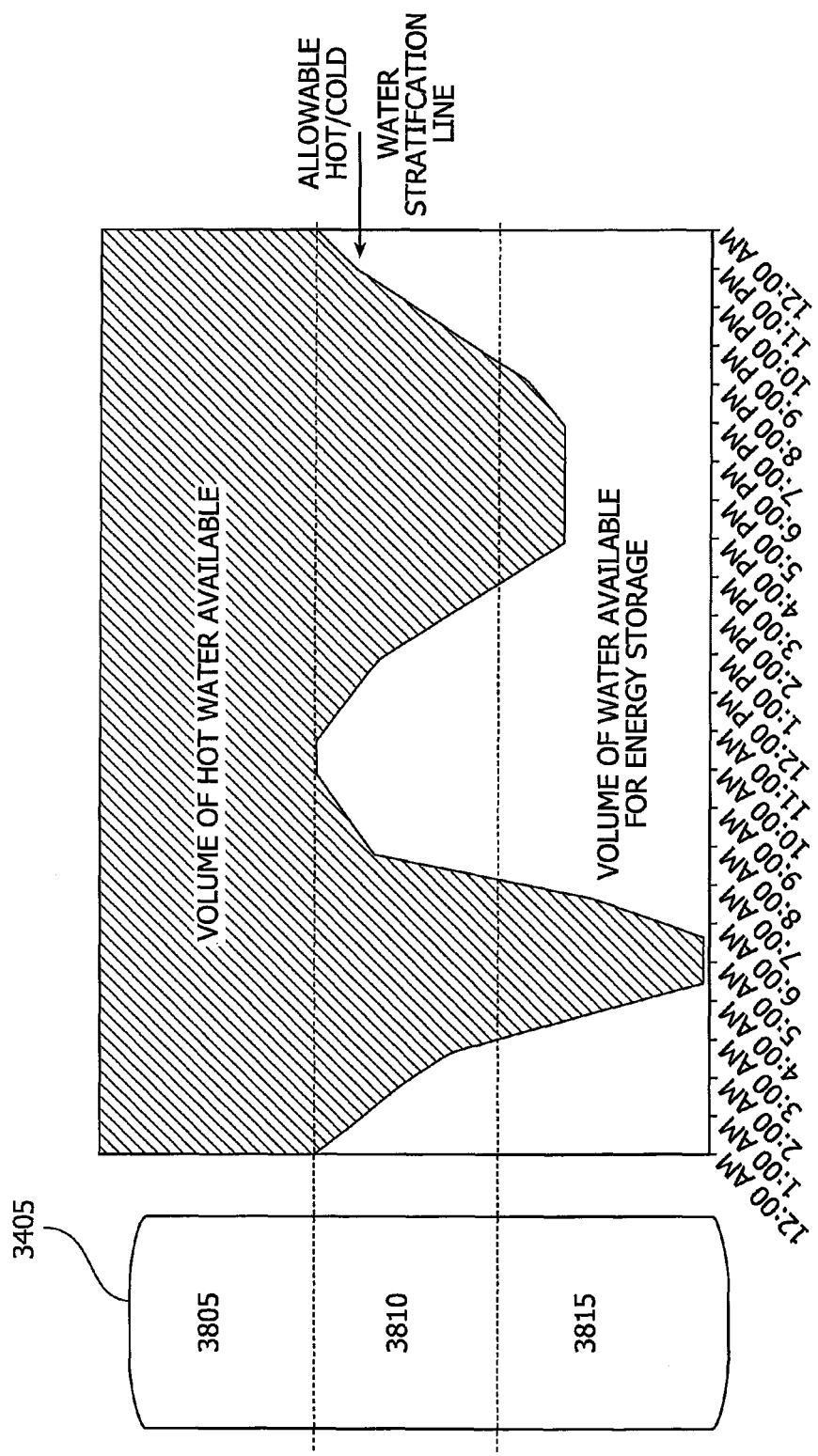
FIG. 41 is a schematic illustration of variation in the volume of hot water available to the customer location from the single water heater in some embodiments according to the invention.

FIG. 41 is a schematic illustration of variation in the volume of hot water available to the customer location from the single water heater 3405 operating as described in reference to FIG. 40, in some embodiments according to the invention. According to FIGS. 39-41, the remote system 105 can configure the single water heater 3405 so that the third thermostat control relay 3542 can receive power from the output of the second thermostat control relay 3541 so that the entire volume of water in the water heater 3405 may be heated for at least some periods in some embodiments according to the invention.

In particular, during the time from about 4:00 a.m. to about 6:00 a.m., the remote system 105 configures the single water heater 3405 to use the first through third water heating elements 3411-3413 to heat the entirety of the volume of water therein in a prioritized heating arrangement as described herein. Accordingly, during the time from about 4:00 a.m. to about 8:00 a.m., in FIG. 41, the lowest most portion of the single water heater 3405 is used to heat water in response to demand by the customer location. Similarly, the remote system 105 configures the single water heater 3405 to operate using the third switch 3940 from about 3:00 p.m. to about 8:00 p.m., so that again the third water heating element 3413 can be utilized to heat the water in the lowest most portion of the single water heater 3405 in response to customer demand.

Accordingly, the lowest most portion of the single water heater 3405 is not configured to operate in utility controlled mode during the times when the third switch 3940 is enabled. However, it will be understood that during the remainder of the times shown in FIG. 41, the lowest portion 3815 of the single water heater 3405 may be available for remote control by the remote system 105.

As described above in reference to FIG. 40, the lowest portion 3815 of the single water heater 3405 may be operated to ensure that the entirety of the volume of water in the water heater 3405 is heated to a specified temperature at least one time in the day to reduce the likelihood of the growth of harmful bacteria in the water heater 3405.

Figure 42:
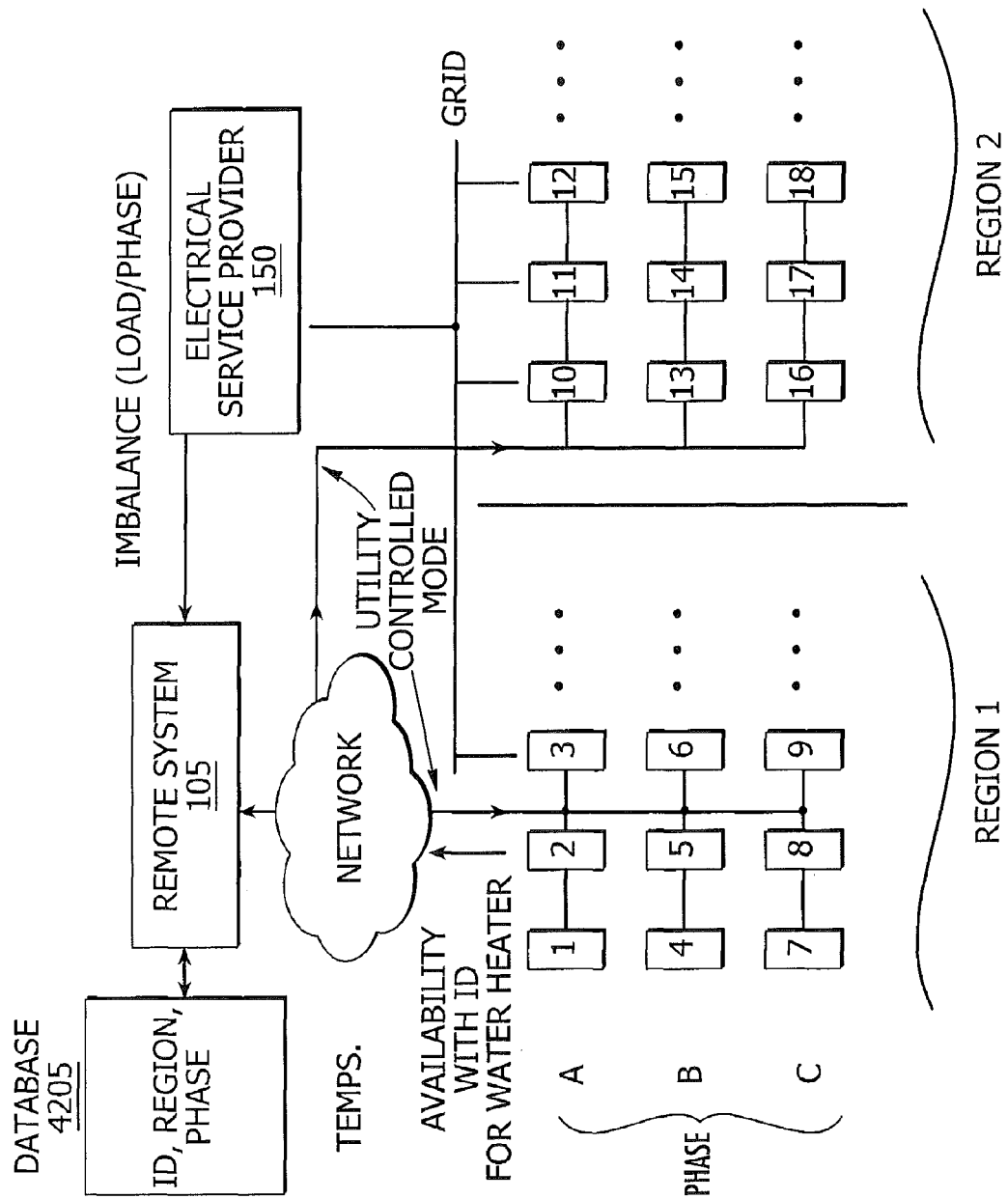
FIG. 42 is a schematic illustration of a plurality of single water heaters each including key elements that are separately managed by the remote system to address imbalances on the grid in some embodiments according to the invention.

FIG. 42 is a schematic illustration of the plurality of water heaters 3405 coupled to a power grid and managed by the remote system 105 to address imbalances on the grid in some embodiments according to the invention. According to FIG. 42, water heaters 1-9 are located in a first region of the grid, whereas water heaters 10-18 are located in a second region of the grid.

It will be understood that, subsets of each of the water heaters in each of the first and second regions can be configured to operate using a particular phase of voltage that is distributed to that region of the grid. In particular, as shown in the first region, water heaters 1, 2 and 3 operate using an A voltage phase, water heaters 4-6 operate on a B voltage phase, and water heaters 7-9 operate on a C voltage phase, referred to herein as the A phase, the B phase, and the C phase, respectively. As further shown in FIG. 42, in the second region water heaters 10-12 operate off the A phase, water heaters 13-15 operate off the B phase, and water heaters 16-18 operate off the C phase.

It will be further understood that in FIG. 42 the remote system 105 is configured to control the mode of operation of each of the water heaters 1-18. For example, in some embodiments according to the invention, the remote system 105 can configure water heaters 1-3 to operate in the utility controlled mode in Region 1 and configure water heaters 16-18 to operate in the utility controlled mode in Region 2 whereas all other water heaters may remain in the default mode of operation. It will be further understood that any of the modes of operation for the water heaters described herein can be supported by the system shown in FIG. 42.

Still further, a data base 4205 that is accessible to the remote system 105 can provide information associated with the water heaters 1-18 including, for example, the region in which each of the water heaters is located, an identifier associated with each of the water heaters in that region, the phase of voltage on which each of the water heaters is configured to operate, the capacity of each of the respective water heaters, the last known temperatures of each of the portions of each of the water heaters 1-18, and other information such as historical operations along the lines of that shown for example in FIGS. 38 and 41.

The data base 4205 can also record the metering information associated with the metering circuit 3950 shown in FIG. 39. Still further, the data base 4205 can provide an indication of which of the water heaters connected to the grid is registered as being a storage water heater that is allowed to operate in the modes described above, for example, in reference to FIGS. 39-41.

In operation, the electrical service provider 4210 may provide a request to the remote system 105 to add or subtract load to particular regions of the grid to address an imbalance. For example, the electrical service provider 4210 may request that the remote system 105 add a certain load to Region 1 in order to absorb excess capacity that is available on the grid through, for example, transient power sources.

In response, the remote system 105 can determine how many water heaters should be enabled to meet the request provided by the electrical service provider and thereby address the imbalance on the grid. For example, in some embodiments according to the invention the remote system 105 may determine that the requested load to be added should be fulfilled by configuring water heaters 1 and 2 in the utility controlled mode.

In still further embodiments according to the invention, the remote system 105 may determine which of the water heaters should be configured for operation in the utility controlled mode based on the last known temperatures of the particular portions of the water heaters. For example, if the remote system 105 determines that the lowest portions of water heaters 6 and 7 provide the most capacity for storage of energy in the form of heated water, those water heaters may be enabled first.

In still further embodiments according to the invention, the remote system 105 may switch modes of selective ones of the water heaters based on remaining capacity associated with those water heaters as the imbalance continues to be addressed by the additional load. For example, if the remote system determines that a load imbalance can be addressed by configuring water heaters 1-3 in utility controlled mode, the remote system 105 may maintain this configuration until the electrical service provider reduces the amount of load required be added to Region 1 or alternatively increases the amount of load to be added to Region 1. In response, the remote system 105 may add additional water heaters to the load in Region 1 to meet the request from the electrical service provider 4210.

Still further, the remote system 105 may determine that certain ones of the selected water heaters that are configured in utility control mode may be exhausted before the request from the electrical service provider 4210 is met such that the remote system 105 may place the previously selected water heaters back into the default mode of operation and instead place other ones of the water heaters in the utility controlled mode to continue to meet the request from the electrical service provider 4210 until the imbalance has been addressed. It will be understood that the remote system 105 determine which water heaters to operate in a particular mode of operation at high enough frequency to effectively address imbalances described herein. For example, in some embodiments according to the invention, the remote system 105 may update the mode of operation for the water heaters 1-18 about once every four seconds. Other frequencies may also be utilized such that the remote system 105 can maintain near real-time control over addressing the imbalance on the grid.

As described above, the remote system 105 may utilize temperature data associated with the water heaters to make a determination of which water heaters are available for configuration in the utility control mode as well as to estimate the time that those water heaters may be available in utility control mode before being exhausted.

In still further embodiments according to the invention, the remote system 105 can configure selected ones of the water heaters to operate in the utility controlled mode in response to a phase imbalance identified by the electrical service provider 4210. It will be understood that the remote system 105, therefore, can select ones of the water heaters to balance the load across the different phases A-C so as to avoid unnecessary stress on the electrical components of the grid. Phase imbalance is described further in, for example, US Patent Publication No. 2012/0074799, entitled System and Method for Phase Balancing in a Power Distribution System, the disclosure of which is hereby incorporated herein by reference.

In still further embodiments according to the invention, the remote system 105 may consider both phase as well as load in meeting the request from the electrical service provider and a. For example, if the electrical service provider 150 requests a particular load be added to Region 2 of the grid, the remote system 105 can select water heaters to fulfill the load requirement by selecting water heaters that are distributed across the phases A-C so as to address both the load imbalance as well as to avoid or address any phase imbalance on the grid.

In still further embodiments according to the invention, the remote system 105 may refer to the identifier associated with each of the water heaters to determine whether the water heater is allowed to operate in the utility control mode or to operate in the mode as described above, for example, in reference to FIGS. 40 and 41. For example, even though a water heater may have the capacity to heat a relatively large amount of water, the remote system 105 can be configured to deny the utility controlled mode or other modes of operation to a water heater if the identifier of the particular water heater is not recorded in the data base 150 as licensed.

Figure 43:
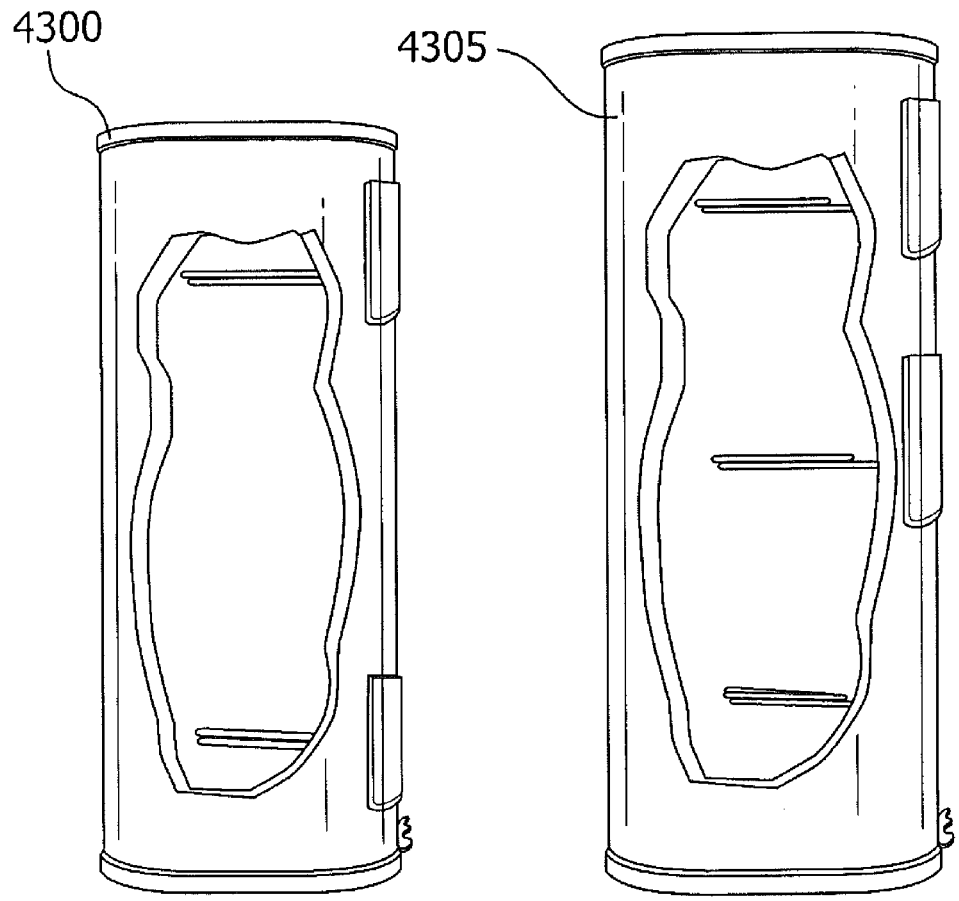
FIG. 43 is a schematic illustration showing a conventional two element 45 gallon water heater compared to a variable capacity water heater in some embodiments according to the invention.

FIG. 43 is a schematic illustration showing a conventional two element 45 gallon water heater compared to a three element variable capacity water heater in some embodiments according to the invention. According to FIG. 43, a conventional water heater 4300 is limited to a 45 gallon capacity, whereas a variable capacity water heater 4305 can provide a variable capacity of heated water, such as a 45 gallon capacity in the default mode of operation and a 75 gallon capacity in the utility controlled mode of operation. It will be understood that the specific capacity of the variable capacity water heater 4305 provided in FIG. 43 is for illustrative purposes only and is not limited by this disclosure to any particular amount. Furthermore, additional water heating elements may also be used.

Figure 44:
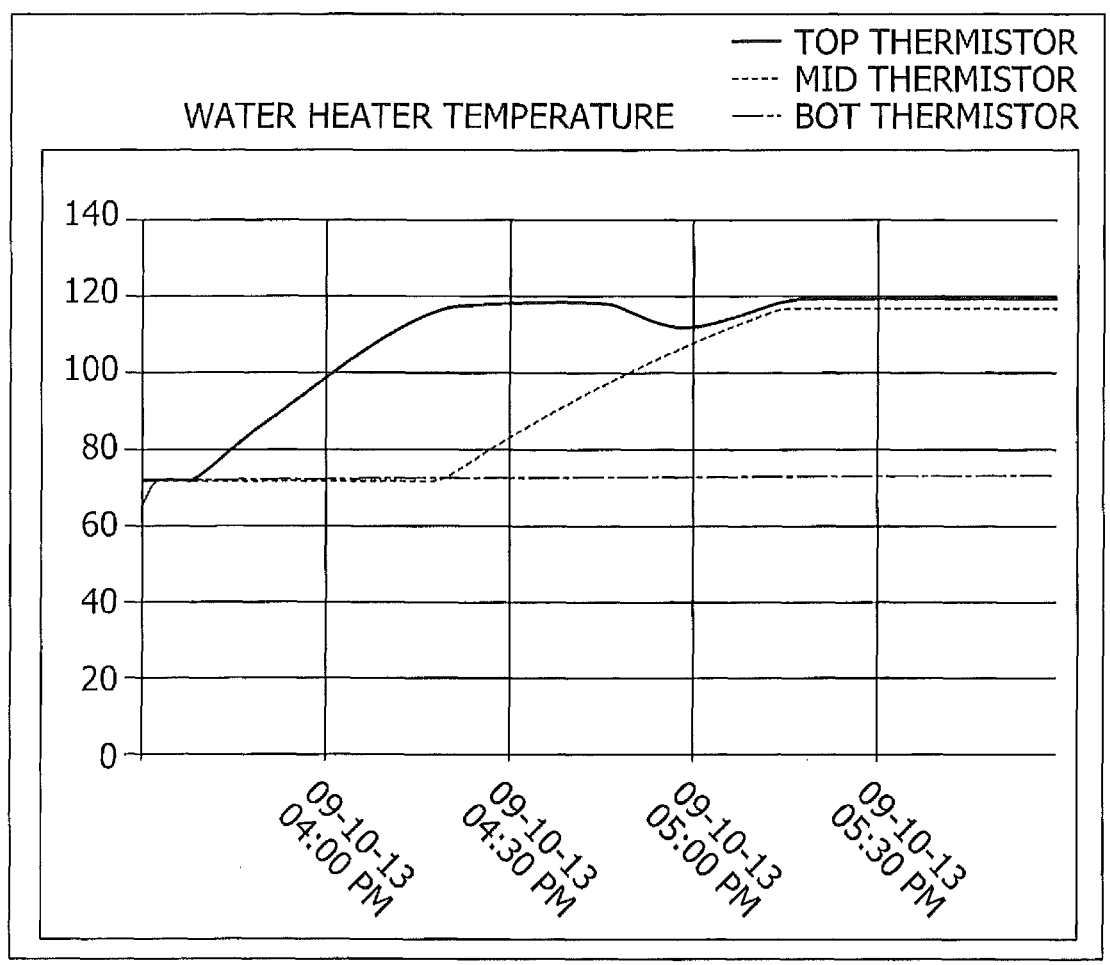
FIG. 44 is a graph showing exemplary temperatures associated with the respective portions of the variable capacity water heater in operation in some embodiments according to the invention.

FIG. 44 is a graph showing exemplary temperatures associated with the respective portions of the variable capacity water heater 4305 in operation. Specifically, FIG. 44 shows the variable capacity water heater 4305 operating in the default mode of operation whereby the water in the lowest portion of the variable capacity water heater 4305 is not heated by the associated element, but the intermediate and upper portions are heated by the respective heating elements associated with those portions.

As further shown in FIG. 44, during an initial warm up period the upper heating element heats water in the upper portion from about 70 degrees to about 120 degrees. Thereafter, once the temperature of the upper portion of the variable capacity water heater 4305 reaches the upper temperature of 120 degrees, the intermediate heating element is activated so that the associated heating element heats the water in the intermediate portion of the variable capacity water heater 4305 from about 70 degrees to about 120 degrees.

During the heating of the upper and intermediate portions of the variable capacity water heater 4305, FIG. 44 illustrates that the temperature of the water in the lower portion remains stable at about 70 degrees despite the heating of the other portions. It will be understood that this thermal stratification is caused by the different densities of water at different temperatures in the different portions of the variable capacity water heater 4305. The thermal stratification allows the performance of the variable capacity water heater 4305 to be modeled as a 45 gallon water heater despite the fact that the water heater 4305 has more capacity (i.e., 75 gallons).

It will be understood that the operation of the variable capacity water heater 4305 is provided as shown in FIGS. 43 and 44 while the electrical service provider maintains the variable capacity water heater 4305 in the locked mode so that the lower element is unavailable for heating water so that the variable capacity water heater 4305 functions as a more conventional arrangement (i.e., a variable capacity water heater that heats only the intermediate and upper portions but not the lower portion).

Figure 45:
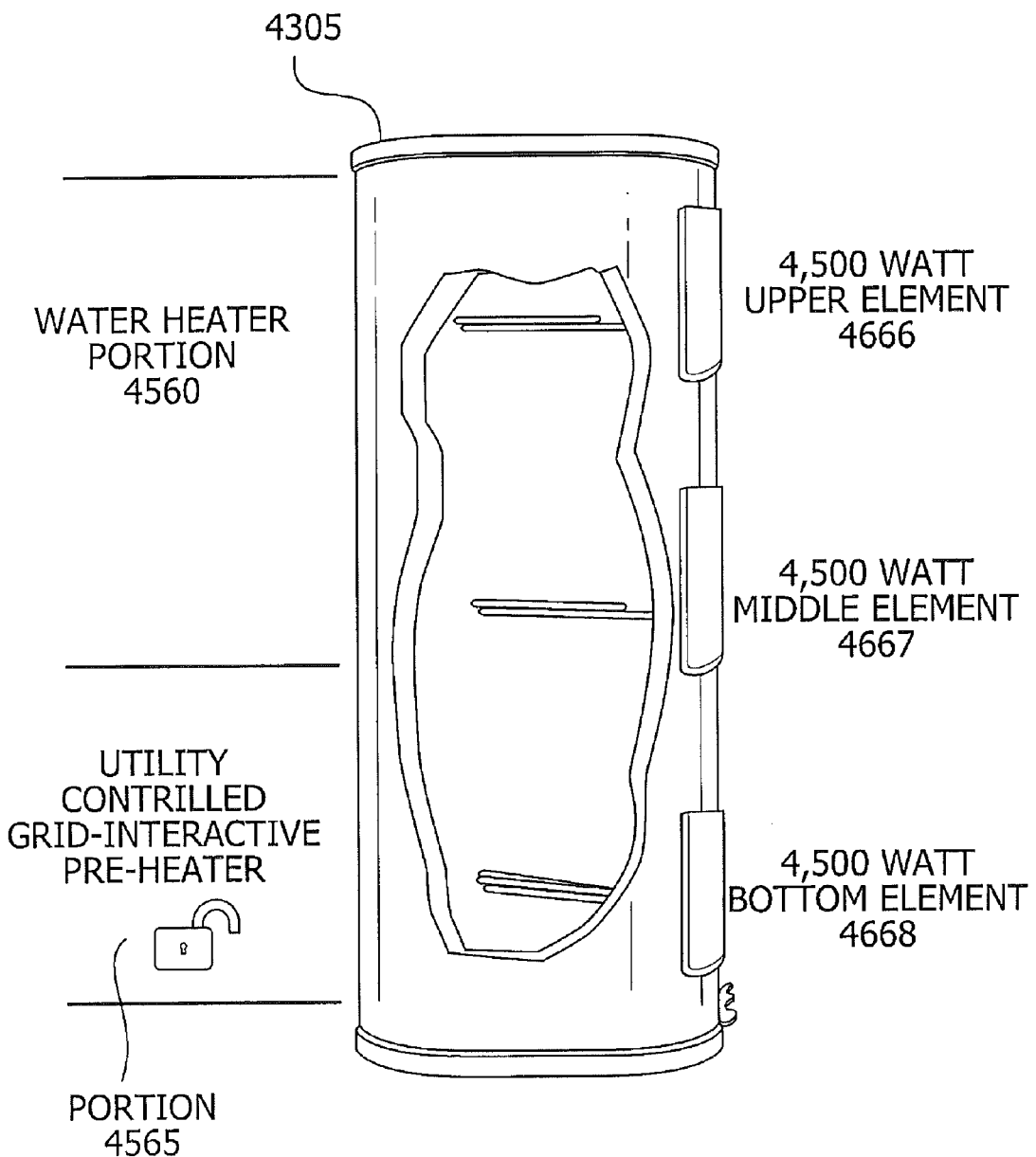
FIG. 45 is a schematic illustration of the variable capacity water heater in the unlocked mode operation in some embodiments according to the invention.

FIG. 45 is a schematic illustration of the variable capacity water heater 4305 in the unlocked mode operation in some embodiments according to the invention. According to FIG. 45, the lower portion of the variable capacity water heater 4305 is made available for heating once the electrical service provider has either unlocked the variable capacity water heater 4305 (for example, physically or through a mechanism at the customer location) or has indicated that the variable capacity water heater 4305 is authorized or licensed as described above in reference to the database 4205. It will be understood that other types of locking and unlocking mechanisms may also be used in embodiments according to the invention.

It will also be understood that in some embodiments according to the invention, the variable capacity water heater 4305 may be provided by increased heating of lesser volumes. For example, in some embodiments according to the invention, the variable capacity water heater 4300 may heat water to higher temperatures than those shown, for example, in FIG. 44, to provide variable capacity under control of the utility as described herein.

In still other embodiments according to the invention, a partitioned portion of the interior volume of the variable capacity water heater 4305 may be provided. In some embodiments according to the invention, the variable capacity may be provided by changing the volume of the tank used to contain the water in the variable capacity water heater 4305 such that, for example, in the first mode, the volume of the water heater 4305 is restricted to, for example, 45 gallons whereas in the utility controlled mode, the variable capacity water heater 4305 may expand the volume of water that is accommodated by the tank to 75 gallons as described herein. In some embodiments according to the invention, the water heater 4305 may change the capacity responsive to the indication of the utility controlled mode/default mode of operation remotely provided by the remote system 105.

In still other embodiments according to the invention, the variable capacity water heater 4305 may include a material which is configured to absorb more heat than does water to provide a variable capacity for storage of energy rather than to increase the volume of water in some embodiments according to the invention. In some embodiments according to the invention, the material may be located in the lower portion of the variable capacity water heater 4305 which would be activated responsive to the indication of the utility controlled mode/default mode of operation remotely provided by the remote system 105.

In some embodiments according to the invention, the variable capacity water heater 4300 would be configured with the lower heating element disabled at installation such that when variable capacity water heater 4305 is installed, the utility controlled mode is deactivated and the variable capacity water heater 4305 does not place an additional burden on the power grid unless activated by the electrical service provider.

In still other embodiments according to the invention, the variable capacity water heater 4305 is manufactured with the greater capacity, such as a 75 gallon capacity but only the upper and intermediate heating elements are installed and configured at the factory. To enable the utility controlled mode of operation for the variable capacity water heater 4305, the service personnel would reconfigure the variable capacity water heater 4305 at the customer location (or prior to installation at the customer location) by installing, for example, the lower heating element and wiring the variable capacity water heater 4305 to operatively couple to the remote system described herein.

In still other embodiments according to the invention, a circulator can be added to the variable capacity water heater 4305 so as to remove the stratification effect described above in reference to FIGS. 43 and 44. In operation, the electrical service provider may enable operation of the variable capacity water heater 4305 to activate the lower heating element as well as the circulator so that the removal of the stratification allows the variable capacity water heater 4305 to store more energy in the form of pre-heated water.

In further embodiments according to the invention, the activation of water heaters can be organized to provide a substantially deterministic load to the power grid over a defined time interval. Providing a substantially deterministic load in the form of activated water heaters may enable the imbalances described herein to be more readily addressed by adding loads (activating additional water heaters) or by shedding loads (deactivating some of the active water heaters). For example, in some embodiments according to the invention, the substantially deterministic load provided by enabled water heaters may provide a readily available pool of water heaters to be added to the grid when the load is needed at a particular time.

Conversely, the substantially deterministic load provided by the enabled water heaters may also be used to provide a ready supply of water heaters that may be removed from the grid (to shed load) when needed. In still further embodiments according to the invention, the substantially deterministic amount of load can be biased in a particular direction to more readily address the imbalances described herein based on dynamic conditions, such as time of day, day of week, time of year, weather patterns, usage patterns associated with the water heaters, etc.

Figure 46:
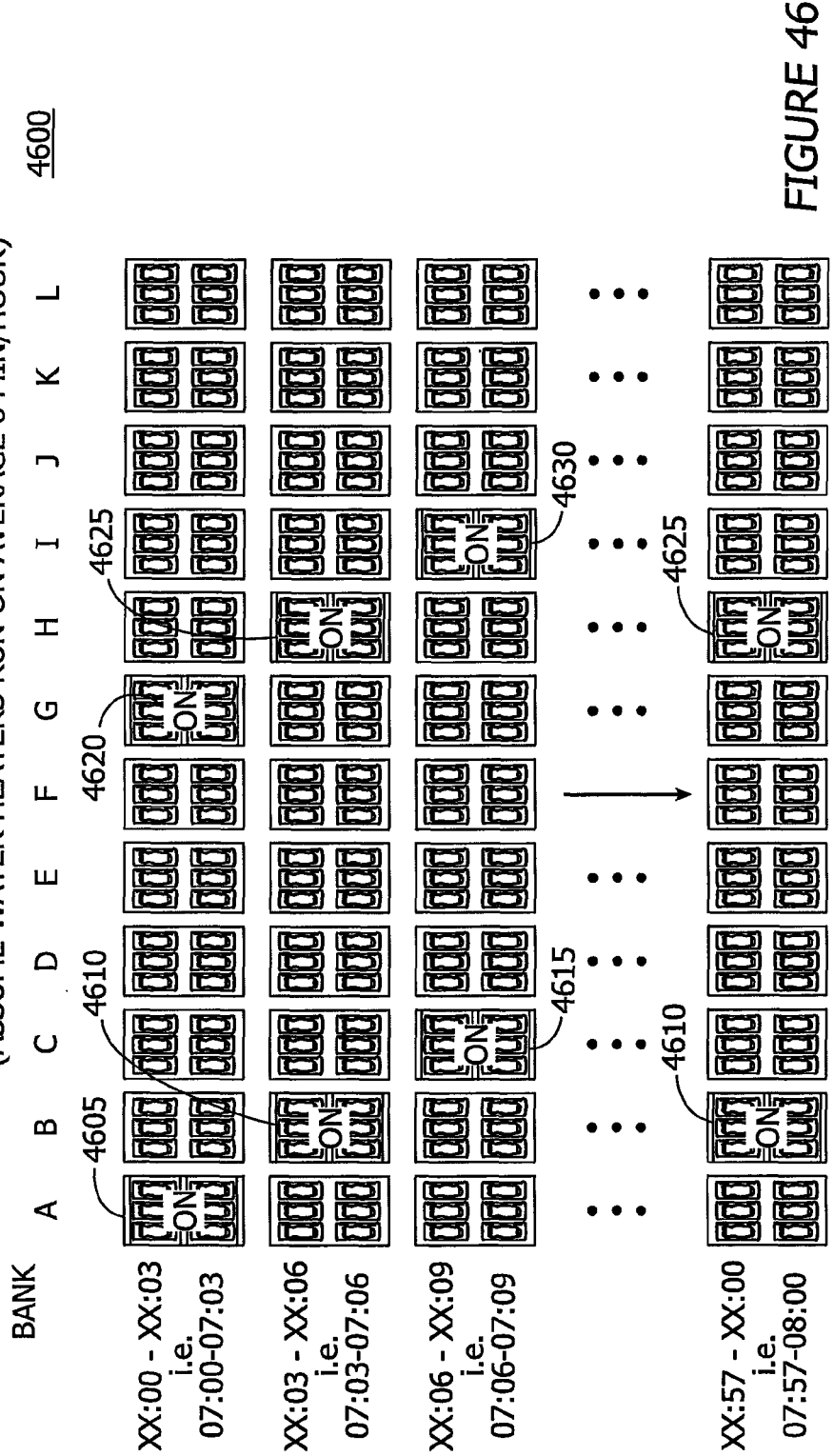
FIG. 46 is a schematic illustration of water heaters organized into banks A-L where each of the banks includes a group of water heaters that are assigned nominal time slots for activation in some embodiments according to the invention.

FIG. 46 is a schematic illustration of water heaters organized into banks A-L where each of the banks includes a group of water heaters that are assigned, nominal time slots for activation in some embodiments according to the invention. According to FIG. 46, each of the banks A-L includes a respective group (shown horizontally in FIG. 46) which are each assigned a time interval during which those groups of water heaters may be activated. For example, as shown in FIG. 46, the group 4605 in bank A is nominally scheduled for activation for a three minute time interval, such as 7:00 AM to 7:03 AM.

As further illustrated in FIG. 46, each of the other banks B-L also includes an analogous group of water heaters organized for activation during the same time intervals, if needed. For example, group 4620 included in Bank G is also configured for activation during the same time interval assigned to group 4605. It will be further understood that the remaining groups in banks B-F and H-L are available for activation during the same time interval but nominally remain disabled unless needed.

As further shown in FIG. 46, bank B includes a group 4610 and bank H includes an analogous group 4625, both of which are scheduled for activation during a second three minute time interval, such as 7:03 AM to 7:06 AM. Still further, bank C includes a group 4615 and group I includes a group 4631 both of which are scheduled for activation in a third three minute time interval, such as 7:06 AM to 7:09 AM. As finally shown in FIG. 46, the final three minute time slot shown in FIG. 46 is organized to activate the water heaters in group 4610 in bank B and the group 4625 in bank H in the same way as described above with respect to the second time interval.

In operation, the substantially deterministic loads provided by the staggered activation of different groups of water heaters in different time intervals can allow for a substantially deterministic amount of load provided by the water heaters on the grid. Still furthermore, the groups of water heaters shown in FIG. 46 that are deactivated during those same time intervals are available for activation in the event that an additional load is called for to address imbalance. Likewise, the groups of water heaters that are scheduled for activation during the pre-assigned time slot can be deactivated to address an imbalance where loads should be removed from the grid by disabling water heaters.

Accordingly, the service provider may arrange for both the duration of time intervals shown in FIG. 46 (during which the different groups of water heaters can be activated) as well as the duration of the intervals for which the water heaters are to be active. Therefore, if the service provider determines, for example, that a typical customer is projected to consume an approximate amount of hot water during a time period, the time intervals can be arranged so that a proper amount of water is heated during that time frame such that the customer's supply of hot water is not interrupted. For example, if the service provider determines that a particular customer uses an amount of hot water that requires about two hours of heating per day, the service provider can arrange the time schedules so that the water heater at the particular customer's location is enabled for enough time to provide the desired hot water (such as periodic three minute intervals of activation that are aggregated to total about two hours).

Accordingly, the service provider can adjust the on time and frequency for particular water heaters based on the customer's actual usage over time, or based on particular day of week, time of week, or time of year. Other factors may also be used to configure the time interval and the frequency with which the water heaters are activated.

Figure 47:
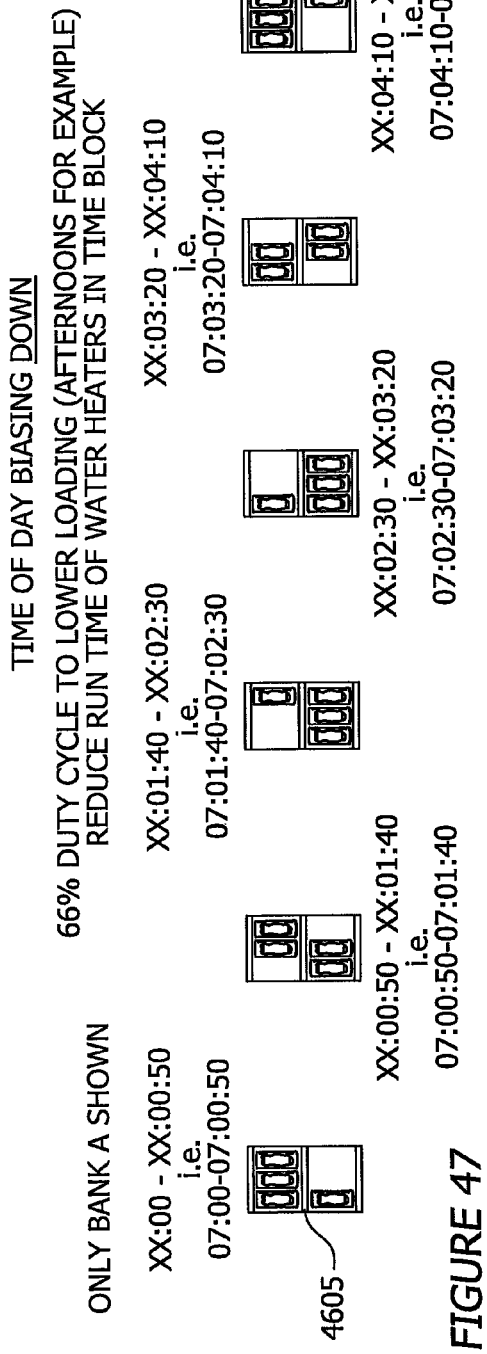
FIG. 47 is a schematic illustration of bank A shown in FIG. 46 biased down to accommodate the addition of load in the form of water heaters to address an imbalance in some embodiments according to the invention.

FIG. 47 is a schematic illustration of bank A shown in FIG. 46 biased down to accommodate the addition of load in the form of water heaters to address an imbalance in some embodiments according to the invention. According to FIG. 47, the system can operate substantially as described with respect to FIG. 46, however, the group 4605 shown in bank A is modified so that only a particular subset of water heaters in the group 4605 are scheduled for activation during the time interval.

Still further, the time interval can be modified in order to bias down the amount of load provided by activation of group 4605. Accordingly, if the service provider determines that additional load should be added during the first time interval shown in FIG. 46, additional ones of the water heaters included in the group 4605 (which are not scheduled for activation) can be additionally activated to add load to address the imbalance.

As further shown in FIG. 47, the interval for activation of the subset of water heaters in group 4605 shown in FIG. 47, can also be reduced to further bias down the load to allow for the addition of still more load by keeping those disabled water heaters in group 1406 available for activation to add load by enabling the water heaters for less time during the interval.

Figure 48:
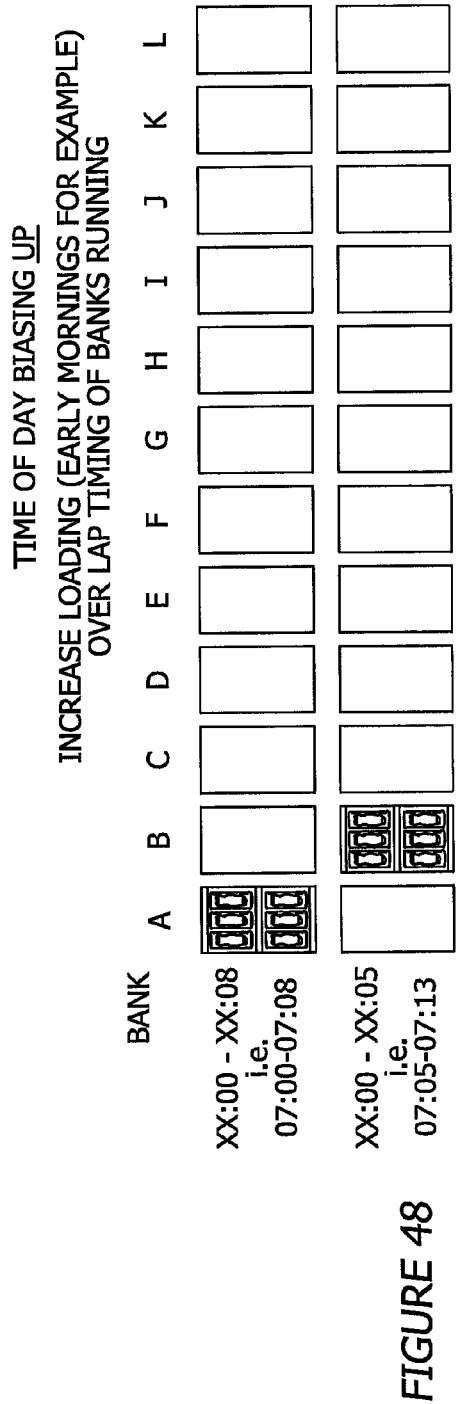
FIG. 48 is a schematic illustration of the arrangement shown in FIG. 46 modified to illustrate a biasing-up of the load provided by the activation of water heaters during the time interval shown in some embodiments according to the invention.

FIG. 48 is a schematic illustration of the arrangement shown in FIG. 46 modified to illustrate a biasing-up of the load provided by the activation of water heaters during the time interval shown in some embodiments according to the invention. As shown in FIG. 48, the service provider may schedule the water heaters in group 4605 to be activated for a longer time interval (i.e. 8 minutes rather than 3 minutes) to increase the amount of load added by the activation of group 4605. Similarly, group 4610 in bank B may also be biased up by lengthening the time interval associated therewith. Accordingly, an operation under the service provider may disable a subset of the water heaters in either of the groups 4605 and 4610 to address an imbalance in the grid when loads should be shed rather than added.

Figure 49:
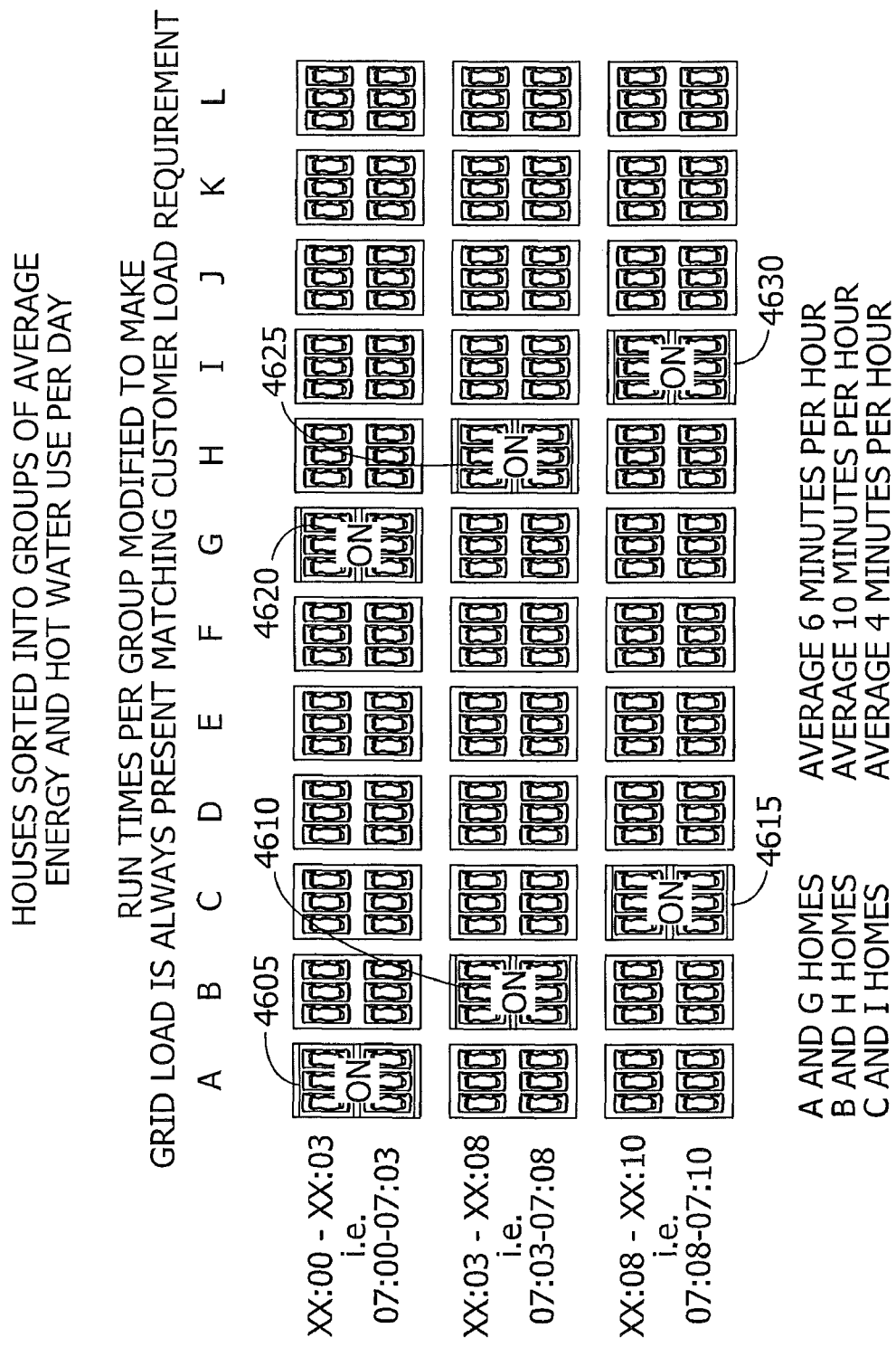
FIG. 49 is a schematic illustration of the arrangement shown in FIG. 46 wherein the groups of water heaters in the banks are organized to be activated during for different length time intervals where the groups are configured to include water heaters that utilize approximately the same amount of energy and hot water usage in some embodiments according to the invention.

FIG. 49 is a schematic illustration of the arrangement shown in FIG. 46 wherein the groups of water heaters in the banks are organized to be activated during for different length time intervals where the groups are configured to include water heaters that utilize approximately the same amount of energy and hot water usage in some embodiments according to the invention. According to FIG. 49, the group 4605 includes water heaters that are determined to have approximately the same energy use and hot water usage such that each is projected to meet the approximate customer needs by providing for activation of those water heaters during a first three minute time interval (which is periodically repeated over a longer time interval to ensure that customer demand is met).

As further shown in FIG. 49, however, the group 4610 includes water heaters that are selected according to a projected greater energy use/hot water utilization compared to those in group 4605. Particularly, the group 4610 in bank B is scheduled for enablement over a time interval of about five minutes rather than three minutes due to the additional requirements typically associated with those particular water heaters.

As further illustrated in FIG. 49, the group 4615 is configured to include water heaters that have yet another projected energy utilization and hot water requirement, whereby a time interval of about two minutes is assigned by the service provider as a projected time through which the customer demand may be met.

Figure 50:
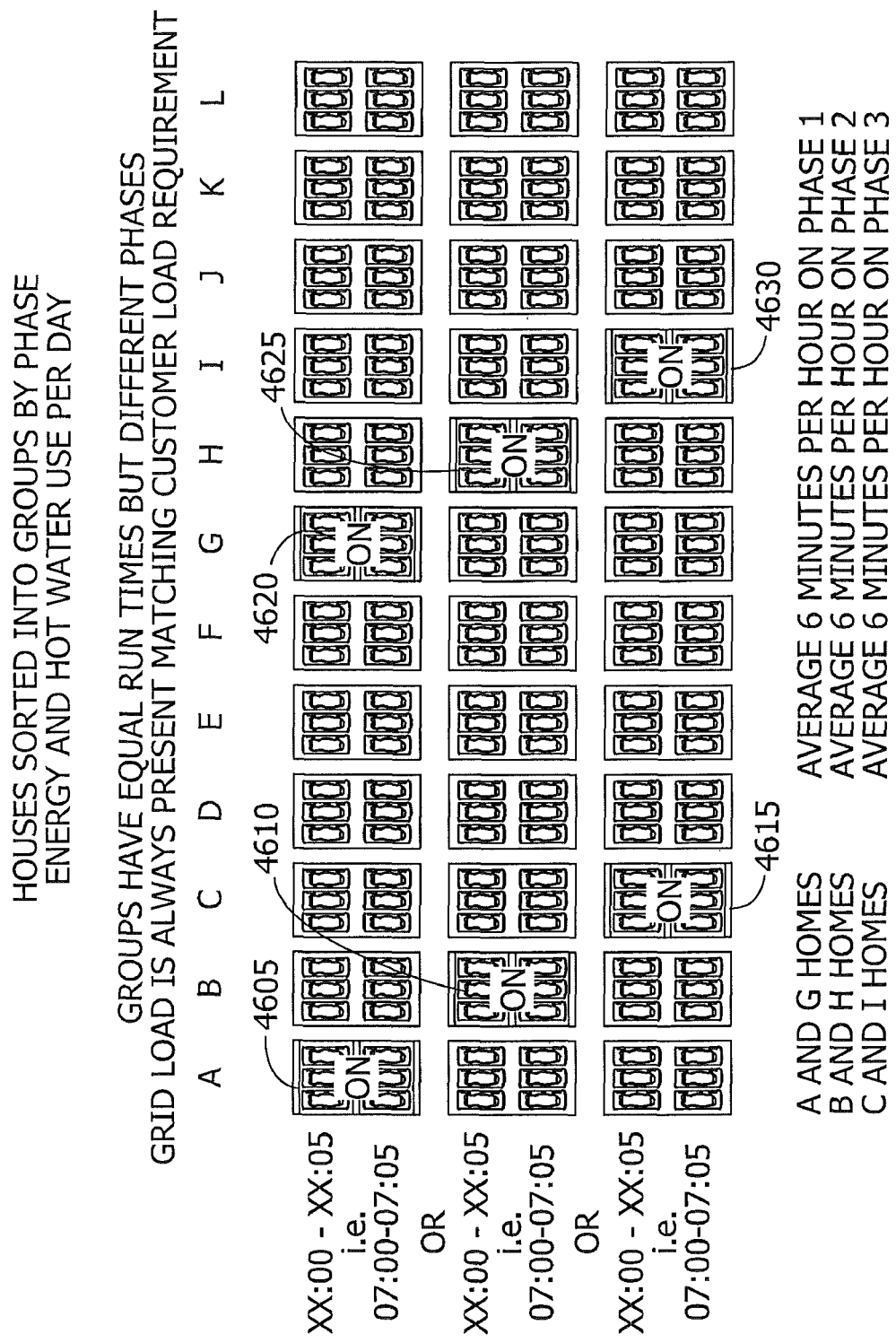
FIG. 50 is a schematic illustration of the arrangement shown in FIG. 46 and FIG. 49 modified to accommodate an imbalance in phase as described herein in some embodiments according to the invention.

FIG. 50 is a schematic illustration of the arrangement shown in FIG. 46 and FIG. 49 modified to accommodate an imbalance in phase as described herein in some embodiments according to the invention. According to FIG. 50, the groups 4605 and 4620 are selected based on their voltage supply being provided on phase 1, whereas as groups 4610 and 4625 include water heaters that are selected based on their provisioning of power based on phase 2, and groups 4615 and 4630 are configured to include water heaters that are based on their provisioning of power based on phase 3. Moreover, the service provider can activate the groups using overlapping time intervals as shown to further address a phase imbalance on the grid.

Figure 51:
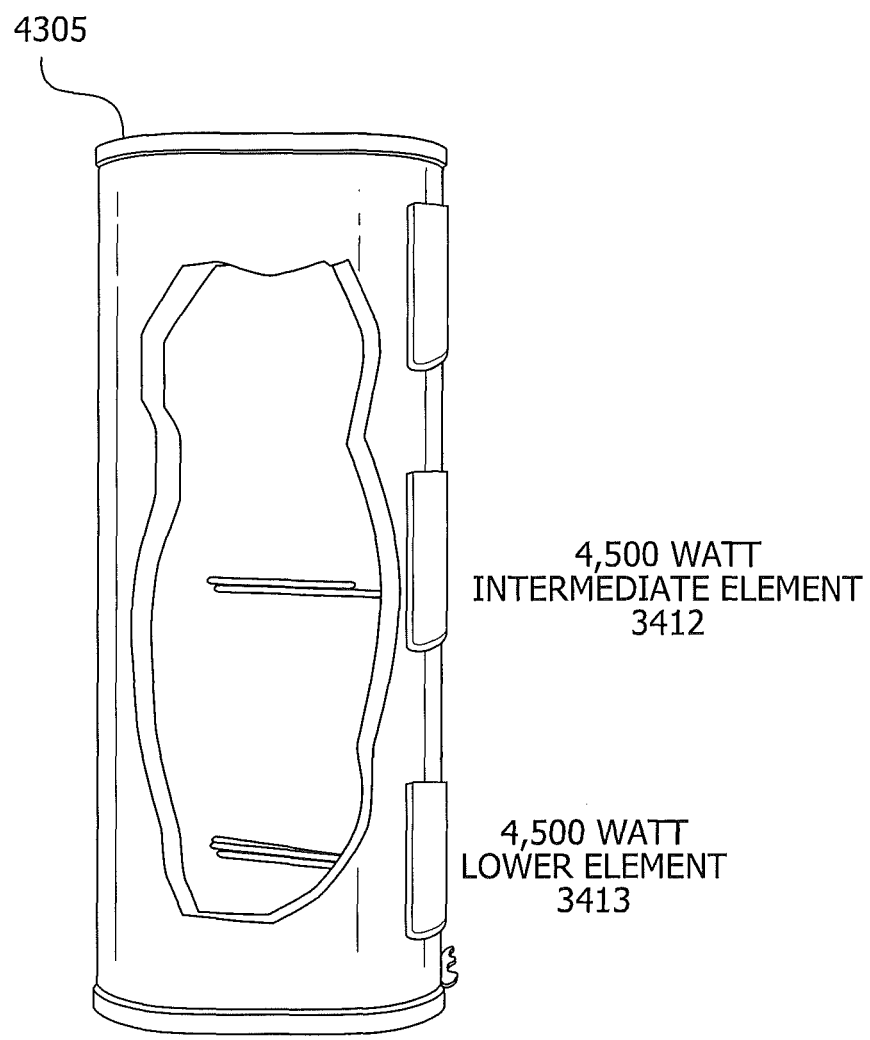
FIG. 51 is a schematic illustration of the two element water heater including lower heating element and an upper heater element that is located in an intermediate portion of the water heater in some embodiments according to the invention.

FIG. 51 is a schematic illustration of a two element water heater 4300 in some embodiments according to the invention. According to FIG. 51, an intermediate water heating element 3412 is located in an intermediate portion of the water heater 4305 whereas a lower water heating element 4668 is located in a lower portion of the water heater 4305. As further shown in FIG. 51, the upper heating element shown for example in FIG. 45 is absent from the water heater 4305 shown in FIG. 51.

Figure 52:
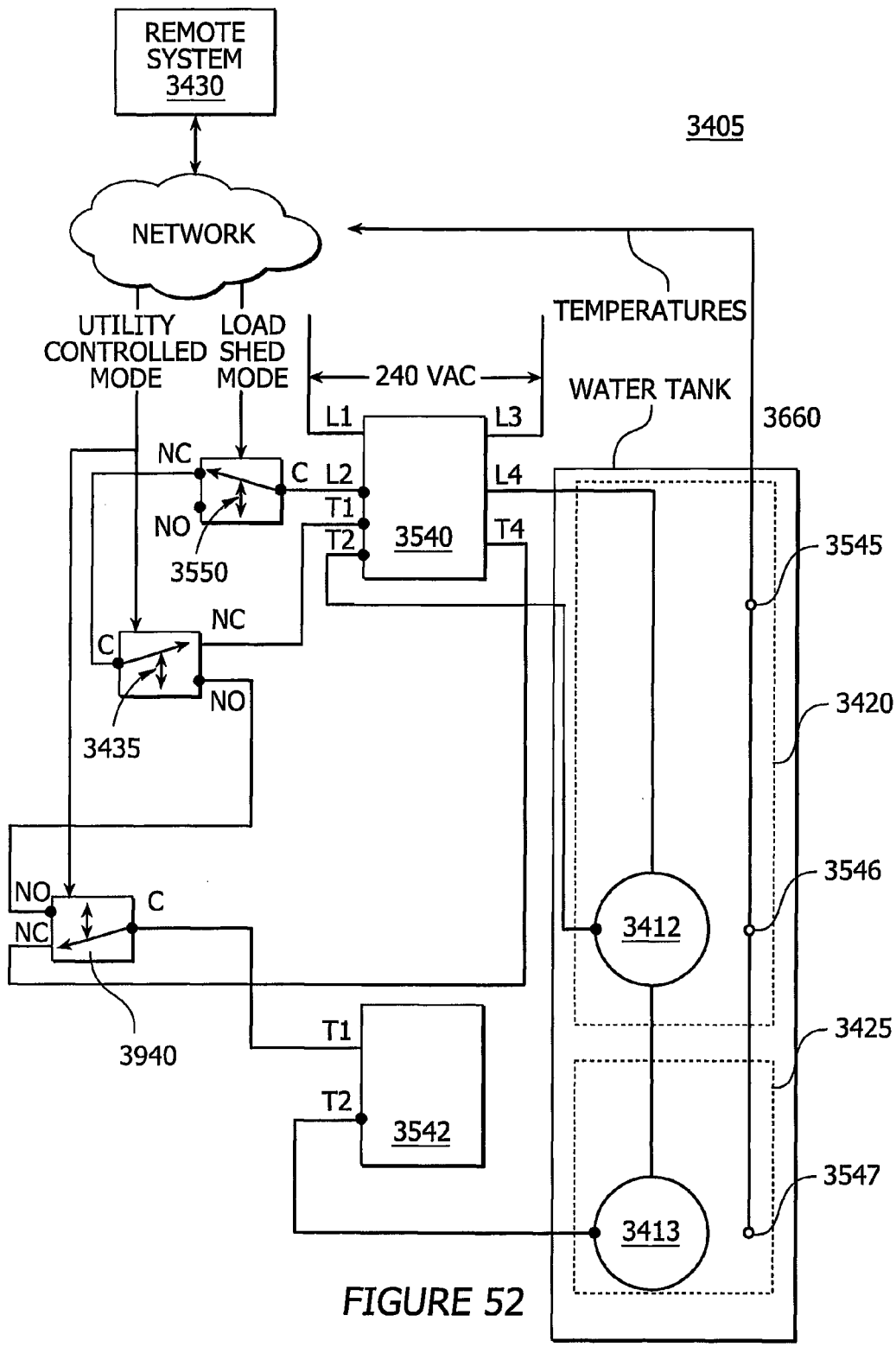
FIG. 52 is a schematic illustration of the water heater shown in FIG. 51 coupled to components of the load control module in some embodiments according to the invention.

FIG. 52 is a schematic illustration of components of load control module coupled to the water heater 4305 shown in FIG. 51. According to FIG. 52, the upper heating element 3411 shown for example in FIG. 40 is absent from the water heater shown in FIG. 52 as is the second thermostat control relay 3541. Instead, the intermediate water heating element 4312 is selectively provided with power by the upper thermostat control relay 3540 so that in operation, the intermediate water heating element 3412 can be activated by the upper thermostat control relay 3540 until the temperature associated therewith is reached whereupon power can be switched away from the intermediate water heating element 3412 to be provided to the lower thermostat control relay 3542 via the switch 3940.

According to FIG. 52, the lower water heating element 3413 is selectively activated by a lower thermostat control relay 3542 until the temperature associated therewith in the respective portion of the water heater is reached. Therefore, as shown in FIG. 52 in some embodiments according to the invention, the upper thermostat control relay 3540 can selectively switch power to/from the intermediate water heating element 3412 that is located in an intermediate portion of the water to heat water in the intermediate and upper portions of the water heater.

Accordingly, in utility controlled mode of operation, the lower heating element 3413 is switchably coupled to power by the lower thermostat control relay 3542. In contrast, in the default mode of operation both the intermediate water heating element 3412 as well as the lower water heating element 3413 have power switchably coupled thereto.

Figure 53:
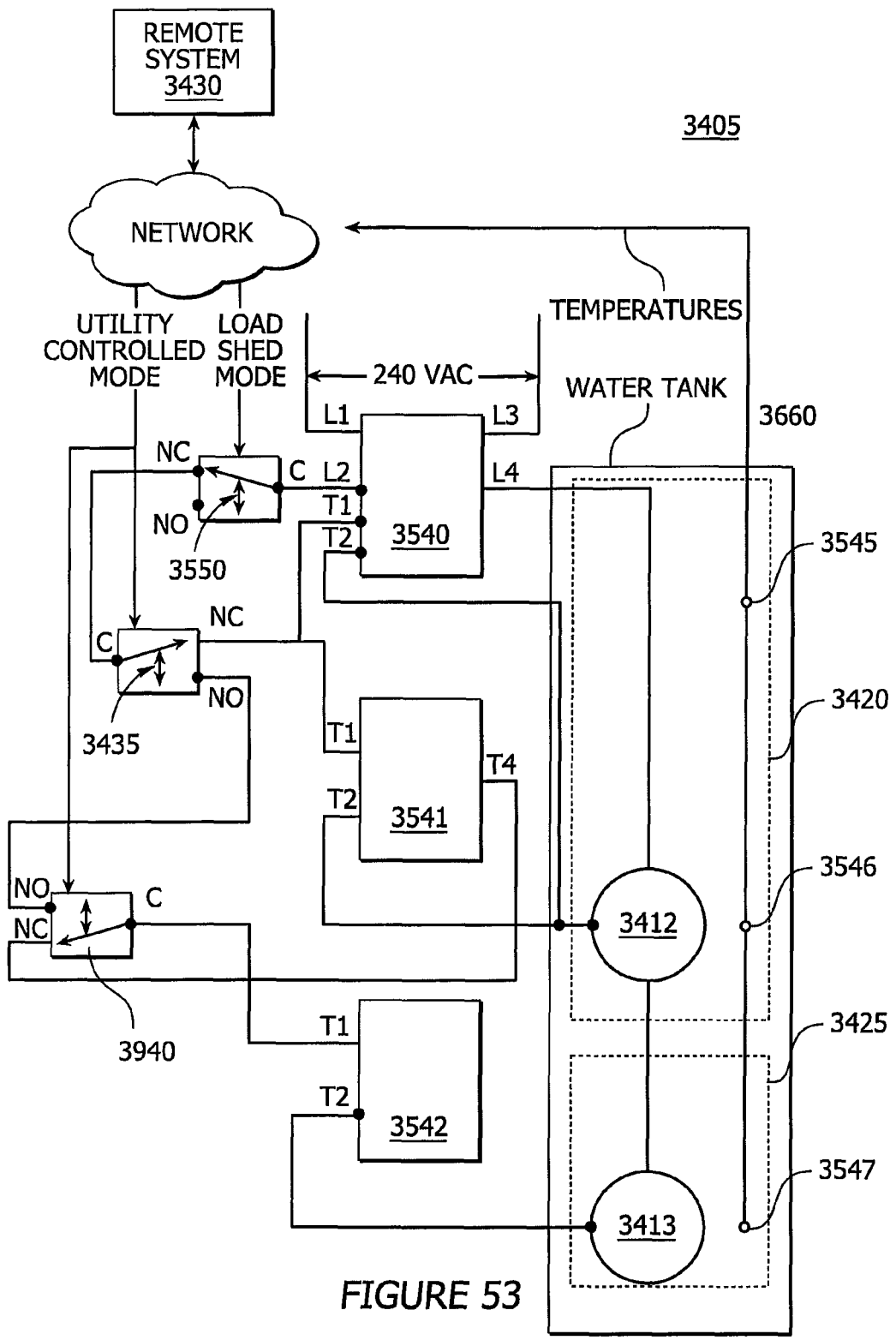
FIG. 53 is a schematic illustration of the water heater coupled to components of the load control module in some embodiments according to the invention.

FIG. 53 is a schematic illustration of components of load control module coupled to the water heater 4305 in some embodiments according to the invention. According to FIG. 53, the upper heating element 3411 shown for example in FIG. 40 is absent therefrom. Instead, the upper thermostat control relay 3540 selectively switches power to the intermediate water heating element 3412 until the temperature associated with the upper thermostat control relay 3540 reaches the target in the respective portion of the tank. In addition, the intermediate thermostat control relay 3541 can also switchably coupled power to the intermediate heating element 3412 based on the temperature associated with the intermediate portion of the water heater tank.

In operation, the remote system 3430 can configure the switches of the load control module to switch power to both the upper and intermediate thermostat control relays 3540 and 3541 via the switch 3435. The upper thermostat control relay 3540 can provide the power to the intermediate water heating element 3412 via terminal T2 until the temperature associated with the upper portion of the water tank is met, whereas the intermediate thermostat control relay 3541 also provides power to the intermediate water heating element 3412 via its respective terminal T2 until the temperature associated with the intermediate portion of the water heater tank is met whereupon the intermediate thermostat control relay 3541 switchably couples power to a lower thermostat control relay 3542 via the switch 3940. The lower thermostat control relay 3542 switchable couples power to the lower heating element 3413 until the temperature associated with the respective portion of the tank is met.

Accordingly, in some embodiments according to the invention the intermediate water heating element 3412 can be powered both the upper thermostat control relay 3540 as well as the intermediate thermostat control relay 3541 to more readily heat the water associated with both the upper and intermediate portions of the water heater. Still further, once the target temperatures associated with the upper and intermediate portions are met, power can be switchably coupled to the lower heating element 3413 in the default mode of operation.

In contrast, in the utility controlled mode of operation, the activation of the intermediate water heating element 3412 is bypassed by the remote control associated with the utility controlled mode signal provided by the remote system 3430 so that power is only switchably coupled to a lower heating element 3413 via the lower thermostat control relay 3542, whereas the intermediate water heating element 3412 remains off the utility controlled mode.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A method of managing electrical power storage comprising: remotely controlling operation of one of a plurality of water heating units included in a single water heater, separately from controlling a remainder of the plurality of the water heating units, at a customer location in response to a remotely transmitted indication, wherein the water heating units comprise respective water heating elements, and remotely controlling operation of one of the plurality of water heating units comprises: remotely controlling operation of a lower heating element in the single water heater separate from controlling operation of upper and intermediate heating elements included in the single water heater wherein the intermediate heating element is configured for activation responsive to the upper heating element being deactivated; and wherein remotely controlling operation comprises: coupling power to an upper water heating unit in a default mode of operation in response to absence of the remotely transmitted indication at the customer location; and coupling the power away from an upper water heating unit to a lower water heating unit in a utility controlled mode of operation for the single water heater responsive to presence of the remotely transmitted indication at the customer location.

2. The method of claim 1 wherein remotely controlling operation comprises: transmitting the remotely transmitted indication from a remote system, that is associated with a service provider, over a network to the customer location.

3. The method of claim 1 wherein the method further comprises: coupling the power away from the lower water heating unit back to the upper water heating unit to restore the default mode of operation for the single water heater responsive to absence of the remotely transmitted indication.

4. The method of claim 1 further comprising: coupling power away from all water heating units in the single water heater responsive to the remotely transmitted indication to shed load received from a remote system associated with a service provider.

5. The method of claim 1 wherein the water heating units comprise respective water heating elements, wherein remotely controlling operation comprises: coupling power away from all water heating elements in the single water heater responsive to the remotely transmitted indication to shed load received from a remote system associated with a service provider.

* * * * *